United States Patent
Suzuki et al.

(10) Patent No.: US 9,737,814 B2
(45) Date of Patent: Aug. 22, 2017

(54) COMPUTER READABLE MEDIUM STORING IMAGE PROCESSING PROGRAM OF SYNTHESIZING IMAGES

(75) Inventors: Toshiaki Suzuki, Kyoto (JP); Shigefumi Kawase, Tokyo (JP)

(73) Assignees: Nintendo Co., Ltd., Kyoto (JP); Hal Laboratory, Inc., Tokyo (JP)

( * ) Notice: Subject to any disclaimer, the term of this patent is extended or adjusted under 35 U.S.C. 154(b) by 687 days.

(21) Appl. No.: 13/231,344

(22) Filed: Sep. 13, 2011

(65) Prior Publication Data

US 2012/0092367 A1 Apr. 19, 2012

(30) Foreign Application Priority Data

Oct. 15, 2010 (JP) ................................ 2010-232657

(51) Int. Cl.
| | | |
|---|---|---|
| G09G 5/00 | (2006.01) | |
| A63F 13/00 | (2014.01) | |
| A63F 13/655 | (2014.01) | |
| A63F 13/52 | (2014.01) | |
| A63F 13/837 | (2014.01) | |

(Continued)

(52) U.S. Cl.
CPC .......... *A63F 13/655* (2014.09); *A63F 13/213* (2014.09); *A63F 13/52* (2014.09); *A63F 13/837* (2014.09); *G06T 19/006* (2013.01); *A63F 2300/1093* (2013.01); *A63F 2300/204* (2013.01); *A63F 2300/69* (2013.01); *A63F 2300/8076* (2013.01)

(58) Field of Classification Search
CPC ..... G06F 3/0482; G06F 3/0484; G06T 19/00; G06T 15/503; G06T 15/04; G03B 15/10; H04L 65/60; H04L 67/32; H04N 5/272; H04N 9/74; H04N 13/004; G02B 2027/0118
USPC ........................................................ 345/633
See application file for complete search history.

(56) References Cited

U.S. PATENT DOCUMENTS

| | | |
|---|---|---|
| 2003/0185461 A1 | 10/2003 | Ohshima |
| 2004/0077393 A1 | 4/2004 | Kim et al. |
| 2004/0219980 A1* | 11/2004 | Bassett et al. ................. 463/33 |

(Continued)

FOREIGN PATENT DOCUMENTS

| | | |
|---|---|---|
| EP | 2 098 271 | 9/2009 |
| JP | 2001-092990 | 4/2001 |

(Continued)

OTHER PUBLICATIONS

Nanmatsu et al., "Development of a System for Supporting Landscape Assessment", Journal of IPSJ, vol. 45, No. 6, Information Processing Society of Japan, Jun. 15, 2014, p. 1663-1671.

(Continued)

*Primary Examiner* — Gregory J Tryder
*Assistant Examiner* — Kwang Lee
(74) *Attorney, Agent, or Firm* — Nixon & Vanderhye, P.C.

(57) ABSTRACT

A real world image captured by a real camera such as an outside right imaging unit 23b is acquired, a synthesized image is generated by synthesizing the acquired real world image and a virtual image depicting a first virtual object such as an enemy object EO, in such a manner that the first virtual object such as an enemy object EO appears to be present behind the real world image, and the synthesized image thus generated is displayed on a display device.

29 Claims, 29 Drawing Sheets

(51) Int. Cl.
*A63F 13/213* (2014.01)
*G06T 19/00* (2011.01)

(56) References Cited

U.S. PATENT DOCUMENTS

| | | | |
|---|---|---|---|
| 2007/0132785 A1 | 6/2007 | Ebersole, Jr. et al. | |
| 2008/0024523 A1* | 1/2008 | Tomite et al. | 345/632 |
| 2008/0293488 A1* | 11/2008 | Cheng et al. | 463/31 |
| 2009/0215536 A1 | 8/2009 | Yee et al. | |
| 2010/0085351 A1* | 4/2010 | Deb et al. | 345/419 |
| 2010/0289817 A1* | 11/2010 | Meier et al. | 345/619 |
| 2010/0295921 A1 | 11/2010 | Guthrie et al. | |
| 2013/0189656 A1* | 7/2013 | Zboray et al. | 434/219 |

FOREIGN PATENT DOCUMENTS

| | | |
|---|---|---|
| JP | 2002-222431 | 8/2002 |
| JP | 2003-143477 | 5/2003 |
| JP | 2003-296759 | 10/2003 |
| JP | 2005-339127 | 12/2005 |
| JP | 2008-33531 | 2/2008 |
| JP | 2009-238245 | 10/2009 |
| JP | 2010-528354 A | 8/2010 |

OTHER PUBLICATIONS

Notice of Reason for Rejection in Japanese Application No. 2010-232657 mailed Jun. 17, 2014 (translated).
Metzger, "Adding Reality to the Virtual", Virtual Reality Annual International Symposium, 1993, 1993 IEEE Seattle, WA, Sep. 18, 1993, pp. 7-13, 7 pages.
Feb. 21, 2012 Search Report for EP11180373.0.

\* cited by examiner

| SOLID MODEL OF ENEMY OBJECT | PLANAR POLYGON FOR SHADOW | BULLET MODEL, ETC |
|---|---|---|
| OPACITY (ALPHA VALUE) 1.0 (SET AS TEXTURE) | OPACITY (ALPHA VALUE) 1.0 (SET AS TEXTURE) | OPACITY (ALPHA VALUE) 1.0 (SET AS TEXTURE) |
| SEMI-TRANSPARENT ENEMY OBJECT /EFECT MODEL | SCREEN OBJECT | α TEXTURE (MAP) |
| OPACITY (ALPHA VALUE) 0.6 (SET AS TEXTURE) | OPACITY (ALPHA VALUE) 0.2 | NON-OPEN PORTION: OPACITY (ALPHA VALUE) "1" OPEN PORTION: OPACITY (ALPHA VALUE) "0" |

FIG.15

COMPUTER READABLE MEDIUM STORING IMAGE PROCESSING PROGRAM OF SYNTHESIZING IMAGES

CROSS-REFERENCE TO RELATED APPLICATIONS

This application is based upon and claims the benefit of priority of the prior Japanese Patent Application No. JP2010-232657, filed on Oct. 15, 2010, the entire contents of which are incorporated herein by reference.

FIELD OF THE INVENTION

The present invention relates to an image processing program, an image processing device, an image processing system and an image processing method for performing image processing using images of the real world.

DESCRIPTION OF THE RELATED ART

In the prior art, there is technology which allows a user to experience a virtual reality world by displaying virtual objects created by computer graphics, or the like, in a space which uses images of the real world as a background.

For example, technology is known which, in order to blend the real world with a virtual world without creating a sense of incongruity, blends shading of the real world and shading of a virtual world without a sense of incongruity (see Japanese Patent Application Publication No. 2008-033531).

However, in the technology described above, images of the real world are merely used as a background and do not attract the interest of the user.

Therefore, it is an aspect of the present invention to provide an image processing program, an image processing device, an image processing system and an image processing method capable of attracting the interest of a user.

SUMMARY OF THE INVENTION

The present invention adopts the following composition in order to achieve the aspect described above.

An image processing program stored in a non-transitory computer readable medium according to the present invention is executed by a computer which displays a synthesized image of a real world image and a virtual image on a display device. The image processing program according to the present invention causes a computer to execute acquiring a real world image captured by areal camera, generating a synthesized image by synthesizing the real world image and a virtual image depicting a first virtual object, in such a manner that the first virtual object appears to be present behind the real world image, and displaying the synthesized image on the display device.

According to the foregoing, since a real world image and a virtual image are synthesized and displayed in such a manner that a first virtual object appears to be present behind the real world image, then the sense of depth of the synthesized image is improved. By this means, according to the foregoing, it is possible to generate a synthesized image which can attract the user's interest.

Furthermore, in the generating the synthesized image, the synthesized image may be generated in such a manner that a first virtual object which is present in a predetermined first virtual region appears to be present behind the real world image.

According to the foregoing, since the real world image and the virtual image are synthesized and displayed in such a manner that a first virtual object present in the predetermined virtual region appears to be present behind the real world image, then it is possible to generate a synthesized image capable of attracting the user's interest.

Furthermore, in the generating the synthesized image, the synthesized image may be generated by performing synthesis in such a manner that the real world image is displayed preferentially with respect to the virtual image depicting the first virtual object.

According to the foregoing, since a synthesized image is generated in which the real world image is synthesized so as to be displayed preferentially with respect to an image of the first virtual object, then an unreal situation is depicted in a background using a real world image, without destroying the sense of reality of the real world image. By this means, according to the foregoing, it is possible to generate a synthesized image which can attract the user's interest.

Furthermore, in the generating the synthesized image, the synthesized image may be generated in such a manner that a second virtual object which is present in a predetermined second virtual region that is different from the first virtual region appears to be present in front of the real world image.

According to the foregoing, since a synthesized image is generated in which the first virtual object appears to be present behind the real world image and the second virtual object appears to be present in front of the real world image, then it is possible to generate a synthesized image capable of attracting the user's interest.

Furthermore, in the generating the synthesized image, the synthesized image may be generated by performing synthesis in such a manner that the virtual image depicting the second virtual object is displayed preferentially with respect to the real world image.

According to the foregoing, since a synthesized image is generated in such a manner that an image of the second virtual object is displayed preferentially with respect to the real world image, then the sense of the unreal produced by the image of the second virtual object is enhanced. By this means, according to the foregoing, it is possible to generate a display image which can attract the user's interest.

Furthermore, in the generating the synthesized image, the second virtual object may be synthesized by using the real world image as a background and the synthesized image may be generated in such a manner that the first virtual object appears to be present behind the background.

According to the foregoing, despite the fact that the real world image is displayed as a background of the second virtual object, since the first virtual object appears to be present behind the real world image forming the background, then it is possible to generate a display image capable of attracting the user's interest.

Furthermore, in the generating the synthesized image, a first region of a predetermined virtual space may be set as the first virtual region and a second region of the virtual space may be set as the second virtual region.

According to the foregoing, is possible to separate the predetermined virtual space into a region containing a first virtual object which is synthesized so as to appear to be present behind the real world image and a region containing a second virtual object which is synthesized so as to appear to be present in front of the real world image.

Furthermore, in the generating the synthesized image, adjacent regions may be set as the first region and the second region.

According to the foregoing, it is possible to separate the adjacent regions of the predetermined virtual space into a region containing a first virtual object which is synthesized so as to appear to be present behind the real world image and a region containing a second virtual object which is synthesized so as to appear to be present in front of the real world image.

Furthermore, the second region may include a position of a virtual camera. The first region may be a region more distant from the position of the virtual camera than the second region.

According to the foregoing, it is possible to separate the predetermined virtual space into a region containing a first virtual object which is synthesized so as to appear to be present behind the real world image and a region containing a second virtual object which is synthesized so as to appear to be present in front of the real world image, with reference to the position of the virtual camera.

Moreover, in the generating the synthesized image, the synthesized image may be generated in such a manner that the real world image occupies the whole area of the synthesized image.

According to the foregoing, it is possible to maintain a sense of reality of the synthesized image based on the real world image.

Furthermore, the image processing program described above may cause a computer to execute repeatedly acquiring at least an imaging direction of the real camera using predetermined detection means. In the acquiring the real world image, the real world image may be acquired from the real camera, repeatedly. Furthermore, in the generating the synthesized image, the virtual image may be generated by setting a current imaging direction of the virtual camera in accordance with a current imaging direction of the real camera acquired in the acquiring the imaging direction of the real camera and the synthesized image may be generated by using current real world images acquired repeatedly in the acquiring the real world image.

According to the foregoing, the imaging direction of the virtual camera set in accordance with the current orientation of the real camera, and the current real world image is acquired by the real camera. An unreal situation is depicted in accordance with the current imaging direction of the real camera, in a background which uses a real world image acquired in accordance with the current state of the real camera. By this means, according to the foregoing, it is possible to generate a display image which can attract the user's interest.

Furthermore, the image processing program described above may cause a computer to execute repeatedly acquiring at least an imaging direction of a real camera using predetermined detection means. In the acquiring the real world image, the real world image may be acquired from the real camera, repeatedly. Moreover, in the generating the synthesized image, the virtual image may be generated by setting a current imaging direction of the virtual camera in accordance with the current imaging direction of the real camera acquired in the acquiring the imaging direction of the real camera and the synthesized image may be generated by using the current real world image acquired repeatedly in the acquiring the real world image. Furthermore, in the generating the synthesized image, image processing may be applied to the current real world image acquired in the acquiring the real world image, when it is judged that image processing should be applied to the boundary surface between the first region and the second region corresponding to the current imaging direction of a virtual camera on the basis of judgment data that enables judgment of a position where predetermined image processing should be applied to the boundary surface.

Here, the predetermined image processing indicates, for example, transparent processing, semi-transparent processing, predetermined image synthesis processing (for example, attaching a character image or soiling image, or the like).

According to the foregoing, the imaging direction of the virtual camera is set in accordance with the current orientation of the real camera, and the current real world image is acquired by the real camera. An unreal situation is depicted in accordance with the current imaging direction of the real camera, in a background which uses a real world image acquired in accordance with the current state of the real camera. By this means, according to the foregoing, it is possible to generate a display image which can attract the user's interest.

Furthermore, according to the foregoing, image processing is applied to the current real world image acquired in the acquiring the real world image, when it is judged that image processing should be applied to the boundary surface between the first region and the second region corresponding to the current imaging direction of a virtual camera on the basis of judgment data that enables judgment of a position where predetermined image processing should be applied to the boundary surface. Here, the current imaging direction of the virtual camera corresponds to the current imaging direction of the real camera, and therefore the position where image processing should be applied corresponds to the imaging direction of the real camera. Consequently, according to the foregoing, it is possible to apply predetermined image processing at a position of the real world image which corresponds to the imaging direction of the real camera, and therefore the same predetermined image processing is applied to the same position in the real world image, in other words, the same position in the real world. By this means, according to the foregoing, it is possible to give the user the sensation that the real world is related to the virtual world, rather than the real world image simply being a background.

Furthermore, in the generating the synthesized image, a position where image processing should be applied on the boundary surface corresponding to the current imaging direction of the virtual camera may be judged, on the basis of judgment data, and the image processing may be applied to a corresponding position in the current real world image which is acquired in the acquiring the real world image.

According to the foregoing, the predetermined image processing is applied to a corresponding position of the current real world image. By this means, according to the foregoing, it is possible to give the user the sensation that the real world is related to the virtual world, rater than the real world image simply being a background.

Furthermore, in the generating the synthesized image, a predetermined judgment map may be arranged at the boundary surface between the first region and the second region. A portion of the judgment map corresponding to the current imaging direction of the virtual camera by imaging the judgment map with the virtual camera may be cut out. And the image processing may be applied to the corresponding position in the current real world image acquired in the acquiring the real world image, using the judgment map that has been cut out.

According to the foregoing, by preparing a predetermined judgment map at the boundary surface between the first region and the second region, it is possible to apply predetermined image processing to a corresponding position of the current real world image. By this means, according to the foregoing, by preparing a predetermined judgment map, it is possible to give the user the sensation that the real world is related to the virtual world, rather than the real world image simply being a background.

Furthermore, in the generating the synthesized image, depth judgment may be performed, with reference to a virtual camera, in respect of a boundary surface between the first region and the second region of the virtual space, and the first virtual object and the second virtual object, and on the basis of this depth judgment, a virtual object that is judged to be nearer to the virtual camera than the boundary surface with respect to the real world image may be preferentially synthesized, and the real world image with respect to a virtual object that is judged to be further from the virtual camera than the boundary surface may be preferentially synthesized.

According to the foregoing, it is possible to judge whether or not to synthesize a virtual object preferentially with respect to the real world image, depending on the distance of the virtual object from the virtual camera.

Furthermore, in the generating the synthesized image, the synthesized image may be generated by applying the real world image to a screen object which encompasses a range of view of the virtual camera and is disposed at a boundary position between the first region and the second region, and by imaging the first virtual object, the second virtual object and the screen object by the virtual camera.

According to the foregoing, it is possible to generate a synthesized image by imaging the screen object to which the real world image is applied, the first virtual object and the second virtual object, by means of one virtual camera. By this means, according to the foregoing, it is possible to generate a synthesized image which can attract the user's interest, in a simple fashion.

Furthermore, in the generating the synthesized image, the real world image formed with an opening in a portion thereof may be used for generating the synthesized image in which the first virtual object is visible via this opening.

According to the foregoing, an opening is displayed in the real world image and an object (first virtual object) situated behind the real world image is displayed via the opening. Therefore, according to the foregoing, an image is rendered in which a portion of the real world image is synthesized with an unreal space situated behind the real world image, and therefore it is possible to generate a synthesized image capable of attracting the user's interest.

Moreover, the opening may be disposed in a fixed fashion in the virtual space, regardless of whether or not the opening is displayed on the display device.

According to the foregoing, even if the real world image in which, an opening has been formed leaves the imaging range of the real camera and then returns to the imaging range, the opening continues to be situated in the same position in the virtual space, and therefore the user is able to see that the opening is formed in its original position in the real world image. By this means, according to the foregoing, it is possible to maintain a sense of the unreal once it has been created.

Furthermore, in the generating the synthesized image, an association may be created between an opening position set in the virtual space and a position in the virtual space of the real world image included in the synthesized image, and the synthesized image in which an image depicting the first virtual object is displayed at a position in the real world image corresponding to the opening position may be generated.

According to the foregoing, since the real world image and the opening position are associated in the virtual space and an opening is provided at a position corresponding to the orientation of the real camera, then even if the orientation of the real camera changes, an image is generated in which the opening is provided at the same position in the real world image. Consequently, according to the foregoing, it is possible to generate a display image which can make the user experience a world view in which the world of the real world image and the world behind the real world image are connected.

Furthermore, in the generating the synthesized image, the position in the real world image corresponding to the opening position may be set so as to be transparent, and the display image including an image of the first virtual object which is visible via this position which, has been set to be transparent may be generated.

According to the foregoing, it is possible to generate a display image in which an opening is provided, in a simple fashion, just by setting the real world image to be transparent.

Furthermore, the image processing program described above may further cause a computer to execute setting a new position of an opening in the virtual space, provided that event conditions are satisfied.

According to the foregoing, by setting event conditions, it is possible to provide a new opening, and therefore an image is rendered in which the real world (real world image) is gradually invaded by an unreal world (behind the real world image), and it is possible to generate a display image capable of attracting the user's interest.

Furthermore, the image processing program may further cause a computer to execute moving the first virtual object from the first region to the second region by passing through a virtual camera field of view region, of a boundary surface between the first region where the real world image is synthesized preferentially with respect to the virtual object and the second region where the virtual object is synthesized preferentially with respect to the real world image.

According to the foregoing, since a synthesized image is generated which includes an image of a virtual object moving through a boundary surface between a first region where the real world image is synthesized preferentially with respect to the virtual object and a second region where the virtual object is synthesized preferentially with respect to the real world image, then it is possible to generate a display image which makes a user aware of the worlds in front of and behind the real world image, which are emphasized by this virtual object.

Furthermore, the image processing program may further cause the computer to execute forming the opening in the virtual camera field of view region, of the boundary surface between the first region and the second region, when movement has occurred in the moving the first virtual host.

According to the foregoing, since a display image is generated in which a virtual object passing between the first region and the second region creates an opening in the real world image, then it is possible to generate a display image which makes the user aware of worlds in front of and behind the real world image, by means of the virtual object and the opening that is created.

Furthermore, it is also possible to reduce the size of the opening, provided that predetermined repair conditions are satisfied.

According to the foregoing, it is possible to control the region where the real world image is displayed, and therefore it is possible to generate a display image that makes the user experience a world view in which the real world (real world image) and the unreal world are connected.

Furthermore, in the generating the synthesized image, the synthesized image in which an image of a silhouette of the first virtual object is synthesized with the real world image may be generated.

According to the foregoing, it is possible to generate a display image which can make a user aware of the movement of a first virtual object which is situated behind the real world image.

Furthermore, the silhouette may have an outline corresponding to an orientation of the object.

According to the foregoing, it is possible to generate a display image which can make a user aware of the movement of a first virtual object which is situated behind the real world image.

Furthermore, in the generating the synthesized image, the synthesized image in which an image of the first virtual object is displayed at a position of the opening, and an image of a silhouette of the object is displayed in superimposed fashion on the real world image at a position other than that of the opening may be generated.

According to the foregoing, it is possible to switch between rendering of an image of an object and rendering of an image of a silhouette of the object, by comparison with previously set values, and therefore this processing can be assigned to a GPU.

Furthermore, the real world image may be an image captured by a single-eye camera or a compound-eye camera.

According to the foregoing, it is possible to set a planar image or a stereoscopically viewable image as the real world image.

A further mode of the present invention may be an image processing device which achieves any of the compositions described above. Furthermore, a further mode of the present invention may be an image processing system in which a plurality of devices are configured so as to be communicable with each other, which achieves any of the compositions described above. Moreover, a further mode of the present invention may be an image processing method executed by one processor or a plurality of processors in coordinated fashion included in an image processing system constituted by at least one information processing device capable of image processing for displaying an image on a display device, which achieves any of the compositions described above. The computer readable medium according to the present invention is a recording medium which can be read by a computer or other device or machine. Here, the recording medium which can be read by a computer, or the like, is a medium which stores information, such as programs, by means of an electrical, magnetic, chemical, mechanical or optical action.

According to the present invention, it is possible to provide an image processing program, an image processing system, an image processing method and an image processing device capable of attracting the user's interest.

BRIEF DESCRIPTION OF THE DRAWINGS

FIG. 15 is a diagram showing one example of the opacity of respective objects;

DESCRIPTION OF THE PREFERRED EMBODIMENTS

Below, an image processing device which executes an image processing program forming one embodiment relating to the present invention is described with reference to concrete examples. The embodiment described below is an example and the present invention not limited to the composition of the embodiment described below.

In the embodiment described above, the data processed by the computer is described using graphs and natural language as examples, but more specifically, the data is specified in the form of virtual language, commands, parameters, machine language, sequences, and the like, which can be recognized by the computer. The present invention does not limit the method of representing data.

§1 HARDWARE CONFIGURATION

Firstly, a portable game device 10 will be described as one example of an image processing device which executes an image processing program relating to the present embodiment, with reference to the drawings. However, the image processing device relating to the present invention is not limited to a game device. The image processing device relating to the present invention may be any computer system, such as a generic computer, for example. Furthermore, the device does not have to be a portable device.

The image processing program relating to the present embodiment described below is a game program, but the image processing program relating to the present invention is not limited to a game program. The image processing program according to the present invention may be applied by being executed in any computer system. Furthermore, the respective processes of the present embodiment may be distributed amongst a plurality of devices linked in a network, or may be executed by a network system or a so-called cloud network in which main processes are carried out in a server and processing results are then delivered to a terminal.

FIG. 1, FIG. 2, FIG. 3A, FIG. 3B, FIG. 3C and FIG. 3D are plan diagrams showing one example of the external appearance of a game device.

The game device 10 shown in FIG. 1 to FIG. 3D has a built-in imaging unit (camera), and is able to capture an image by means of this imaging unit, display a captured image on a screen, and save data of a captured image. Furthermore, the game device 10 is able to execute a game program stored on an exchangeable memory card, or a game program received from a server or other game device via a network. Moreover, the game device 10 is able to generate an image captured by a virtual camera set in a virtual space, by computer graphics processing, and display the image on a screen.

Figure 1:
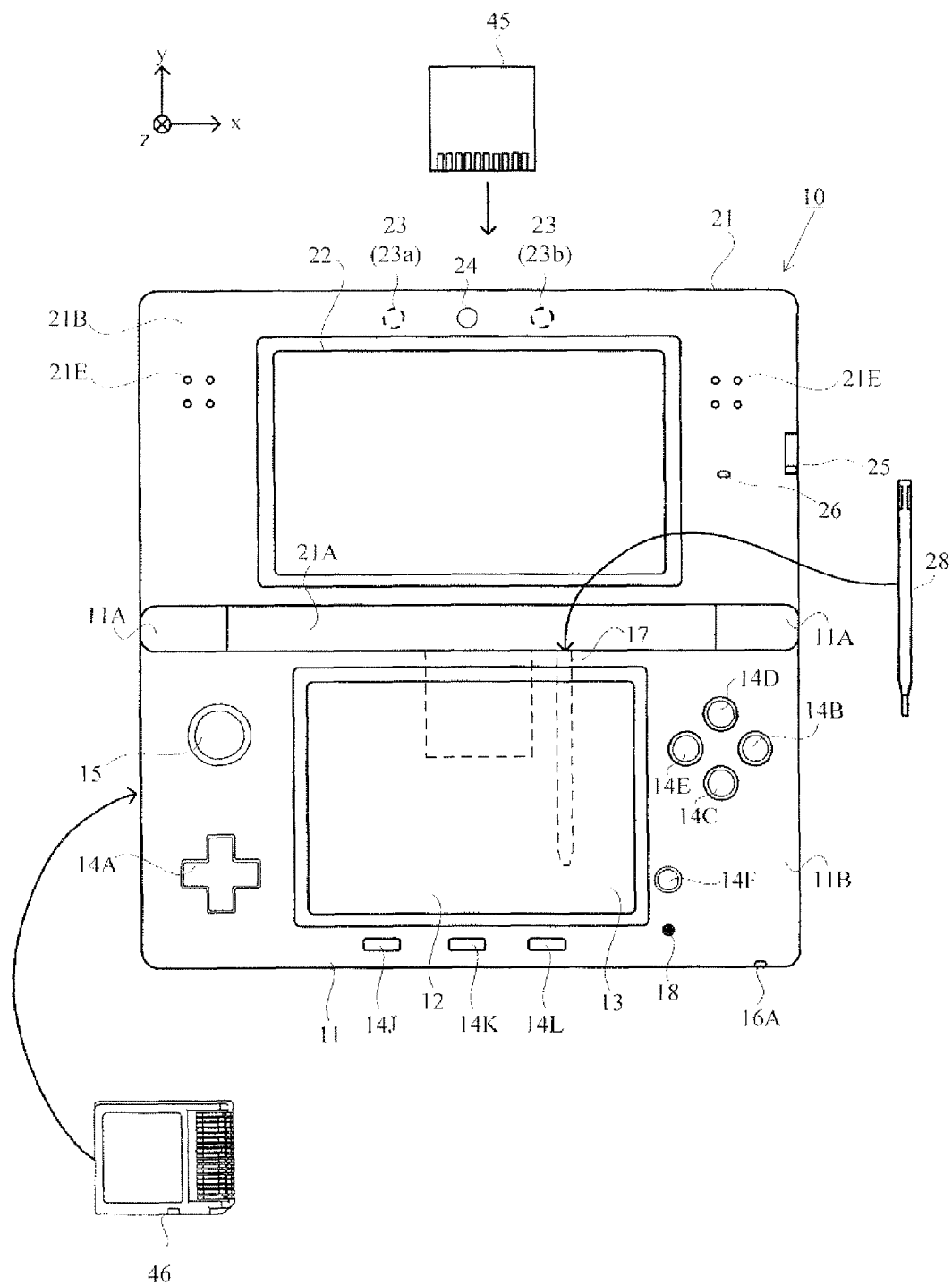
FIG. 1 is a front view diagram showing an open state of a game device which is one example of a device that executes an image processing program according an embodiment of the present invention.
Figure 2:
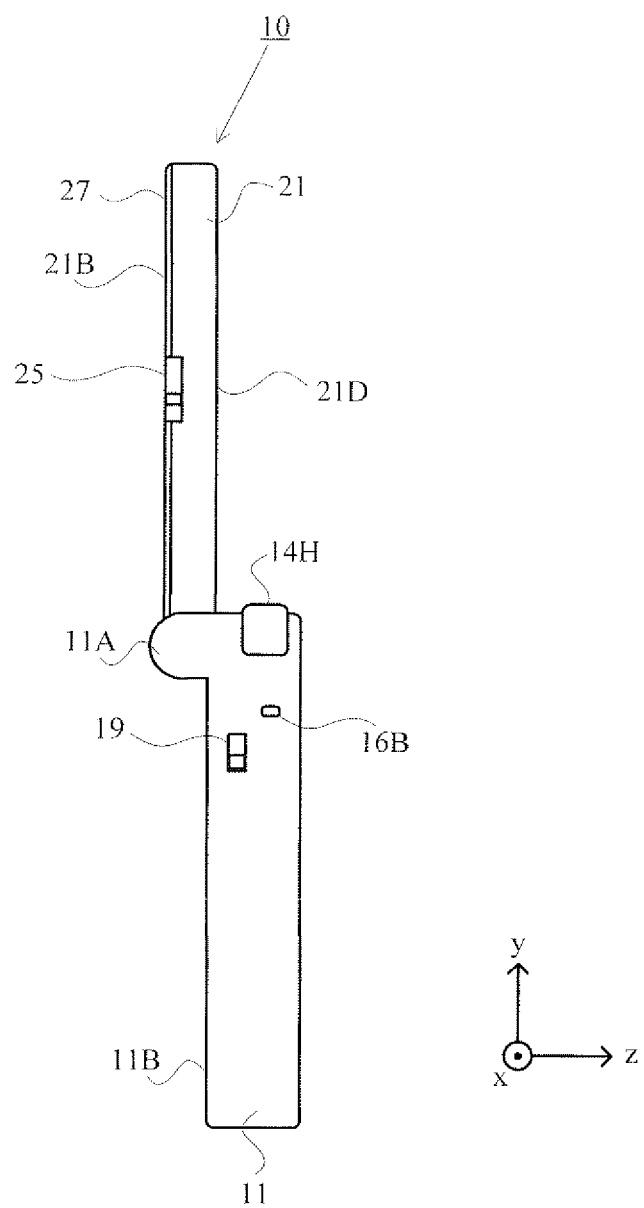
FIG. 2 is a side view diagram showing an open state of a game device which is one example of a device that executes an image processing program according to the present embodiment.
Figure 3:
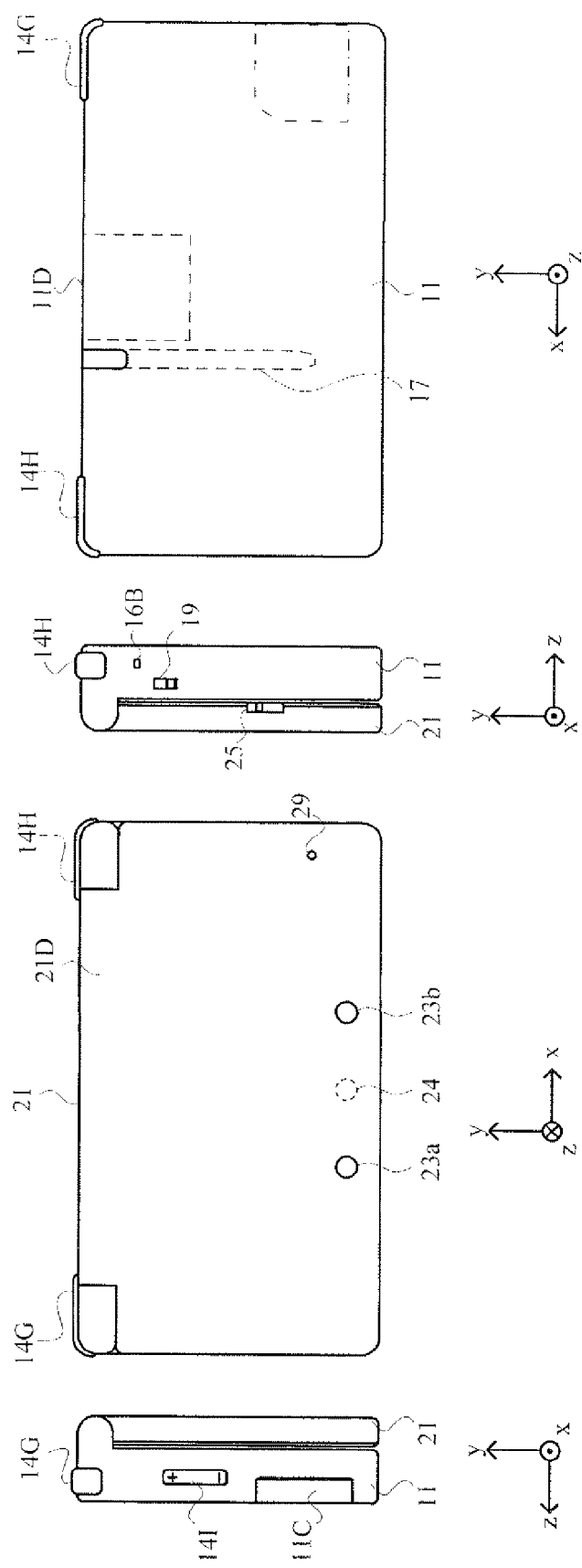
FIG. 3A is a left side view diagram showing a closed state of a game device which is one example of a device that executes an image processing program according to the present embodiment.
FIG. 3B is a front side view diagram showing a closed state of a game device which is one example of a device that executes an image processing program according to the present embodiment.
FIG. 3C is a right side view diagram showing a closed state game device which is one example of a device that executes an image processing program according to the present embodiment.
FIG. 3D is a rear side view diagram showing a closed state of a game device which is one example of a device that executes an image processing program according to the present embodiment.

The game device 10 shown in FIG. 1 to FIG. 3D has a lower housing 11 and an upper housing 21. The lower housing 11 and the upper housing 21 are coupled operably and closably (in a folding fashion) by means of a hinge structure. In other words, the upper housing 21 is installed rotatably (swingably) with respect to the lower housing 11. By this means, the game device 10 has two modes: a closed state where the upper housing 21 lies in close contact with the lower housing 11 (FIG. 3A and FIG. 3O), and a state (open state) where the upper housing 21 has been rotated with respect to the lower housing 11 and released from the state of close contact. As shown in FIG. 2, the upper housing 21 is allowed to rotate until reaching a position where the upper housing 21 and the lower housing 11 are substantially parallel in the open state (see FIG. 2).

FIG. 1 is a front view diagram showing one example of a game device 10 in an opened state (open state). The lower housing 11 and the upper housing 21 of the game device 10 are respectively formed in a horizontally-long rectangular plate shape having a planar shape with a long direction (horizontal direction (left/right direction): the x direction in FIG. 1) and a short direction ((vertical direction): the y direction in FIG. 1). The outer edge portion on the lower side in the lengthwise direction of the upper housing 21 and the outer edge portion on the upper side in the lengthwise direction of the lower housing 11 are coupled rotatably by means of a hinge structure. When the user uses the game device 10, the game device 10 is normally set to an open state. When the user stores the game device 10, the game device 10 is normally set to a closed state. Furthermore, the upper housing 21 can maintain a stationary state at any angle desired by the user with respect to the lower housing 11, due to a frictional force which is produced in the coupling portion with the lower housing 11. In other words, in the game device 10, the upper housing 21 can be halted at a desired angle with respect to the lower housing 11. In general, from the viewpoint of the visibility of a screen provided in the upper housing 21, the upper housing 21 is opened to a position forming a perpendicular angle or obtuse angle with respect to the lower housing 11. Below, when the game device 10 is in the closed state, the respectively opposing surfaces of the upper housing 21 and the lower housing 11 are called "inner surfaces" or "main surfaces". Furthermore, the respective surfaces of the upper housing 21 and the lower housing 11 on the opposite side to the inner surfaces (main surfaces) are called "outer surfaces".

Protrusions (bearing sections) 11A which protrude in a direction (the z direction in FIG. 1) perpendicular to the inner surface (main surface) 11B of the lower housing 11 are provided in the upper long edge portion of the lower housing 11 of the game device 10. Furthermore, a protrusion (bearing section) 21A which protrudes in a direction perpendicular to the lower surface of the upper housing 21 from this lower surface is provided in the lower long edge portion of the upper housing 21. A rotating axle (not illustrated) extending in the x direction from one protrusion 11A, through the protrusion 21A, to the other protrusion 11A accommodated in the protrusions 11A, 21A, 11A, and the upper housing 21 is able to rotate relatively with respect to the lower housing 11 about this rotating axle. In this way, the lower housing 11 and the upper housing 21 are connected in a foldable fashion.

A lower LCD (Liquid Crystal Display) 12, a touch panel 13, operating buttons 14A to 14L, an analog stick 15, a first LED 16A and a microphone hole 18 are provided on the inner surface 11B of the lower housing 11 which is shown in FIG. 1.

The lower LCD 12 is accommodated in the lower housing 11. The planar shape of the lower LCD 12 is a horizontally-long rectangular shape, the long edge direction thereof being arranged to coincide with the lengthwise direction of the lower housing 11 (the x direction in FIG. 1). The lower LCD 12 is provided in the center of the inner surface (main surface) of the lower housing 11. The screen of the lower LCD 12 is exposed via an opening provided in the inner surface of the lower housing 11. When the game device 10 is not in use, it is possible to prevent soiling or scratching of the screen of the lower LCD 12 by setting the game device 10 to the closed state described above. The number of pixels of the lower LCD 12 is 320 dot×240 dot (horizontal× vertical), for instance. The lower LCD 12 is a display device which displays images in a planar view (not a stereoscopic view), in contrast to the upper LCD 22 which is described below. In the first embodiment, an LCD is used as a display device, but it is also possible to use another display device, such as one using EL (Electro Luminescence), for example. Moreover, for the lower LCD 12, it is possible to use a display device having a desired resolution.

The touch panel 13 is one input device of the game device 10. The touch panel 13 is installed so as to cover the screen of the lower LCD 12. In the first embodiment, the touch panel 13 employs a resistance film type of touch panel. However, the touch panel 13 is not limited, to a resistance film type and it is also possible to use a touch panel based on any press operation method, such as an electrostatic capacitance method, or the like. Furthermore, in the first embodiment, the touch panel 13 has the same resolution (detection accuracy) as the resolution of the lower LCD 12. Here, it is not especially necessary for the resolution of the touch panel 13 and the resolution of the lower LCD 12 to be matching.

The operating buttons 14A to 14L are input devices for performing predetermined inputs. The operating buttons 14A to 14L provided on the inner surface (main surface) of the lower housing 11 are: a four-way button 14A (direction input button. 14A), a button 14E, a button 14C, a button 14D, a button 14E, a power button 14F, a select button 14J, a home button 14K and a start button 14L.

The four-way button 14A has a cross shape and includes at least buttons indicating upward, downward, leftward and rightward directions. The four-way button 14A is provided in the lower part of the region to the left-hand side of the lower LCD 12. The four-way button 14A is located in a position where it can be operated by the thumb of a user's left hand when gripping the lower housing 11.

The four buttons, button 14B, button 14C, button 14D and button 14E, are situated in a cross shape in the upper part of the region to the right-hand side of the lower LCD 12. The button 14K, button 14C, button 14D and button 14E are situated in a place where the thumb of a user's right hand is naturally positioned when gripping the lower housing 11. The power button 14F is situated in the lower part of the region to the right-hand side of the lower LCD 12.

The select button 14J, the home button 14K and the start button 14L are respectively situated in the region below the lower LCD 12.

The buttons 14A to 14E, the select button 14J, the home button 14K and the start button 14L are assigned appropriately to functions corresponding to a program which is executed by the game device 10. For example, the four-way button 11A is used for selection operations and character movement operations during a game, and the like. The operating buttons 14B to 14E, for example, are used for a setting operation or a canceling operation, or the like. Furthermore, the power button 14K is used to switch the power supply of the game device 10 on and off.

The analog stick 15 is a device for indicating directions. The analog stick 15 is provided in the upper part of the region to the left-hand side of the lower LCD 12 on the inner surface (main surface) of the lower housing 11. More specifically, the analog stick 15 is provided above the four-way button 14A. Moreover, the analog stick 15 is located in a position where it can be operated by the thumb of a user's left hand when gripping the lower housing 11. By providing the analog stick 15 in the upper part, the analog stick 15 situated in a place where the thumb of a user's left hand is naturally positioned when gripping the lower housing 11. The four-way button 14A is situated in a position slightly below the thumb of the user's left hand when gripping the lower housing 11. Therefore, the user is able to operate the analog stick 15 and the four-way button 14A simply by moving his or her left thumb up or down while gripping the lower housing 11. The analog stick 15 is composed in such a manner that the top of the key slides in parallel with the inner surface of the lower housing 11. The analog stick 15 functions in accordance with the program being executed by the game device 10. For example, when a game in which a predetermined object appears in a three-dimensional virtual space is executed by the game device 10, the analog stick 15 functions as an input device for moving the predetermined object within the three-dimensional virtual space. In this case, the predetermined object is moved in the direction in which the key top of the analog stick 15 is slid. For the analog stick 15, it is possible to use a stick capable of producing an analog input by tilting by a predetermined amount in any one of the upward, downward, leftward or rightward directions or an oblique direction.

The four buttons, button 14B, button 14C, button 14D and button 14E, and the analog stick 15 are disposed in laterally symmetrical positions on either side of the lower LCD 12. By this means, depending on the game program, a left-handed person, for example, is able to input a direction instruction by using the four buttons, button 14B, button 14C, button 14D and button 14E.

The first LED 16A (FIG. 1) shows the power on/off state of the game device 10 to the user. The first LED 16A is provided on the right-hand side of the edge portion common to the inner surface (main surface) of the lower housing 11 and the lower side face of the lower housing 11. By this means, the user is able to see whether or not the first LED 16A is lit, regardless of the open and closed state of the game device 10.

The microphone hole 18 is a hole for a microphone which is built into the game device 10 as a voice input device. The built-in microphone detects external sounds via the microphone hole 18. The microphone and the microphone hole 18 are provided below the power button 14F on the inner surface (main surface) of the lower housing 11.

An insertion hole 17 for a touch pen 28 (indicated by dotted lines in FIG. 1 and FIG. 3D) is provided in the upper side face of the lower housing 11. The touch pen 28 used for performing operations on the touch panel 13 can be accommodated via the insertion hole 17. Inputs via the touch panel 13 are usually performed using the touch pen 28. However, the user may also use his or her finger, instead of the touch pen 28.

The game device 10 and an insertion hole 11D (indicated by a dotted line in FIG. 1 and FIG. 3D) for inserting an external memory 45 in which a game program is stored are provided in the upper side face of the lower housing 11. A connector (not illustrated) for electrically connecting the external memory 45 and an internal circuit in a detachable fashion is provided inside the insertion hole 11D. By connecting the external memory 45 to the game device 10, a predetermined game program is executed by a processor included in the internal circuit. The connector and the insertion hole 11D may be provided in another side face (for example, the right-hand side face) of the lower housing 11.

Speaker holes 21E, an upper LCD 22, an inside imaging unit 24, a 3D adjustment switch 25, and a 3D indicator 26 are provided on the inner surface 21B of the upper housing 21 shown in FIG. 1.

The upper LCD 22 is a display device which is capable of displaying stereoscopically viewable images. The upper LCD 22 is capable of displaying a left-eye image and a right-eye image using substantially the same display region. More specifically, the upper LCD 22 is a display device based on a method in which a left-eye image and a right-eye image are displayed alternately in predetermined units (for example, one column each) in the horizontal direction. The upper LCD 22 may also be a display device based on a method in which a left-eye image and a right-eye image are displayed alternately. Furthermore, the upper LCD 22 is a display device producing a display which can be viewed stereoscopically with the naked eye. In this case, the upper LCD 22 employs a lenticular method or parallax barrier method in such a manner that a left-eye image and a right-eye image which are displayed alternatively in the horizontal direction are viewed separately by the left eye and the right eye, respectively. In the first embodiment, the upper LCD 22 is a display device based on a parallax barrier method. The upper LCD 22 displays an image (stereoscopic image) which can be viewed stereoscopically with the naked eye, by using a left-eye image and a right-eye image. More specifically, the upper LCD 22 is able to display a stereo image (a stereoscopically viewable image) which creates a three-dimensional impression for the user, by causing the left-eye image and the right-eye image to be viewed respectively by the user's left eye and the user's right eye, by means of a parallax barrier. Furthermore, in the upper LCD 22, the parallax barrier can be disabled, and when the parallax barrier is disabled, an image can be displayed in planar view (the opposite of the stereoscopic view described above; in other words, a display mode in which the same displayed image is viewed by both the right eye and the left eye). In this way, the upper LCD 22 is a display device capable of switching between a stereoscopic display mode which displays a stereoscopically viewable image and a planar display mode which displays an image in planar view (displays a planar image). This switching of the display mode is performed by means of a 3D adjustment switch. 25, which is described below.

The upper LCD 22 is accommodated in the upper housing 21. The upper LCD 22 is a horizontally long rectangular shape, and is arranged in the center of the upper housing 21 with the long edge direction coinciding with the long edge direction of the upper housing 21. The surface area of the screen of the upper LCD 22 is set to be larger than the surface area of the screen of the lower LCD 12, for example. More specifically, the screen of the upper LCD 22 is set to have a greater horizontal length than the screen of the lower LCD 12. More specifically, the ratio of the horizontal width in the aspect ratio of the screen in the upper LCD 22 is set to be greater than the ratio of the horizontal width in the aspect ratio of the screen in the lower LCD 12.

The screen of the upper LCD 22 is provided on the upper surface (main surface) 21B of the upper housing 21, and the screen of the upper LCD 22 is exposed via an opening provided in the inner surface 21B of the upper housing 21. Furthermore, the inner surface of the upper housing 21 is covered with a transparent screen cover 27. The screen cover 27 protects the screen of the upper LCD 22 and is also integrated with the upper LCD 22 and the inner surface of the upper housing 21 so as to create a unified impression. The number of pixels of the upper LCD 22 is 800 dot×240 dot (horizontal×vertical), for instance. In the first embodiment, the upper LCD described as being a liquid crystal device. However, it is not limited to this and a display device using EL, or the like, for example, may also be used. Furthermore, it is possible to use a display device of any resolution for the upper LCD 22.

The speaker holes 21E are holes for outputting sound from a speaker 44 which is a sound output device of the game device 10. The speaker holes 21E are disposed in lateral symmetry on either side of the upper LCD. Sound from speakers 44, which are described below, is output via the speaker holes 21E.

The inside imaging unit 24 is an imaging unit having an imaging direction in an inward normal direction to the inner surface 21B of the upper housing 21. The inside imaging unit 24 comprises an imaging element having a predetermined resolution and a lens. The imaging element is, for example, a CCD image sensor, a CMOS image sensor, or the like. The lens may include a zoom mechanism.

The inside imaging unit 24 is disposed above the upper end of the screen of the upper LCD 22 on the inner surface 21B of the upper housing 21, in a central position in the left/right direction of the upper housing 21 (on a line which divides the upper housing 21 (the screen of the upper LCD 22) into two equal parts in the left/right direction). By arranging the inside imaging unit 24 in this way, it is possible to capture an image of the user's face from the front side with the inside imaging unit 24, when the user is looking straight at the upper LCD 22. An outside left imaging unit 23*a* and an outside right imaging unit 23*b* are described below.

The 3D adjustment switch 25 is a sliding switch, which is used to switch the display mode of the upper LCD 22, as described previously. Furthermore, the 3D adjustment switch 25 is used to adjust the three-dimensional impression of the stereoscopically viewable image (stereo image) displayed on the upper LCD 22. The 3D adjustment switch 25 is provided in the edge portion of the upper housing 21 which is common to the inner surface 21B and the right side face, so as to be visible by the user regardless of the open and closed state of the game device 10. The 3D adjustment switch 25 has a slider which can be slid to any position in a predetermined direction (for example, the up/down direction), the display mode of the upper LCD 22 being set in accordance with the position of the slider.

For example, if the slider of the 3D adjustment switch 25 is situated in the lowest position, then the upper LCD 22 is set to planar display mode, and a planar image is displayed on the screen of the upper LCD 22. It is also possible to provide a planar display by leaving the upper LCD 22 in the stereoscopic display mode and using the same image for the left-eye image and the right-eye image. On the other hand, if the slider is situated to the upper side of the lowest position described above, then the upper LCD 22 is set to stereoscopic display mode. In this case, a stereoscopically viewable image is displayed on the screen of the upper LCD 22. Here, if the slider is situated above the lowest position, then the appearance of the stereo image is adjusted in accordance with the position of the slider. More specifically, the amount of displacement of the lateral direction positions of the right-eye image and the left-eye image is adjusted in accordance with the position of the slider.

The 3D indicator 26 indicates whether the upper LCD 22 is in stereoscopic display mode. For example, the 3D indicator 26 is an LED, which lights up when the stereoscopic display mode of the upper LCD 22 is enabled. The 3D indicator 26 is provided on the inner surface 21B of the upper housing 21, and in the vicinity of the screen of the upper LCD 22. Consequently, if the user is looking straight at the screen of the upper LCD 22, the user is able to see the 3D indicator 26 easily. Therefore, the user is able readily to identify the display mode of the upper LCD 22, even while looking at the screen of the upper LCD 22.

FIG. 2 is a front right side diagram showing one example of the game device 10 in an open state. A second LED 16B, a wireless switch 19 and an R button 14H are provided in the right side face of the lower housing 11. By lighting up, the second LED 16B notifies the user of the established status of wireless communication of the game device 10. The game device 10 is able to perform wireless communication with other devices, and the second LED 16B lights up when wireless communication with another device has been established. The game device 10 has a function of connecting to a wireless LAN by a method conforming to the IEEE 802.11b/g standard, for example. The wireless switch 19 enables or disables the wireless communication function. The R button 14H is described below.

FIG. 3A is a left side diagram showing one example of a game device 10 in a closed state. An openable cover section 110, an button 14G and a volume button 14I are provided on the left side face of the lower housing 11 shown in FIG. 3A. The volume button 14I is a button for adjusting the volume of the speakers 44 provided in the game device 10.

A connector (not illustrated) for electrically connecting the game device 10 with an external data memory 46 (see FIG. 1) is provided on the inside of the cover section 110. The external data memory 46 is installed detachably in the connector. The external data memory 46 is used, for example, to store (save) data of images captured by the game device 10. The connector and the cover section 110 may also be provided on the right side face of the lower housing 11. The L button 14G is described below.

FIG. 3B is a front view diagram showing one example of the game device 10 in a closed state. An outside left imaging unit 23*a*, an outside right imaging unit 23*b* and a third LED 29 are provided in the outer surface of the upper housing 21 shown in FIG. 33.

The outside left imaging unit 23*a* and the outside right imaging unit 23*b* respectively include an imaging element having a predetermined common resolution for example, a CCD image sensor or a CMOS image sensor, or the like), and a lens. The lens may include a zoom mechanism. The imaging direction of both the outside left imaging unit 23*a* and the outside right imaging unit 23*b* is an outward normal direction from the outer surface 21D. In other words, the imaging direction (visual axis of the camera) of the outside left imaging unit 23*a* and the imaging direction of the outside right imaging unit 23*b* are mutually parallel. The outside left imaging unit 23*a* and the outside right imaging unit 23*b* are referred to jointly below as the outside imaging unit 23.

The outside left imaging unit 23*a* and the outside right imaging unit 23*b* which constitute the outside imaging unit 23 are arranged in line in the horizontal direction of the screen of the upper LCD 22. In other words, the outside left imaging unit 23*a* and the outside right imaging unit 23*b* are arranged in such a manner that a straight line linking the outside left imaging unit 23*a* and the outside right imaging unit 23*b* lies in the horizontal direction of the screen of the upper LCD 22. Furthermore, if the user turns the upper housing 21 to a predetermined angle (for example, 90°) with respect to the lower housing 11 and views the screen of the upper LCD 22 from the front, then the outside left imaging unit 23*a* is positioned on the left-hand side of the user viewing the screen and the outside right imaging unit 23*b* is positioned on the right-hand side of the user viewing the screen (see FIG. 1). The distance between the outside left imaging unit 23*a* and the outside right imaging unit 23*b* is set to approximately the distance between a person's eyes, for example, this distance may be set in the range of 30 mm to 70 mm. However, the distance between the outside left imaging unit 23*a* and the outside right imaging unit 23*b* is not limited to this range. In the first embodiment, the outside left imaging unit 23*a* and the outside right imaging unit 23*b* are fixed to the upper housing 21 and the imaging direction thereof cannot be changed.

The outside left imaging unit 23*a* and the outside right imaging unit 23*b* are respectively disposed in symmetrical positions with respect to a line dividing the upper LCD 22 (upper housing 21) into two equal parts in the left/right direction. Furthermore, the outside left imaging unit 23*a* and the outside right imaging unit 23*b* are disposed in the upper part of the upper housing 21 on the rear side of positions above the upper end of the screen of the upper LCD 22, when the upper housing 21 is open (see FIG. 1). In other words, the outside left imaging unit 23*a* and the outside right imaging unit 23*b* are disposed on the outer surface of the upper housing 21, above the upper end of the screen of the upper LCD 22 when the upper LCD 22 is projected to a position on the outer surface.

In this way, by arranging the outside left imaging unit 23*a* and the outside right imaging unit 23*b* in linear symmetry with respect to the central line in the short edge direction of the upper LCD 22, the respective imaging directions of the outside imaging unit 23 can be made to coincide with the respective lines of sight of the user's left and right eyes, when the user is looking straight at the upper LCD 22. Furthermore, because the outside imaging unit 23 is disposed in a rear side position above the upper end of the screen of the upper LCD 22, then there is no interference between the outside imaging unit 23 and the upper LCD 22 inside the upper housing 21. Moreover, the outside left imaging unit 23*a* and the outside right imaging unit 23*b* are provided in lateral symmetry on either side of the projected position of the inside imaging unit 24, when the inside imaging unit 24, which is provided on the inner surface of the upper housing 21, is projected to the outer surface of the upper housing 21, as indicated by the dotted line in FIG. 3B. Consequently, it is possible to make the upper housing 21 thinner compared to a case where the outside imaging unit 23 is disposed to the rear side of the screen of the upper LCD 22 or a case where the outside imaging unit 23 is disposed to the rear side of the inside imaging unit 24.

The outside left imaging unit 23*a* and the outside right imaging unit 23*b* can be used as stereo cameras by the program executed by the game device 10. Furthermore, either one of the two outside imaging elements (the outside left imaging unit 23*a* and the outside right imaging unit 23*b*) can be used independently depending on the program, allowing the outside imaging unit 23 to be used as a non-stereo camera. If executing a program which uses the outside left imaging units 23*a* and 23*b* as stereo cameras, the outside left imaging unit 23*a* captures a left-eye image which is seen by the user's left eye and the outside right imaging unit 23*b* captures a right-eye image which is seen by the user's right eye. Furthermore, the program can also synthesize images captured by the two outside imaging units (the outside left imaging unit 23*a* and the outside right imaging unit 23*b*), or use the images in complementary fashion to perform imaging in an expanded imaging range. Moreover, it is also possible to generate a left-eye image and a right-eye image having parallax, from a single image captured by one of the outside imaging units 23*a* and 23*b*, so as to produce a pseudo-stereo image just like one captured by two cameras. In generating a pseudo-stereo image of this kind, the distance between the virtual cameras can be set as desired.

The third LED 29 lights up when the outside imaging unit 23 is operating, thereby indicating that the outside imaging unit 23 is operating. The third LED 29 is provided in the vicinity of the outside imaging unit 23 on the outer surface of the upper housing 21.

FIG. 3C is a right side diagram showing one example of the game device 10 in a closed state. FIG. 3D is a rear view diagram showing one example of the game device 10 in a closed state.

An L button 14G and an R button 14H are provided on the upper surface of the lower housing 11 shown in FIG. 3D. The L button 14G is provided in the left end portion of the upper surface of the lower housing 11 and the R button 14H is provided in the right end portion of the upper surface of the lower housing 11. The L button 14G and the R button 14H are assigned to appropriate functions corresponding to the program executed by the game device 10. For example, the L button 14G and the R button 14H function as shutter buttons (imaging instruction buttons) for the respective imaging units described above.

Although not shown in the drawings, a rechargeable battery forming a power source for the game device 10 is accommodated in the lower housing 11, and this battery can be recharged via a terminal provided in a side face (for example, the upper side face) the lower housing 11.

Figure 4:
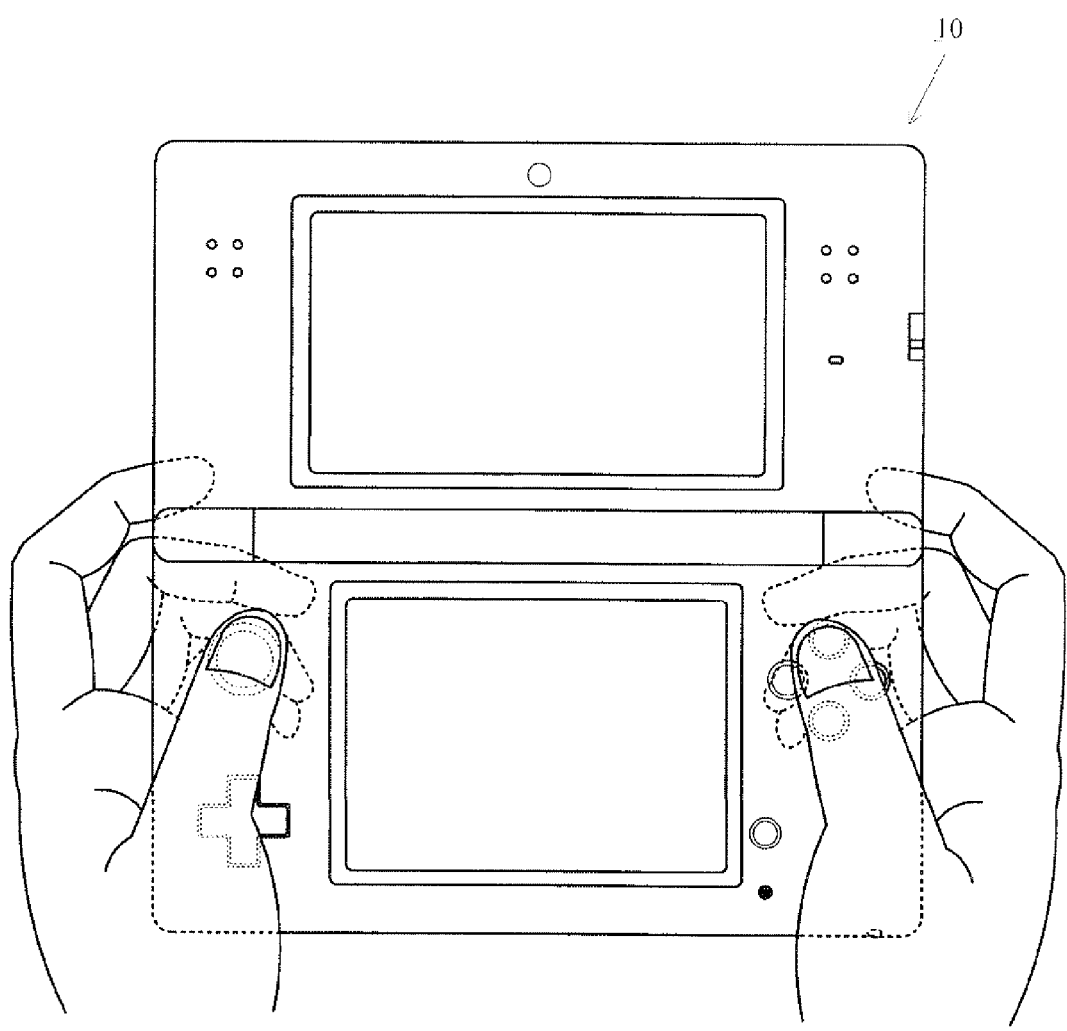
FIG. 4 is a diagram showing an example of a situation where a user is gripping a game device with both hands, the game device being one example of a device that executes an image processing program according to the present embodiment.
Figure 5:
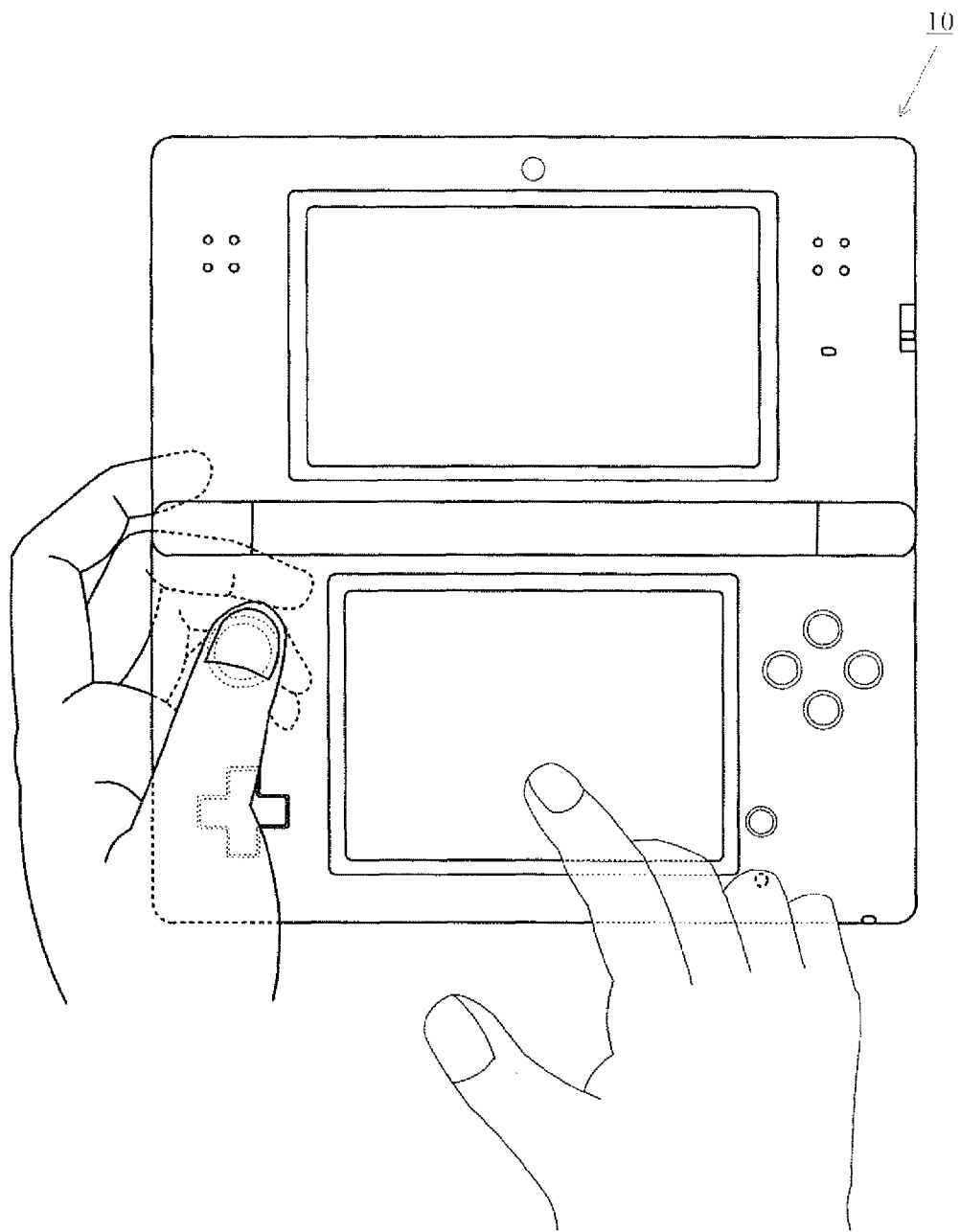
FIG. 5 is a diagram showing an example of a situation where a user is gripping a game device with one hand, the game device being one example of a device that executes an image processing program according to the present embodiment.

FIG. 4 and FIG. 5 respectively show one example of the state of use of the game device 10. FIG. 4 is a diagram showing one example of a situation where a user is gripping the game device 10 with both hands.

In the example shown in FIG. 4, the user grips the inner surface and the outer surface (the surface on the opposite side to the inner surface) of the lower housing 11 with the palm, middle finger, fourth finger and little finger of each hand, with the lower LCD 12 and the upper LCD 22 facing towards the user. By gripping the device in this way, the user is able to operate the operating buttons 14A to 14E and the analog stick 15 with his or her left and right thumbs and operate the L button 14G and the R button 14H with his or her left and right index fingers, while gripping the lower housing 11.

FIG. 5 is a diagram showing one example of a situation where a user is gripping the game device 10 with one hand. In the example shown in FIG. 5, when making an input to the touch panel 13, the user releases one of the hands gripping the lower housing 11 and grips the lower housing 11 with the other hand only. By this means, the user is able to make inputs to the touch panel 13 with the released hand.

Figure 6:
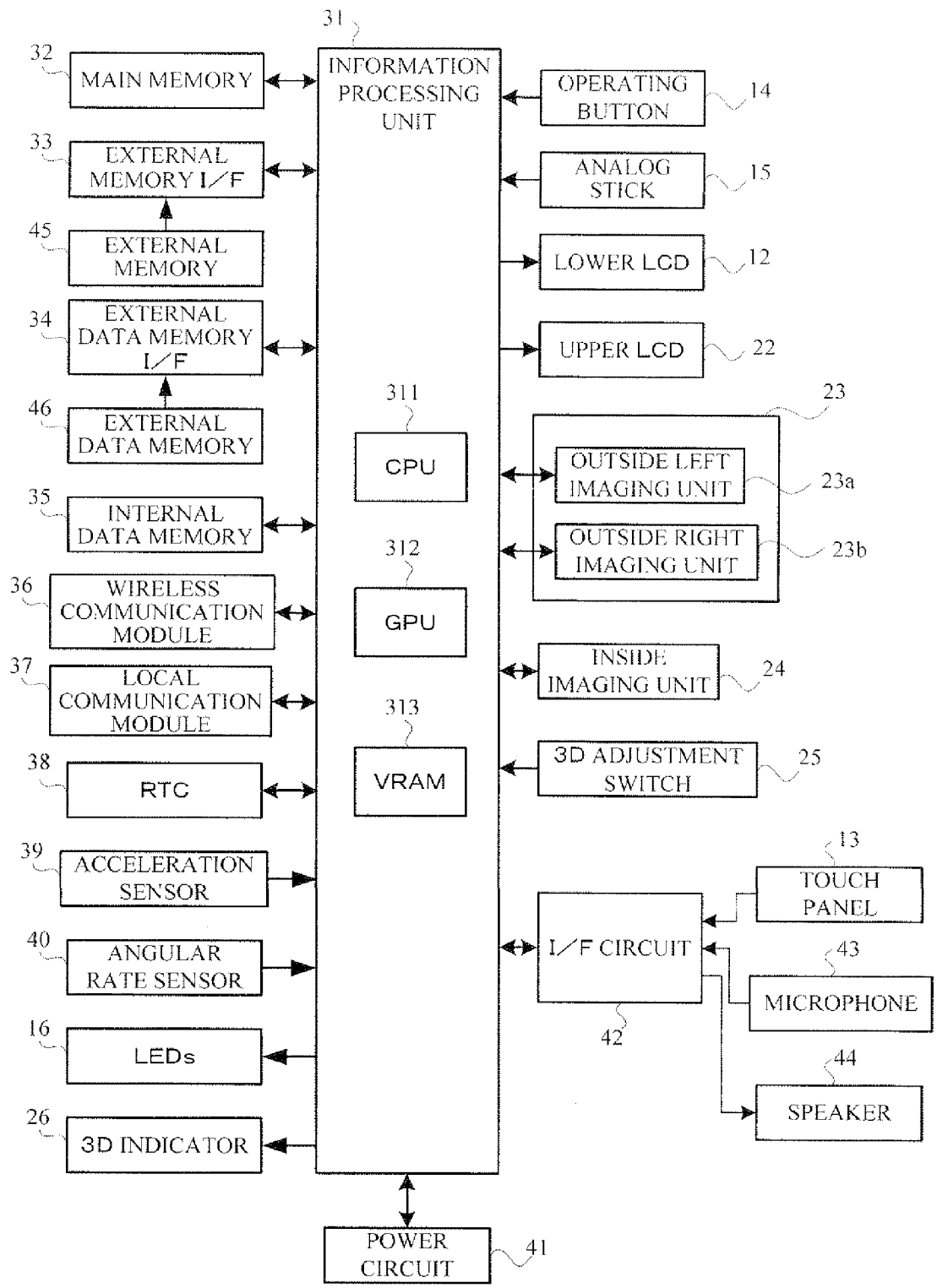
FIG. 6 is a block diagram showing an example of the internal composition of a game device which is one example of a device that executes an image processing program according to the present embodiment.

FIG. 6 is a block diagram showing one example of the internal composition of the game device 10. The game device 10 comprises, in addition to the constituent parts described above, electronic components, such as an information processing unit 31, a main memory 32, an external memory interface (external memory I/F) 33, an external data memory I/F 34, an internal data memory 35, a wireless communication module 36, a local communication module 37, a real-time clock (RTC) 38, an acceleration sensor 39, an angular rate sensor 40, a power supply circuit 41 and an interface circuit (I/F circuit) 42, and the like. These electronic components are mounted on an electronic circuit board and are accommodated inside the lower housing 11 (or inside the upper housing 21).

The information processing unit 31 is information processing means comprising a CPU (Central Processing Unit) 311 for executing a predetermined program and a CPU (Graphics Processing Unit) 312 for performing image processing, or the like. In the first embodiment, the predetermined program is stored in a memory inside the game device 10 (for example, an external memory 45 connected to the external memory I/F 33 or the internal data memory 35). The CPU 311 of the information processing unit 31 executes image processing and game processing as described below, by executing the predetermined program. The program executed by the CPU 311 of the information processing unit 31 may be acquired from another device by means of communication with the other device. Furthermore, the information processing unit 31 includes a VRAM (Video RAM) 313. The GPU 312 of the information processing unit 31 generates an image in accordance with a command from the CPU 311 of the information processing unit 31 and renders the image in the VRAM 313. The GPU 312 of the information processing unit 31 outputs the image rendered in the VRAM 313 to the upper LCD 22 and/or the lower LCD 12, and this image is displayed on the upper LCD 22 and/or the lower LCD 12.

The main memory 32, external memory I/F 33, external data memory I/F 34, and internal data memory 35 are connected to the information processing unit 31. The external memory I/F 33 is an interface for detachably connecting the external memory 45. Furthermore, the external data memory I/F 34 is an interface for detachably connecting the external data memory 46.

The main memory 32 is volatile storage means which is used as a work area or buffer area of the information processing unit 31 (CPU 311). In other words, the main memory 32 temporarily stores various data used in image processing and game processing, and temporarily stores a program acquired from an external source (the external memory 45, another device, or the like). In the first embodiment, a PSRAM (Pseudo-SRAM), for example, is used as the main memory 32.

The external memory 45 is non-volatile storage means for storing a program which is executed by the information processing unit 31. The external memory 45 is composed by a read-only semiconductor memory, for example. When the external memory 45 is connected to the external memory I/F 33, the information processing unit 31 is able to read a program stored in the external memory 45. Predetermined processing is carried out by executing the program read in by the information processing unit 31. The external data memory 46 is constituted by a non-volatile rewriteable memory (for example, a NAND type flash memory), and is used to store predetermined data. For example, images captured by the outside imaging unit 23 or images captured by another device are stored in the external data memory 46. When the external data memory 46 connected to the external data memory I/F 34, the information processing unit 31 is able to read in images stored in the external data memory 46 and display the images on the upper LCD 22 and/or the lower LCD 12.

The internal data memory 35 is constituted by a non-volatile rewriteable memory (for example, a NAND type flash memory), and is used to store predetermined data. For example, data and programs downloaded by wireless communication via the wireless communication module 36 are stored in the internal data memory 35.

The wireless communication module 36 has a function of connecting to a wireless LAN by a method conforming to the IEEE 802.11b/g standard, for example. Furthermore, the local communication module 37 has a function of performing wireless communication with a game device of the same type, by means of a predetermined communication method (for example, infrared communication). The wireless communication module 36 and the local communication module 37 are connected to the information processing unit 31. The information processing unit 31 can use the wireless communication module 36 to send and receive data to and from other devices via the Internet, and can use the local communication module 37 to send and receive data to and from other game devices of the same type.

The acceleration sensor 39 is connected to the information processing unit 31. The acceleration sensor 39 determines the magnitude of acceleration (linear acceleration) in linear directions following three axial directions (in the present embodiment, the xyz axes). The acceleration sensor 39 is provided inside the lower housing 11, for example. As shown in FIG. 1, the acceleration sensor 39 respectively determines the magnitude of the linear acceleration of the game device 10 produced in each axial direction, taking the x axis to be the long edge direction of the lower housing 11, taking the y axis to be the short edge direction of the lower housing 11, and taking the z axis to be direction perpendicular to the inner surface (main surface) of the lower housing 11. The acceleration sensor 39 is, for instance, an electrostatic capacitance type of acceleration sensor, but it is also possible to use an acceleration sensor based on another method. Furthermore, the acceleration sensor 39 may also be an acceleration sensor which determines acceleration in one axial direction or two axial directions. The information processing unit 31 receives data indicating the acceleration as determined by the acceleration sensor 39 (acceleration data), and calculates the attitude and movement of the game device 10.

The angular rate sensor 40 is connected to the information processing unit 31. The angular rate sensor 40 respectively determines the angular velocity produced about the three axes of the game device 10 (in the present embodiment, the xyz axes), and outputs data indicating the determined angular velocities (angular velocity data) to the information processing unit 31. The angular rate sensor 40 is provided inside the lower housing 11, for example. The information processing unit 31 receives angular velocity data output from the angular rate sensor 40 and calculates the attitude and movement of the game device 10.

The RTC 38 and power supply circuit 41 are connected to the information processing unit 31. The RTC 38 outputs a time count to the information processing unit 31. The information processing unit 31 calculates a current time (and date) on the basis of the time measured by the RTC 38. The power supply circuit 41 controls the power from the power source of the game device 10 (the rechargeable battery accommodated in the lower housing 11) and supplies power to the respective components of the game device 10.

The I/F circuit 42 is connected to the information processing unit 31. The microphone 43, speakers 44 and touch panel 13 are connected to the I/F circuit 42. More specifically, the speakers 44 are connected to the I/F circuit 42 via an amplifier which is not illustrated. The microphone 43 detects the user's voice and outputs an audio signal to the I/F circuit 42. The amplifier amplifies the audio signal from the I/F circuit 42, and outputs sound to the speakers 44. The I/F circuit 42 comprises an audio control, circuit which controls the microphone 43 and the speakers 44 (amplifier), and a touch panel control circuit which controls the touch panel 13. The audio control circuit performs A/D conversion and D/A conversion of the audio signal, or converts the audio signal to audio data of a predetermined format. The touch panel control circuit generates touch position data of a predetermined format on the basis of a signal from the touch panel 13 and outputs the touch position data to the information processing unit 31. The touch position data indicates the coordinates of a position where an input has been made (touch position) on the input surface of the touch, panel 13. The touch panel control circuit reads in a signal from the touch panel 13 and generates touch position data at a rate of once every predetermined time period. The information processing unit 31 can identify the touch position where input has been made on the touch panel 13, by acquiring the touch position data.

The operating buttons 14 include the operating buttons 14A to 14L mentioned above, and are connected to the information processing unit 31. Operating data indicating the input status of the respective operating buttons 14A to 14I (whether or not the button is pressed) is output to the information processing unit 31 from the operating buttons 14. The information processing unit 31 executes processing in accordance with the inputs to the operating buttons 14, by acquiring operating data from the operating buttons 14.

The lower LCD 12 and the upper LCD 22 are connected to the information processing unit 31. The lower LCD 12 and the upper LCD 22 display images in accordance with instructions from the information processing unit 31 (GPU 312). In the first embodiment, the information processing unit 31 causes an image for a handwritten image input operation to be displayed on the lower LCD 12, and causes an image acquired by either the outside imaging unit 23 or the inside imaging unit 24 to be displayed on the upper LCD 22. In other words, the information processing unit 31 causes a stereo image (a stereoscopically viewable image) using a right-eye image and a left-eye image captured by the outside imaging unit 23 to be displayed on the upper LCD 22, or causes a planar image captured by the inside imaging unit 24 to be displayed on the upper LCD 22, or causes a planar image using one of the right-eye image and the left-eye image captured by the outside imaging unit 23 to be displayed on the upper LCD 22.

More specifically, the information processing unit 31 is connected to an LCD controller (not illustrated) of the upper LCD 22, and controls the on/off switching of the parallax barrier in the LCD controller. If the parallax barrier of the upper LCD 22 is switched on, then the right-eye image and the left-eye image stored in the VRAM 313 of the information processing unit 31 (images captured by the outside imaging unit 23) are output to the upper LCD 22. More specifically, the LCD controller reads out a right-eye image and a left-eye image from the VRAM 313 by alternately repeating a process of reading out pixel data for one line in the vertical direction in respect of the right-eye image and a process of reading out pixel data for one line in the vertical direction in respect of the left-eye image. By this means, the right-eye image and the left-eye image are divided into strip-shaped images in which pixels are aligned vertically for each line, and an image formed by alternately arranging the divided strip-shaped images of the right-eye image and strip-shaped images of the left-eye image is displayed on the screen of the upper. LCD 22. When this image is viewed by the user via the parallax barrier of the upper LCD 22, the right-eye image is viewed by the user's right eye and the left-eye image is viewed by the user's left eye. By this means, a stereoscopically viewable image is displayed on the screen of the upper LCD 22.

The outside imaging unit 23 and the inside imaging unit 24 are connected to the information processing unit 31. The outside imaging unit 23 and the inside imaging unit 24 capture images in accordance with an instruction from the information processing unit 31, and output captured image data to the information processing unit 31. In the first embodiment, an imaging instruction is issued to either one of the outside imaging unit 23 and the inside imaging unit 24, and the imaging unit receiving the imaging instruction captures an image and sends image data to the information processing unit 31. More specifically, an imaging unit to be used is selected an operation performed by the user via the touch panel 13 or the operating buttons 14. The information processing unit 31 (CPU 311) detects that an imaging unit has been selected and duly issues an imaging instruction to the outside imaging unit 23 or the inside imaging unit 24.

When the outside imaging unit 23 or the inside imaging unit 24 is started up by an instruction from the information processing unit 31 (CPU 311), imaging is performed at a rate of 60 frames per second, for example. The images captured by the outside imaging unit 23 or the inside imaging unit 24 are successively supplied to the information processing unit 31, and displayed on the upper LCD 22 or the lower LCD 12 by the information processing unit 31 (GPU 312). When the captured images are output to the information processing unit 31, the images are stored in the VRAM 313 and output to the upper LCD 22 or the lower LCD 12, and then deleted at a predetermined timing. By capturing images at a rate of 60 frames per second, for example, and displaying the captured images, the game device 10 can display the scene in the imaging range of the outside imaging unit 23 and the inside imaging unit 24, in real time, on the upper LCD 22 or the lower LCD 12.

The 3D adjustment switch 25 is connected to the information processing unit 31. The 3D adjustment switch 25 sends an electric signal corresponding to the position of the slider to the information processing unit 31.

The 3D indicator 26 is connected to the information processing unit 31. The information processing unit 31 controls the lighting up of the 3D indicator 26. For example, if the upper LCD 22 is in stereoscopic display mode, then the information processing unit 31 causes the 3D indicator 26 to light up.

§2 DISPLAY MODE EXAMPLES RELATING TO THE EMBODIMENT

Next, before describing a specific image processing operation performed by the image processing program which is executed by the game device 10, examples of the display mode displayed on the upper LCD 22 by the image processing operation are described with reference to FIGS. 7A, 7B, 8 to 13, 14A, 14B and 15. In order to simplify the description of the display mode examples, a game program is given as one example of an image processing program relating to the present embodiment which is executed by the game device 10. The image processing operation and display mode examples of the image processing program relating to the present embodiment are described as processes in a game. However, as stated previously, the image processing program of the present invention is not particularly limited to being a game program.

<Overview of Game>

Firstly, an overview of a game which a player can play by means of the game device 10 executing a game program in the present embodiment is described. The game according to the present embodiment is a so-called shooting game in which the player is the main protagonist of the game and shoots down enemy characters which appear in a virtual three-dimensional space provided as a game world. The virtual three-dimensional space forming the game world (virtual space, also called game space) is displayed from the player's viewpoint (a so-called subjective viewpoint), on the display screen (for example, the upper LCD 22) of the game device 10. Of course, an objective viewpoint may also be adopted. Points are added, when the player shoots down an enemy character. If, on the other hand, the enemy character and the player collide (more specifically, if the enemy character comes within a predetermined distance of the position of the virtual camera), then points are deducted.

Furthermore, the game according to the present embodiment synthesizes and displays an image of the real world (hereinafter, called a "real world image") acquired by the imaging units provided in the game device 10, and a virtual world image which represents a virtual space (corresponding to the "virtual image" relating to the present invention). More specifically, the virtual space is divided into a region near to the virtual camera (hereinafter, called the "near side region") and a region distant from the virtual camera (hereinafter, called the "far side region"); an image representing a virtual object situated in the near side region is displayed on the near side of a real world image, and a virtual object situated in the far side region is displayed behind the real world image. More specifically, as described below, a virtual object situated in the near side region is synthesized preferentially over the real world image, and the real world image is synthesized preferentially over a virtual object situated in the far side region.

Any method may be employed to synthesize the real world image and the virtual world images. For example, a real world image may be situated as an object in the same virtual space as a virtual object (more specifically, attached as a texture of the virtual object), and the real world image rendered together with the virtual object by a common virtual camera.

Furthermore, in another example, the real world image is captured and rendered by a first virtual camera (hereinafter, called a real world rendering camera) to form a first rendered image, a virtual object is captured and rendered by a second virtual camera (hereinafter, called a virtual world rendering camera) to form a second rendered image, and the first rendered image and the second rendered image are synthesized in such a manner that a virtual object situated in the near side region has priority over the real world image, and the real world image has priority over a virtual object situated in the far side region.

In the former method, typically, an object which uses a real world image as texture (hereinafter, this object is called a screen object) is disposed in a position on the boundary between the near side region and the far side region, and can be imaged together with a virtual object, such as an enemy character, by a common virtual camera. In this case, typically, the object to which the real world image is attached is an object at a predetermined distance from the virtual camera, which has a surface of which the normal coincides with the imaging direction of the virtual camera, and the real world image can be attached as texture onto this surface (which is called the "boundary surface" below).

Furthermore, in the latter method, the second rendered image described above is obtained by rendering a virtual object while judging the depth (by a Z buffer) in relation to the boundary surface between the near side region and the far side region (hereinafter, simply called the boundary surface), and the first rendered image described above is obtained by attaching a real world image as texture onto a surface at a predetermined distance from the virtual camera, which has a normal coinciding with the imaging direction of the virtual camera. If the second rendered image is synthesized preferentially over the first rendered image, then the real world image appears to be situated on the boundary surface in the synthesized image.

In either of these methods, the relationship between the distance from the virtual camera, the angle of view, and the size of the real world image object (the size in the imaging direction) are set in such a manner that the real world image is covered by the range of vision of the virtual camera.

Below, the former method is called a first rendering method and the latter method is called a second rendering method.

Furthermore, if a predetermined event condition is satisfied in the game, then a portion of the real world image is opened and a virtual space in the far side region is displayed so as to be visible through this opening. Furthermore, an enemy character object is situated in the near side region and a special enemy character (a so-called "boss character") appears in the far side region if a predetermined condition is satisfied. By shooting down the boss character, a stage of the game is cleared. Several stages are prepared and when all of the stages are cleared, the player has cleared the game. On the other hand, if predetermined game over conditions are satisfied, then the game is over.

In a typical example of the first rendering method described above, data indicating the position of the opening in the real world image may be set on the boundary surface of the screen object. More specifically, an opening may be displayed or not displayed depending on the opacity of the texture (so-called α texture) which is used at the boundary surface. Furthermore, to the second rendering method, it is possible to set data indicating the position of an opening in the boundary surface.

Moreover, in the present embodiment, the presence or absence of an opening is set in respect of the real world image, but it is also possible to apply other image processing to the real world image. For example, it is also possible to apply desired image processing based on specialist technical knowledge, such as applying a soiling or blurring process to the real world image. In these examples, it is possible to set data indicating a position where image processing is applied to the boundary surface.

<Game World>

In this way, in a game relating to the present embodiment, a player is made to feel that a virtual space (far side region) exists behind the real image, and hence there is an increased sense of depth in the virtual space represented by the game screen. The real world image may be a normal image as captured by a single-eye camera or a stereo image as captured by a compound-eye camera.

In the game relating to the present embodiment, an image captured by the outside imaging unit 23 is used as the real world image. More specifically, the real world image peripheral to the player which is captured by the outside imaging unit 23 during game play (a moving image of the real world acquired in real time) is used. Consequently, if the user (game player) who is holding the game device 10 changes the imaging range of the outside imaging unit 23 by changing the orientation of the game device 10 in the left/right direction or the up/down direction, then the real world image displayed on the upper LCD 22 is also changed in accordance with the change in the imaging range.

Here, broadly speaking, the orientation of the game device 10 during game play is changed in accordance with either (1) the player's intentions and (2) the intention (scenario) of the game. When the player intentionally changes the orientation of the game device 10 during play, the real world image captured by the outside imaging unit 23 changes, and hence the player can intentionally change the real world image displayed on the upper LCD 22 in this way.

Furthermore, change in the orientation of the game device 10 is determined by the angular rate sensor 40 provided in the game device 10, and the orientation of the virtual camera is changed accordingly. More specifically, the virtual camera is changed from the current orientation in the direction of change of the orientation of the outside imaging unit 23. Moreover, the virtual camera is changed from the current orientation by the amount of change (angle) in the orientation of the outside imaging unit 23. More specifically, the orientation of the game device 10 is changed, the real world image is changed, and the displayed range of the virtual space is changed. In other words, by changing the orientation of the game device 10, the real world image and the virtual world image change in a coordinated fashion, and therefore it is possible to display a synthesized image just as if the real world and virtual world are related. In the present embodiment, the position of the virtual camera does not change, but it is also possible to change the position of the virtual camera by detecting movement of the game device 10.

In the second rendering method, processing of this kind for changing the orientation of the virtual camera is applied to the virtual world rendering camera and is not applied to the real world rendering camera.

Furthermore, when an object is displayed at a location such as an edge of the screen (for example, the right-hand edge or the left-hand edge) during game play, then the player naturally wishes to move the object to the center of the screen, and the player moves the game device 10 (outside imaging unit 23). As a result of this, the real world image displayed on the screen is changed. It is possible to make the player carryout this change in the orientation of the game device 10 (real world image change) naturally by means of programming which causes an object displayed in accordance with the game scenario to be intentionally displayed at the edge of the screen.

<Details of Virtual Space>
(Rendering of Real World Image)

Figure 7A:
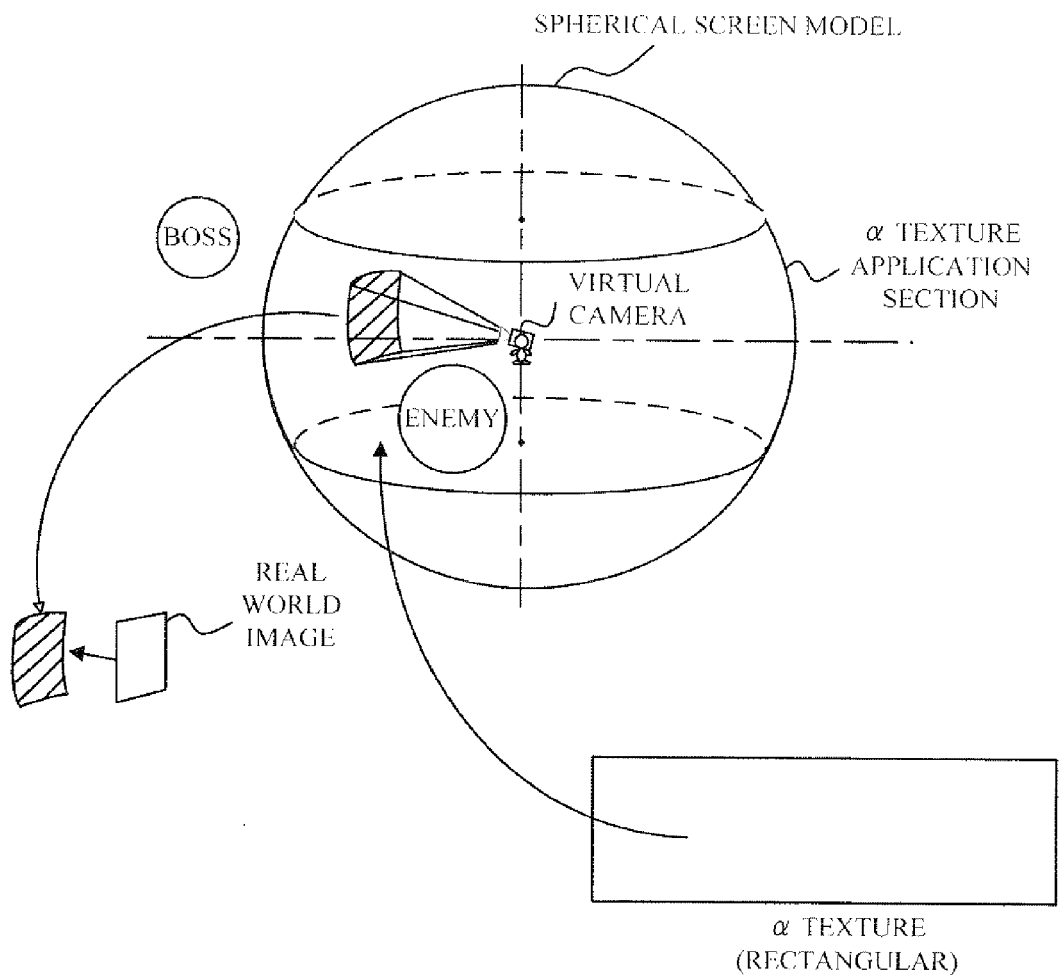
FIG. 7A is a diagram showing an overview of a virtual space which is one example of an image processing program according to an embodiment of the invention.
Figure 7B:
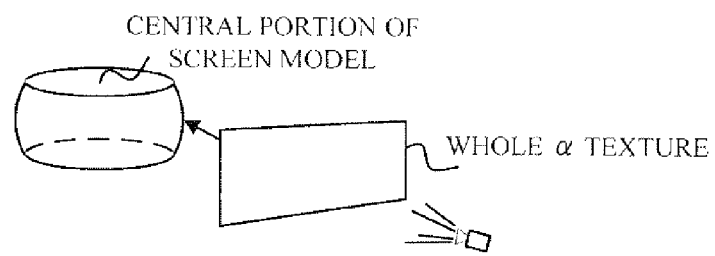
FIG. 7B is a diagram showing a relationship between a screen model and α texture in an embodiment of the invention.

The real world image captured by the outside imaging unit 23 is synthesized so as to appear to be situated at the boundary position between the near side region and the far side region of the virtual space. FIG. 7A shows one example of a virtual space according to the present embodiment. Furthermore, FIG. 7B shows a relationship between a screen model and α texture in the present embodiment. In the first rendering method, in order to display a real world image, a spherical model (the aforementioned screen model) which is centered on the position of the virtual camera can be set in the virtual space, as shown in FIG. 7A, and a real world image can be attached to the inner surface of this sphere so as to form a screen object. More specifically, the real world image is attached as texture to the whole of the portion of the screen model that is imaged by the virtual camera. The area of the screen model apart from this portion is set to be transparent and therefore is not visible on the screen. In this example, the boundary surface is a spherical surface; more specifically, as shown in FIG. 7A, the side toward the virtual camera from the surface of the sphere is the near side region (corresponding to the "second region" of the present invention), and the side beyond the surface of the sphere as viewed from the virtual camera is the far side region (corresponding to the "first region" of the present invention).

In the second rendering method, in order to display a real world image, a planar polygon for attaching texture of the real world image is disposed inside the virtual space. In this virtual space, the relative position of the planar polygon with respect the real world rendering camera is fixed at all times. In other words, the planar polygon is disposed at a predetermined distance from the real world rendering camera and in such a manner that the normal direction of the polygon coincides with the viewpoint (visual axis) of the real world rendering camera.

Furthermore, this planar polygon is set so as to encompass the range of vision of the real world rendering camera. More specifically, the size of the planar polygon and the distance thereof from the virtual camera are set in such a manner that the planar polygon can encompass the range of vision of the virtual camera. Since a real world image is attached to the whole surface of the planar polygon on the virtual camera side, then when the planar polygon to which the real world image has been attached is imaged by the virtual camera, the real world image is displayed so as to correspond to the whole area of the image generated by the virtual camera.

Figure 8:
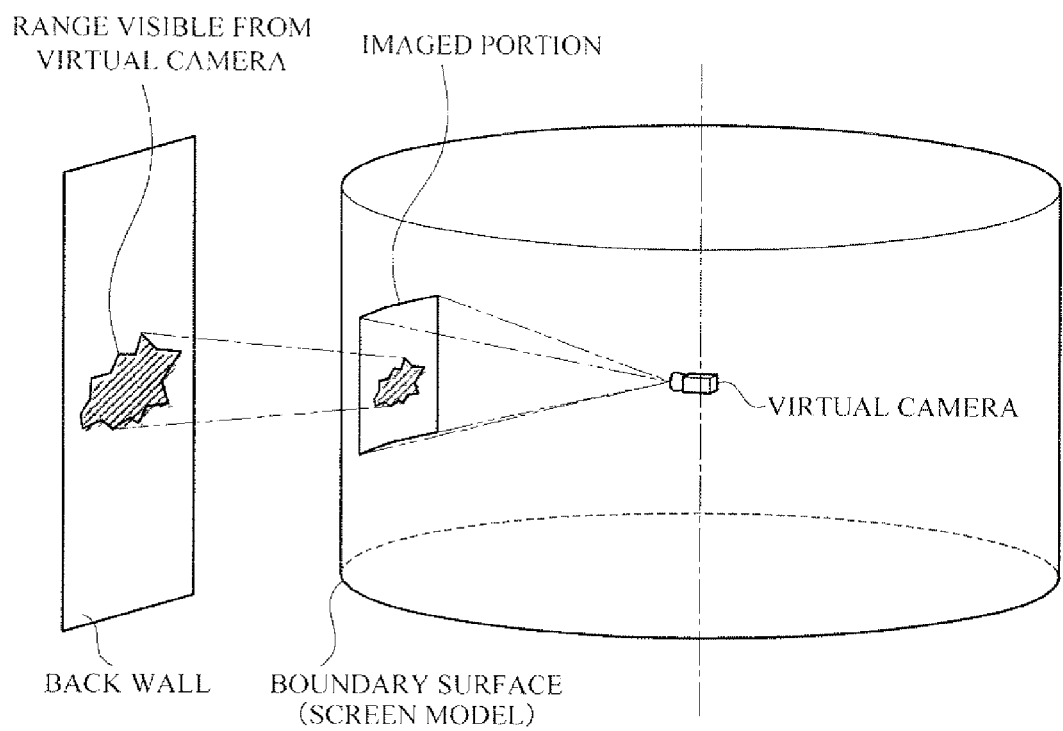
FIG. 8 is a diagram showing an overview of a virtual space which is one example of an image processing program according to an embodiment of the invention.

As shown in FIG. 8, the boundary surface may also have a round cylindrical shape. FIG. 8 shows a further example of a virtual space in the present embodiment. In this case, a virtual round cylindrical surface (boundary surface) having a central axis which is a vertical axis passing through the position of the virtual camera (in the present embodiment, the Y axis of the virtual space corresponds to the vertical direction and the X axis and the Z axis correspond to horizontal directions) is disposed in the virtual space. However, as stated above, the round cylindrical surface is not an object that is viewed, but rather an object used for processing an opening. The outer circumferential surface of this round cylinder divides the virtual space into a first space where the virtual camera is positioned (corresponding to the "second region" of the present invention) and a second space situated about the periphery of the first space (corresponding to the "first region" of the present invention).

(Processing for Opening the Real World Image)

Moreover, in a game relating to the present embodiment, an opening is provided in the real world image and the player is made aware of the existence of a far side region behind the real world image. To be more precise, the opening portion of the real world image is displayed as transparent or semi-transparent and the world behind this opening portion is synthesized with the opening portion. Consequently, a portion of the real world image is opened (erased) whenever a predetermined event occurs in the game, and an image showing another virtual space (far side region) which exists behind the real world image is displayed via this opening. Furthermore, a virtual object is present in the rear side region behind the real world image, and depending on the position of the virtual object and the position of the opening, the virtual object may be hidden by the real world image, or an image of the virtual object may be shown via the opening. By this means, it is possible to present the user with an image in which a virtual object is present behind the real world image.

In the present embodiment, the boundary surface is a spherical surface and in the first rendering method, processing of this kind for displaying the far side region by providing an opening in the real world image is realized by means of texture attached to the inner surface of the spherical screen object described above, as shown in FIG. 7A and FIG. 7B. Below, this texture is called the screen α texture (the opening judgment data described below). In the present embodiment, the screen α texture is attached to a portion rotated through 360° in at least one direction about the virtual camera. More specifically, as shown in FIG. 7B, the screen α texture is attached to the central portion of the sphere, in other words, to a portion having a predetermined width in the Y direction which is rotated through 360° in a direction parallel to the XY plane about the position of the virtual camera (below this position is called the "α texture application section"). By adopting this composition, it is possible to simplify the handling of the screen α texture. More specifically, in the present embodiment, the screen α texture has a rectangular shape. By attaching this α texture to the portion shown in FIG. 7A, the information for each dot of the screen α texture corresponds to respective coordinates of the α texture application section of the screen object.

As described above, by attaching a real world image and capturing an image of the screen object on which α texture has been set, with the virtual camera, a real world image laving an opening is rendered so as to be situated on the boundary surface (the inner surface of a sphere). The portion of the α texture corresponding to the real world image is calculated by imaging by the virtual camera.

In the second rendering method, data indicating the position of the opening is set on the boundary surface of the virtual space (here, the inner surface of a sphere). Typically, data is set to indicate the presence or absence of an opening at each point of the boundary surface. More specifically, a spherical object similar to that described above is arranged in the virtual world where a virtual object is present, and a similar α texture is set for this spherical object. When rendering the real world image, the α texture of the portion corresponding to the portion imaged by the virtual world rendering camera, of the spherical object on which the α texture has been set, is rendered by application to the planar polygon described above. Alternatively, after using the α texture of this portion to carry out processing for making the opening in the real world image transparent, the real world image thus processed is attached to the planar polygon described above and rendered by the real world rendering camera. This spherical object is an object which is used only for calculating an opening, and is not rendered when rendering the virtual world.

In the present embodiment, the data indicating the opening is data including information for each point of the boundary surface, but the data may also be information which defines a position of an opening in the boundary surface by a calculation formula.

A polygon (object) is disposed in the second space in order to attach a background image (texture) of the second space which comes within the field of view of the virtual camera via the opening. The background of the second space may also be called a "back wall".

Objects are disposed in the first space in order to show an enemy character and various characters depicting bullets for shooting down the enemy character. Predetermined objects (for example, a portion of enemy characters) are also disposed in the second space. Each of the objects arranged in the virtual, space move within the virtual space in accordance with a previously programmed logic (algorithm).

Moreover, a portion of the enemy characters can move between the first space and the second space via an opening formed in the boundary surface. Alternatively, the enemy characters can move between the first space and the second space by themselves forming an opening in the boundary surface. A predetermined event in the game for forming an opening is, for example, an event (collision event) in which an enemy character collides with the boundary surface. Alternatively, there are events in which the boundary surface is broken down at a predetermined timing during the progress of the game scenario, and an enemy character which was situated in the second space advances into the first space (enemy character appearance event). As another alternative, is also possible for an opening to be formed automatically depending on the elapsed time. Furthermore, it is possible to repair the opening in accordance with a predetermined game operation by the player. For example, it is possible to make the opening smaller (repair the opening), by firing bullets at the opening that has been formed.

Figure 9:
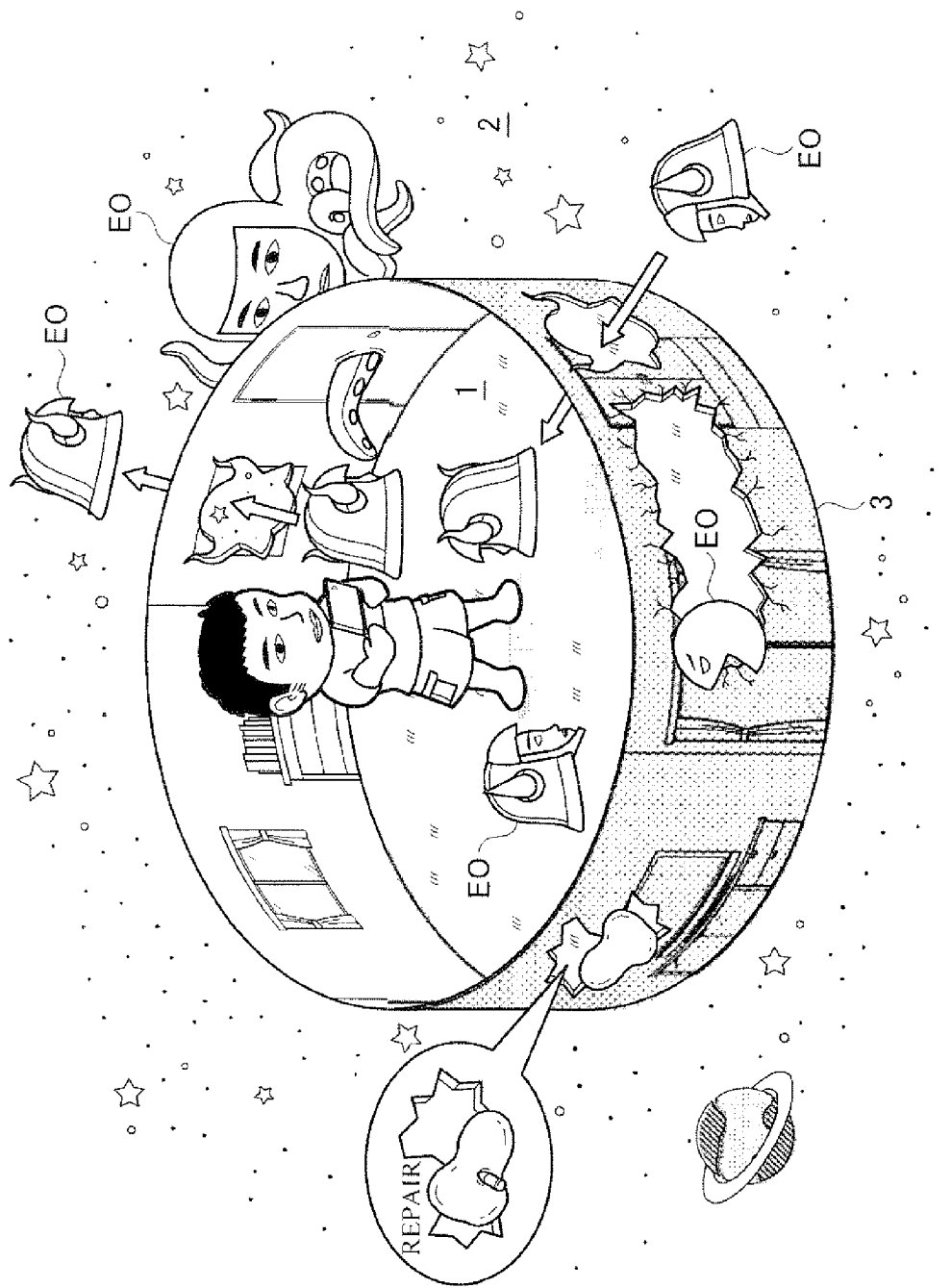
FIG. 9 is a diagram showing a virtual three-dimensional space (game world) which is defined in a game program, the game program being one example of an image processing program in an embodiment of the invention.

FIG. 9 shows a virtual three-dimensional space (game world) which is defined in a game program, as one example of an image processing program according to an embodiment of the invention. As described above, in the present embodiment, the boundary surface is spherical, but in FIG. 9, the boundary surface is depicted as having a round cylindrical shape for the purpose of simplification. As described above, in the game relating to the present embodiment, a virtual world image representing a virtual three-dimensional space and a real world image are synthesized and displayed on the upper LCD 22 of the game device 10.

Furthermore, as shown in FIG. 9, the virtual space in the game according to the present embodiment is divided into a first space 1 and a second space 2 by a boundary surface 3 formed by a spherical surface having a central axis passing through the position of a virtual camera.

At the boundary surface 3, a camera image CI (FIG. 10), which is a real world image captured by a real camera built into the game device 10, is synthesized with a virtual world image so as to be situated at the position of the boundary surface 3, by the processing in steps 81 and 82 described below in the first rendering method and by the processing in steps 83 to 85 described below in the second rendering method.

The real world image according to the present embodiment is a planar view image. Furthermore, the virtual world image is also a planar view image. More specifically, a planar view image is displayed on the LCD 22. However, the real world image may also be a stereoscopically viewable image. The present invention is not limited in, terms of the type of real world image. The camera image CI in the present embodiment may be a still image or a real-time real world image (moving image). In the game program according to the present embodiment, the camera image CI is a real-time real world image. Furthermore, the camera image CI which is a real world image is not limited in terms of the type of camera. For example, the camera image CI may be an image obtained by a camera which can be connected externally to the game device 10. Moreover, in the present embodiment, the camera image CI may be an image acquired from one of the outside imaging unit 23 (compound-eye camera) or the inside imaging unit 24 (single-eye camera). In the game program according to the present embodiment, the camera image CI is an image acquired by using one of the outside left imaging unit 23*a* and the outside right imaging unit 23*b* of the outside imaging unit 23 as a single-eye camera.

As described above, the first space 1 is a space to the forward side of the boundary surface 3 as viewed from the virtual camera, which is enclosed by the boundary surface 3. Furthermore, the second space 2 is a space to the rear side of the boundary surface 3 as viewed from the virtual camera. Although not shown in FIG. 7A and FIG. 8, there is a back wall BW enclosing the boundary surface 3. In other words, the second space 2 is a space located between the boundary surface 3 and the black wall BW. A desired image is attached to the back wall BW. For example, a previously prepared image representing outer space is attached to the back wall BW, and the presence of a second space, which is an outer space area, is displayed behind the first space. More specifically, the first space, the boundary surface 3, the second space and the back wall are arranged in sequence from the front side as viewed from the virtual camera.

As stated above, the image processing program according to the present invention is not limited to a game program, and these settings and rules do not limit the image processing program of the present invention. As shown in FIG. 9, enemy objects EO move in a virtual three-dimensional space and are able to move back and forth between the first space 1 and the second space 2 by passing through the boundary surface 3 described above. When an enemy object EO has moved between the first space 1 and the second space 2 by passing through a region of the boundary surface 3 which is imaged by the virtual camera, in the image displayed on the LCD 22, the enemy object EO is shown as breaking through the real world image and moving from the far side to the near side, or from the near side to the far side.

Figure 11:
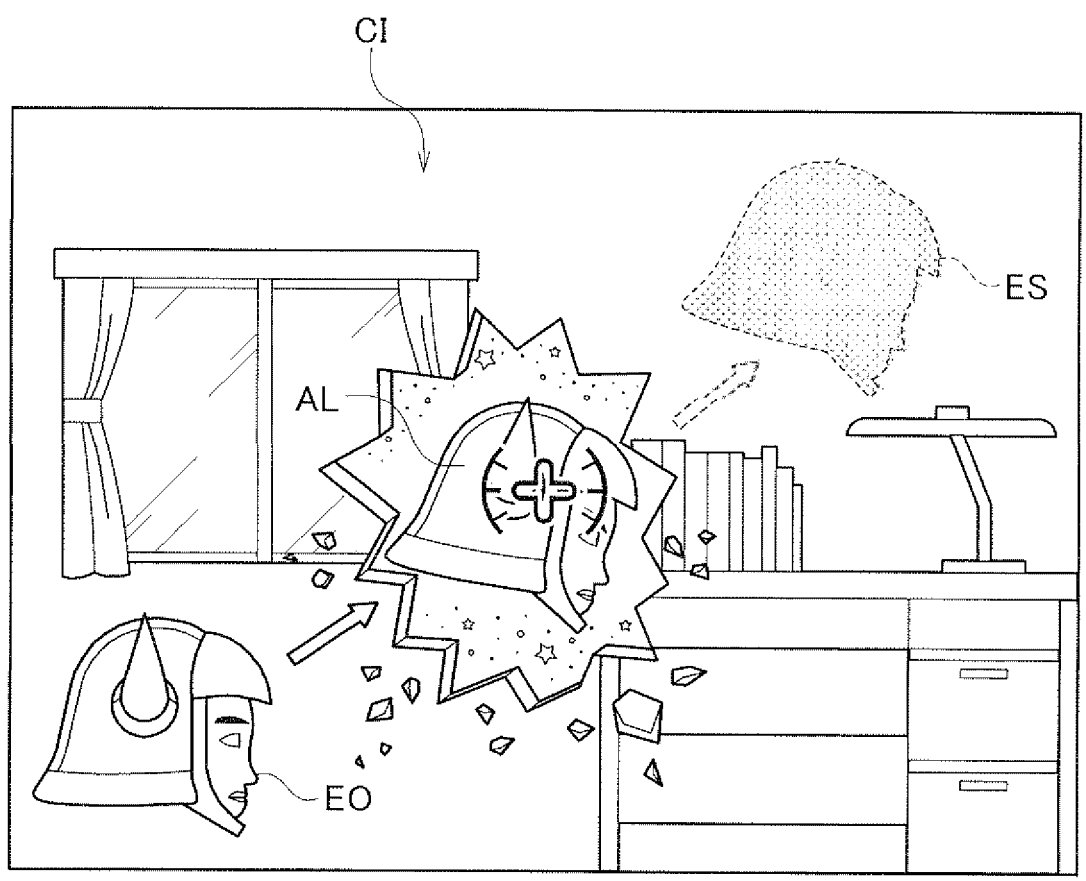
FIG. 11 is a diagram showing one example of respective processing stages of a display mode example displayed on an upper LCD of a game device, which is one example of a device that executes an image processing program according to the present embodiment.

The aspect of the enemy object EO moving back and forth between the first space 1 and the second space 2 is displayed on the screen by using an opening (hole) which has been produced in the real world image by the game scenario or by an event. FIG. 9 and FIG. 11 show an aspect where an enemy object EO moves back and forth between the first space 1 and the second space 2 by creating an opening in the boundary surface 3 or by passing through an opening already present in the boundary surface 3.

In the image processing program according to the present embodiment, there are three types of object present in the first space 1 or the second space 2, namely, enemy objects EO, bullet objects BO, and a back wall BW, but the image processing program according to the present invention is not limited in terms of the type of objects. In the image processing program according to the present embodiment, an object is a virtual object which is present in the virtual space (the first space 1 and the second space 2). For example, in the image processing program according to the present embodiment, it is also possible for any desired object, such as an obstacle object, to be present.

<Display Mode Examples>

FIG. 10 to FIG. 13 show examples of a game screen displayed on the upper LCD 22. Below, the display mode examples shown in each of these drawings are described.

Firstly, a pointing cursor AL which is displayed in each one of FIG. 10 to FIG. 13 will be described. In each of FIG. 10 to FIG. 13, a pointing cursor AL of a bullet object BO which is fired in accordance with an attack operation using the game device 10 for example, pressing the button 14B (A button)) is displayed on the upper LCD 22. In the game program according to the present embodiment, the pointing cursor AL is set so as to face in a predetermined direction in accordance with the program which is executed by the game device 10.

For example, the pointing cursor AL is set so as to be fixed in the line of sight direction of the virtual camera, in other words, in the center of the screen on the upper LCD 22. In this case, as described above, in the present embodiment, the direction of imaging of the virtual camera (the virtual camera in the first rendering method or the virtual world rendering camera in the second rendering method) changes in accordance with change in the direction of imaging of the outside imaging unit 23, and therefore the player changes the orientation of the pointing cursor AL in the virtual space by changing the orientation of the game device 10. The player then performs an attack operation by pressing the button 14B (A button) provided on the game device 10 with the thumb of his or her right hand, which is gripping the lower housing 11. By this means, the player fires a bullet object BO by performing the attack operation, and defeats the enemy object EO in the game according to present embodiment, or repairs the opening present in the boundary surface 3.

Next, each drawing in FIG. 10 to FIG. 13 is described separately.

Figure 10:
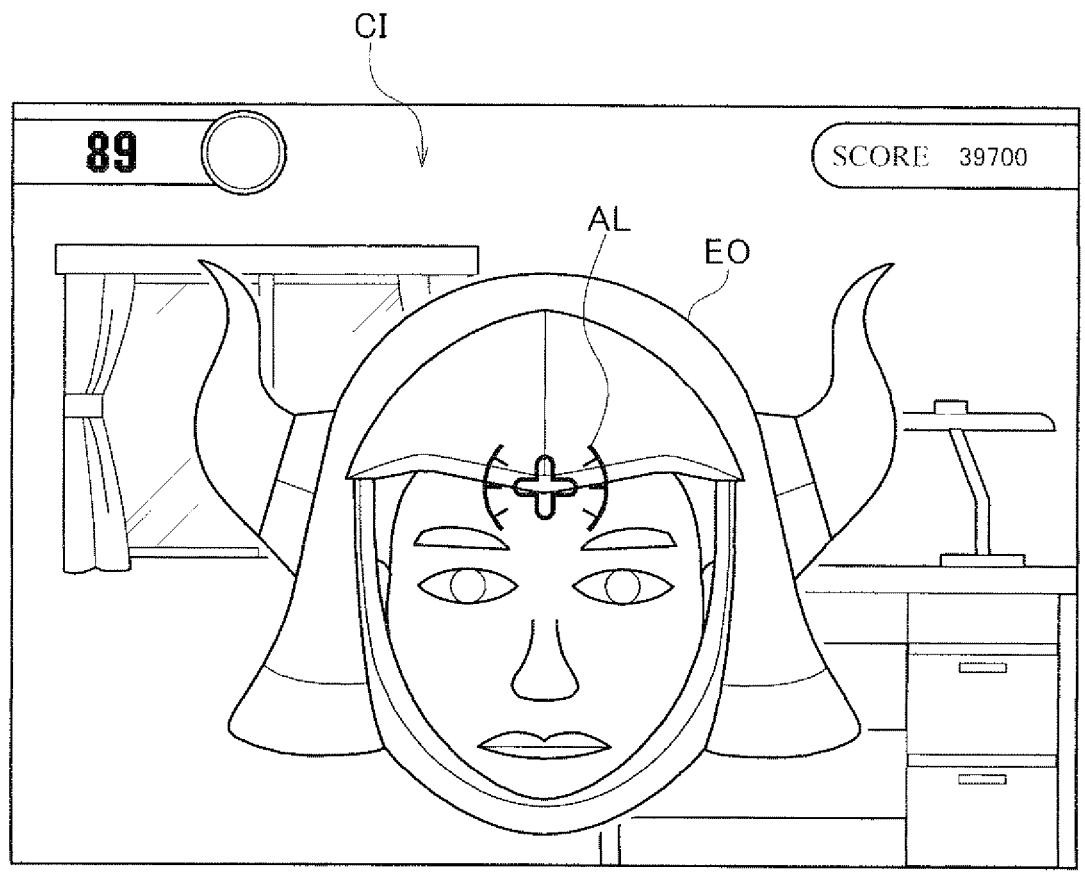
FIG. 10 is a diagram showing one example of respective processing stages of a display mode example displayed on an upper LCD of a game device, which is one example of a device that executes an image processing program according to the present embodiment.

In FIG. 10, an enemy object EO which is present in the first space 1 and a camera image CI captured by a real camera built into the game device 10 are displayed on the upper LCD 22. The enemy object EO is set to a desired object.

The enemy object EO is an object which, for example, is created by attaching, in a predetermined method, an image (for example, a photograph of a human face) stored in the external data memory 46 of the game device 10, or the like, as texture, to a three-dimensional polygon model of a predetermined shape (a polygon model representing the three-dimensional shape of a human head).

Furthermore, in the present embodiment, the camera image CI shown on the upper LCD 22 is a real world image which is captured in real time by a real camera built into the game device 10, as stated above. Apart from this, the camera image CI may also be, for example, an image (such as photograph of scenery) stored in the external data memory 46 of the game device 10, or the like.

Figure 14A:
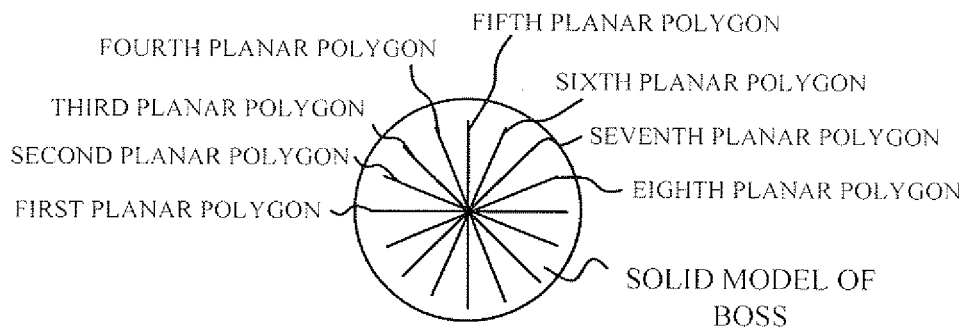
FIG. 14A is a diagram showing one example of a silhouette model of a shadow object, as viewed from above.
Figure 14B:
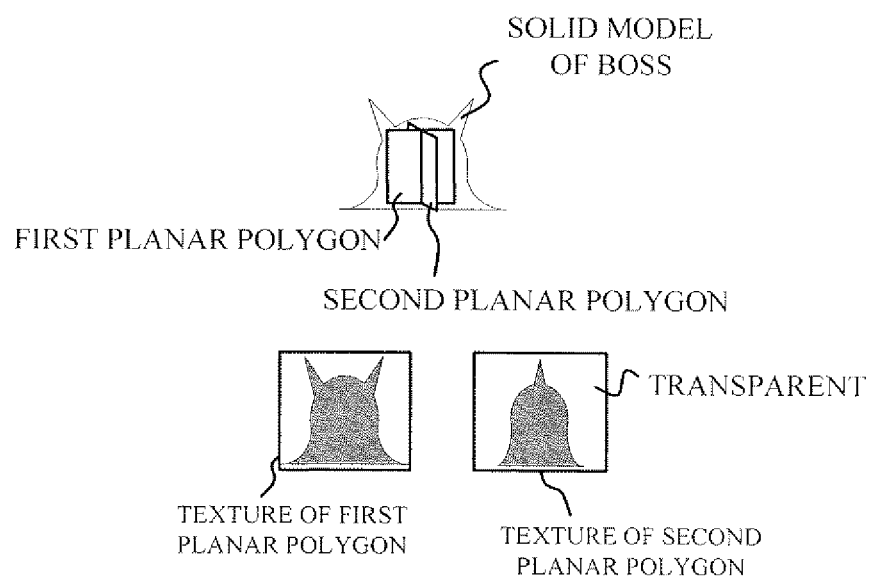
FIG. 14B is a diagram showing one example of a silhouette model of a shadow object.

The enemy object EO may move in any fashion when the camera image CI is displayed on the upper LCD 22. For example, an enemy object EO present in the first space 1 can move to the second space 2. FIG. 11 shows one example of an aspect where an enemy object EO present in the first space 1 is moving from the first space 1 to the second space 2. In the example shown in FIG. 11, the enemy object EO) present in the first space 1 creates an opening in the boundary surface 3 and moves to the second space 2. In the non-open region of the boundary surface 3, the enemy object EO which has moved to the second space 2 is displayed as a shadow (silhouette model) ES at the position viewed by the virtual camera. Furthermore, the second space 2 is viewed through the opening in the boundary surface 3. In other words, when there is an opening in the boundary surface 3 in the field of view of the virtual camera, then a portion of the image of the second space 2 is displayed via the opening on the upper LCD 22. More specifically, the image of the second space 2 is of objects that are present in the second space 2, for example, an enemy object EO which present in the second space 2 and the back wall BW. The shadow ES is a display which depicts a shadow of an enemy object EO. FIG. 14A shows a diagram of a silhouette model of the shadow of an enemy object EO as viewed from above. Furthermore, FIG. 14B shows an example of a silhouette model of the shadow of an enemy object EO. As shown in FIG. 14A and FIG. 14B, in the present embodiment, a silhouette model is set in relation to an enemy object EO, for each of a plurality of orientations. More specifically, the silhouette model comprises, for example, the eight planar polygons shown in FIG. 14A. This silhouette model (eight planar polygons) is arranged at the same position as the enemy object EO, which is a solid model. Since the silhouette model is arranged in an integrated fashion with the enemy object EO in the virtual space, then when the enemy object EO is moved inside the virtual space, for example, the silhouette model moves so as to follow the enemy object EO. Furthermore, the respective planar polygons are of a size which is contained within the solid model (the polygons do not project beyond the solid model). Moreover, a texture is attached to each planar polygon, and this texture depicts a shadow image of the enemy object EO as viewed from the normal direction of the polygon surface. If the enemy object EO is situated behind a non-open region of the boundary surface 3, then a shadow ES is displayed by rendering this silhouette model.

Figure 12:
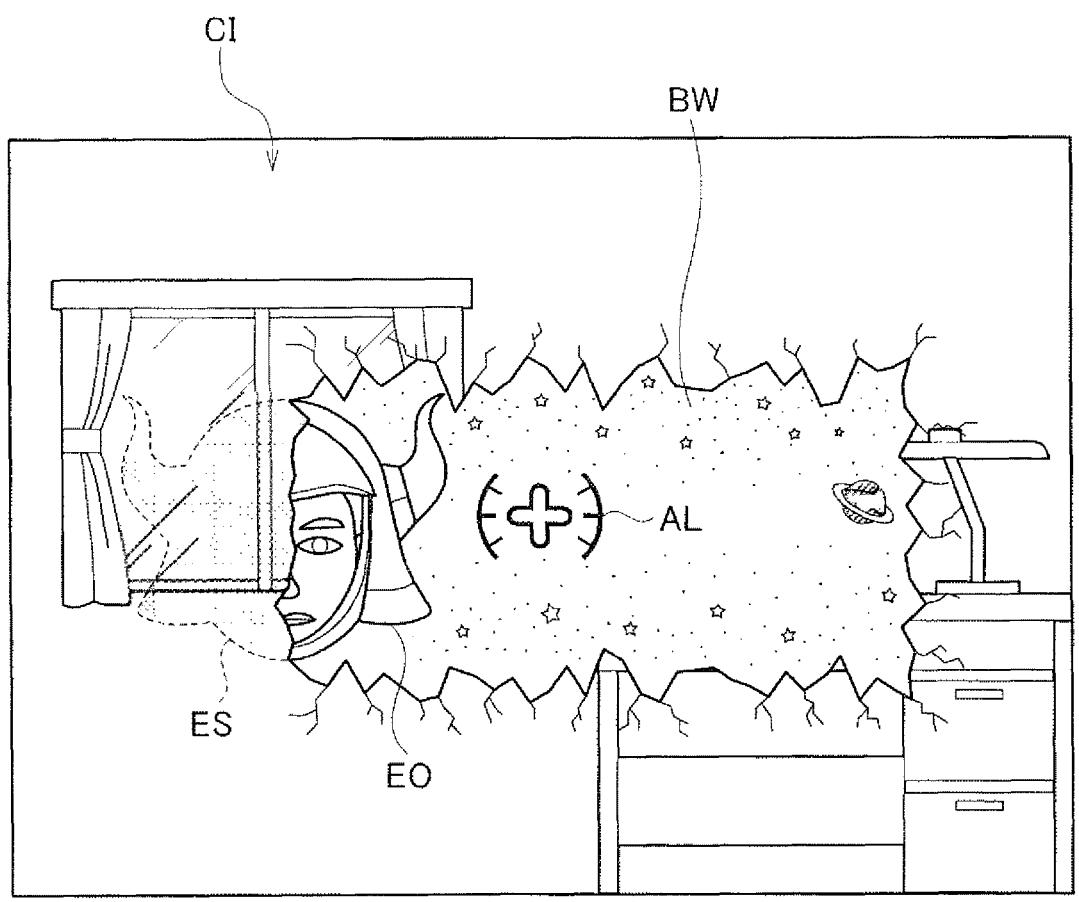
FIG. 12 is a diagram showing one example of respective processing stages of a display mode example displayed on an upper LCD of a game device, which is one example of a device that executes an image processing program according to the present embodiment.

All of the eight planar polygons are rendered. If an enemy object EO is situated behind the non-open region of the boundary surface, then on the basis of depth judgment, a solid model of the enemy object EO is not depicted since it is hidden by the boundary surface (screen object). However, since a silhouette model is set in such a manner that depth judgment is not carried out in respect of the boundary surface (screen object), then even if an enemy object EO (and a silhouette model thereof) is situated behind the non-open region of the boundary surface, the silhouette model is rendered and a shadow is displayed as shown in FIG. 11 or FIG. 12. However, if the enemy object EO is situated in front of the boundary surface, or is situated behind the open region of the boundary surface, then the silhouette model is located behind the solid model, the solid model of the enemy object EO is rendered, and therefore the silhouette model is not rendered and the shadow is not displayed. This is because the silhouette model is set so as to be encompassed by the solid model of the enemy object EO.

Images are synthesized in the following order of priority and displayed on the upper LCD 22.

(1) An image of an object present in the first space 1.

(2) A synthesized image of a real world image and a shadow image of an object present in the second space 2, in the non-open region of the real world image (for example, the shadow image is semi-transparent and is synthesized with the real world image).

(3) In the open region of the real world image, an image of an object present in the second space 2 (solid image) is synthesized preferentially and a back wall image is synthesized behind this image.

However, depending on the imaging direction of the virtual camera and the position within the virtual space of the enemy object EO situated in the second space 2, there are scenes where the enemy object EO is situated so as to span between the open region and the non-open region. In other words, there are scenes where the enemy object EO is present at the edge of the opening, in the position viewed from the virtual camera. FIG. 12 shows a state where an enemy object EO present in the second space 2 has moved to the edge of an opening set on the boundary surface 3. As shown in FIG. 12, in the range where the second space 2 can be viewed via the opening as seen from the virtual camera, the image of the enemy object EO present in the second space 2 is displayed directly on the upper LCD 22, and in the range where the second space 2 cannot be viewed via the opening, a shadow ES of the enemy object EO is displayed on the upper LCD More specifically, as shown in, FIG. 15, data indicating the opacity (alpha value) is set for each object. FIG. 15 shows an example of the opacity (alpha value) set for each object in the present embodiment. An opacity of 1 is set for the texture of the whole solid model of the enemy object. Furthermore, an opacity of 1 is set for the texture of the whole shadow image of the silhouette model (planar polygon) of the enemy object. The same applies to the bullet model. An opacity of 0.6 is set for the texture of, for example, the whole model of an enemy object which is a semi-transparent object model or an effect model. An opacity of 0.2 is set as material for a screen object (the spherical screen model shown in FIG. 7A), and a value of 1 or 0 is set for each point of the α texture which is the texture of the screen object. 1 indicates a non-open section and 0 indicates an open section. More specifically, two opacity value settings are made for the screen object: a material setting and a texture setting.

Furthermore, depth judgment is enabled between an enemy object, a bullet object, a semi-transparent enemy object, an effect object and a screen object. Depth judgment is enabled "between a shadow planar polygon and an enemy object", "between a shadow planar polygon and a bullet object", "between a shadow planar polygon and a semi transparent enemy object", and "between a shadow planar polygon and an effect object". Depth judgment is disabled between a shadow planar polygon and a screen object.

If the depth judgment is enabled, then rendering is performed in accordance with a normal perspective projection. Hidden surfaces are removed in accordance with the depth in the view direction of the virtual camera. If depth judgment is disabled, then an object can be rendered even if there is another object situated nearer to the virtual camera than that object.

In the present embodiment, during rendering, it is possible to set a rendering formula for each object. More specifically, a rendering formula is set as indicated below.

A solid enemy object, a bullet object, a semi-transparent enemy object, and an effect object are rendered by the following formula.

"Object color×object opacity+background color×(1−object opacity)"

A screen object is rendered by the following formula.

"Object color(color of real world image)×object texture opacity+background color×(1−object texture opacity)"

A silhouette model of an enemy object is rendered by the following formula.

"Object color×(1−background material opacity)+background color×background material opacity"

When an enemy object is rendered, the background is a screen object (boundary surface 3), and therefore in the formula above, "background material opacity" means the "opacity of the material of the screen object (boundary surface 3)".

By means of the various settings described above, when an enemy object is present behind a non-open portion of the boundary surface, a solid object is not displayed and a shadow is shown, whereas when an enemy object is present in front of the boundary surface or when an enemy object is present in the opening of the boundary surface, a shadow is not displayed and a solid object is shown.

Figure 13:
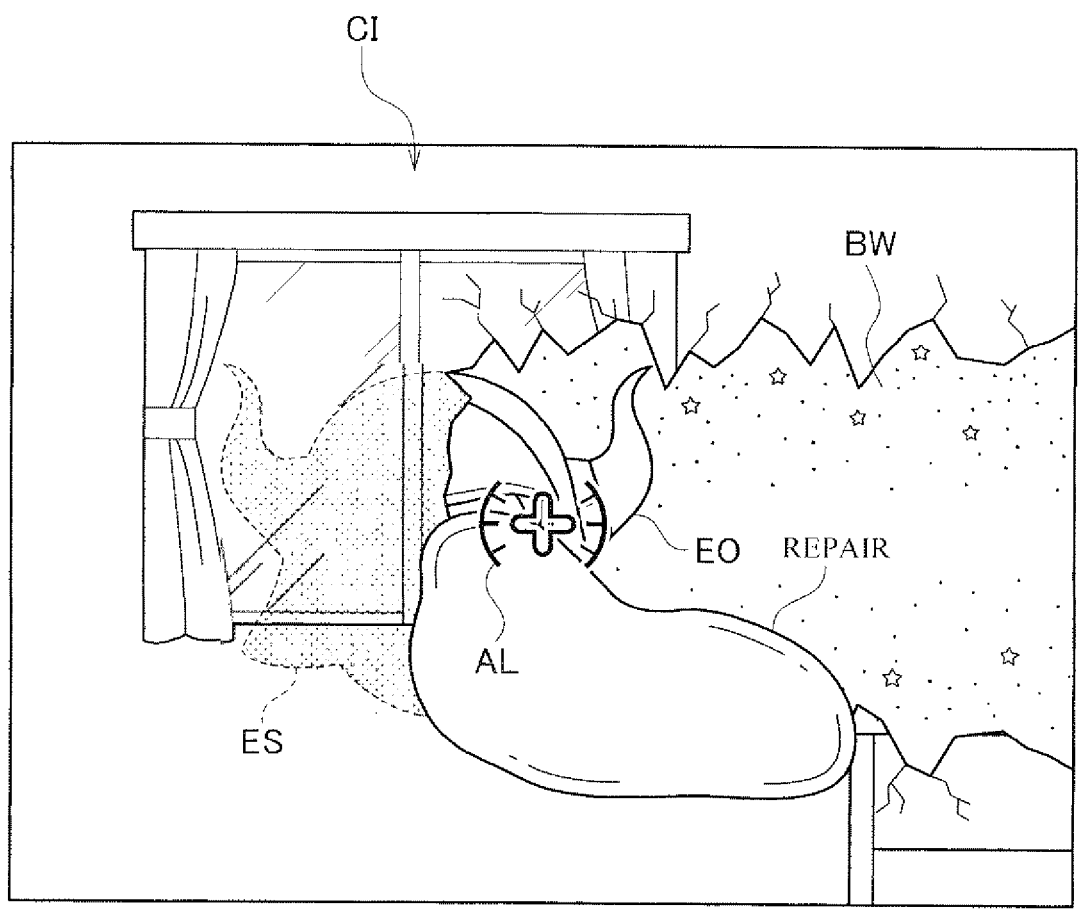
FIG. 13 is a diagram showing one example of respective processing stages of a display mode example displayed on an upper LCD of a game device, which is one example of a device that executes an image processing program according to the present embodiment.

Furthermore, in the game according to the present embodiment, the opening which exists in the boundary surface 3 can be repaired by firing a bullet object BO at the opening. FIG. 13 shows a state of closing up an opening in the boundary surface 3 by firing a bullet object BO at the opening. As shown in FIG. 13, if a bullet object BO strikes a non-open region on the boundary surface 3, then non-open data is set for the boundary surface in a predetermined range from the point of impact. By this means, if there was an opening within the predetermined range from the point of impact, then that opening is closed. In the present embodiment, a bullet object BO which strikes an opening is lost (and therefore, the bullet object BO has disappeared in FIG. 13). Furthermore, when a bullet object BO has struck an opening in the boundary surface 3, then the bullet object passes through the opening and moves into the second space.

As described above, a real world image captured in real time by a real camera built into the game device 10 is displayed on the upper LCD 22 as an image which appears to be located on the boundary surface 3. By changing the direction of the game device 10 within the real space, the imaging range captured by the game device 10 is changed, and therefore the camera image CI displayed on the upper LCD 22 also changes. In this case, the game device 10 changes the direction of the aforementioned virtual camera in the aforementioned virtual space in the second rendering method, the virtual world rendering camera), in accordance with the movement of the game device 10 within the real space. By this means, an enemy object EO shown as if disposed in a real space and/or an opening present in the boundary surface 3 are displayed as if disposed at the same position in the real space, even if the direction of the game device 10 changes in the real space. For example, it is supposed that the imaging direction of the real camera of the game device 10 is changed toward the left. In this case, the display positions of the enemy object EO and the opening in the boundary surface 3 which are shown on the upper LCD 22 move in the opposite direction (rightwards) to the direction in which the imaging direction of the real camera is changed, in other words, the direction of the virtual camera (in the second rendering method, the virtual world rendering camera) in the virtual space where the enemy object EO and the opening in the boundary surface 3 are arranged moves in the same leftward direction as the real camera. Consequently, even if the direction of the game device 10 is changed and the imaging range of the real camera is changed, the enemy object EO and the opening in the boundary surface 3 are displayed on the upper LCD 22 just as if they were situated in the real space represented by the camera image CI.

§3 EXAMPLES OF IMAGE PROCESSING OPERATION

Figure 16:
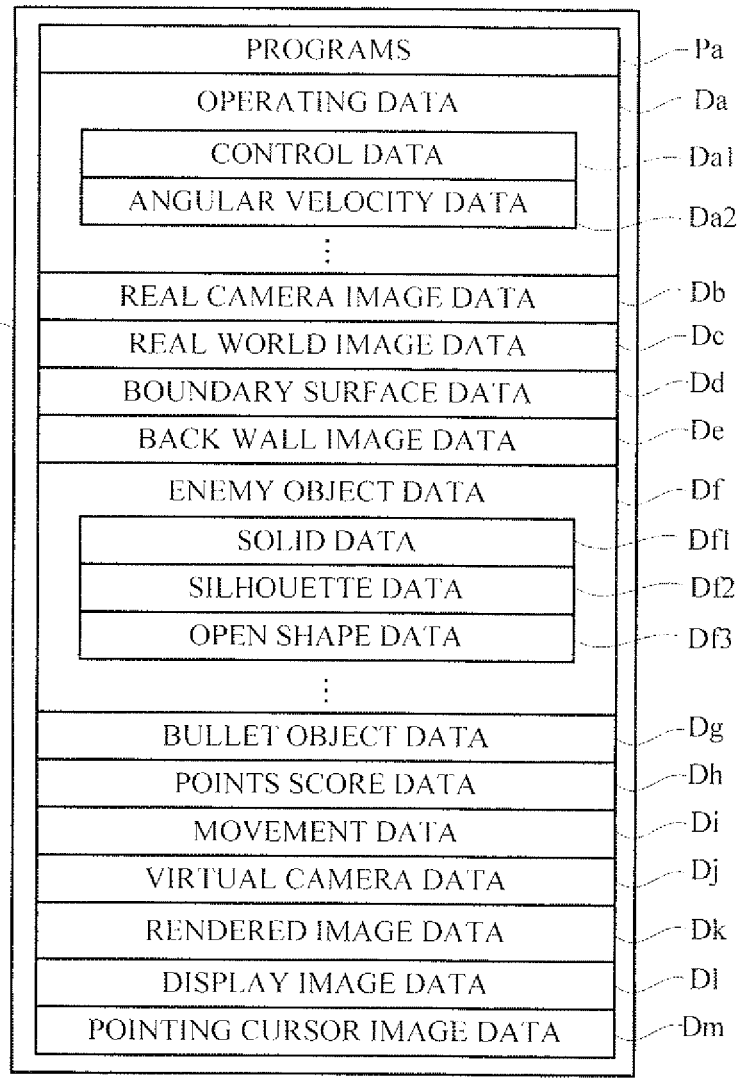
FIG. 16 is a diagram showing one example of various data stored in a main memory in accordance with the execution of an image processing program according to the present embodiment by the game device in FIG. 1.
Figure 17:
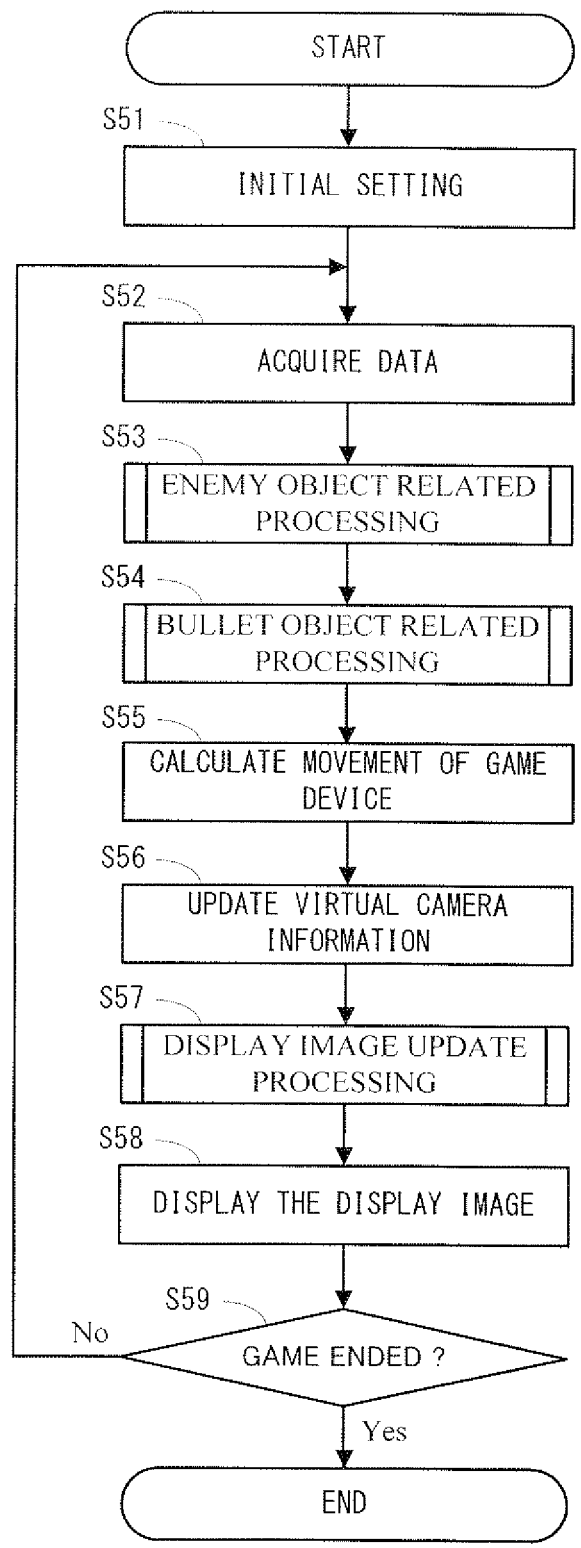
FIG. 17 is a flowchart showing one example of an image processing operation performed by the game device in FIG. 1 due to the game device executing an image processing program according to the present embodiment.
Figure 18:
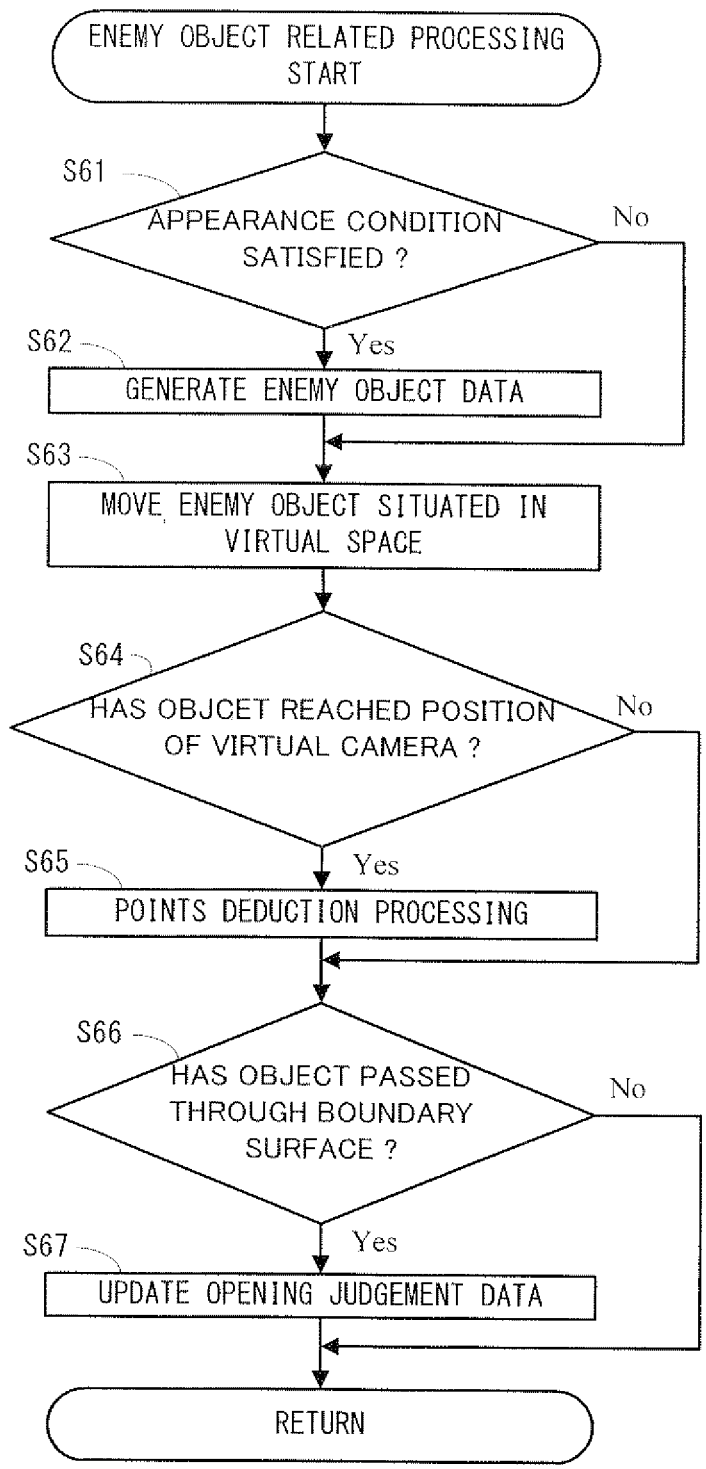
FIG. 18 is a flowchart of a sub-routine showing one example of a detailed operation of enemy object related processing in an image processing program according to the present embodiment.
Figure 19:
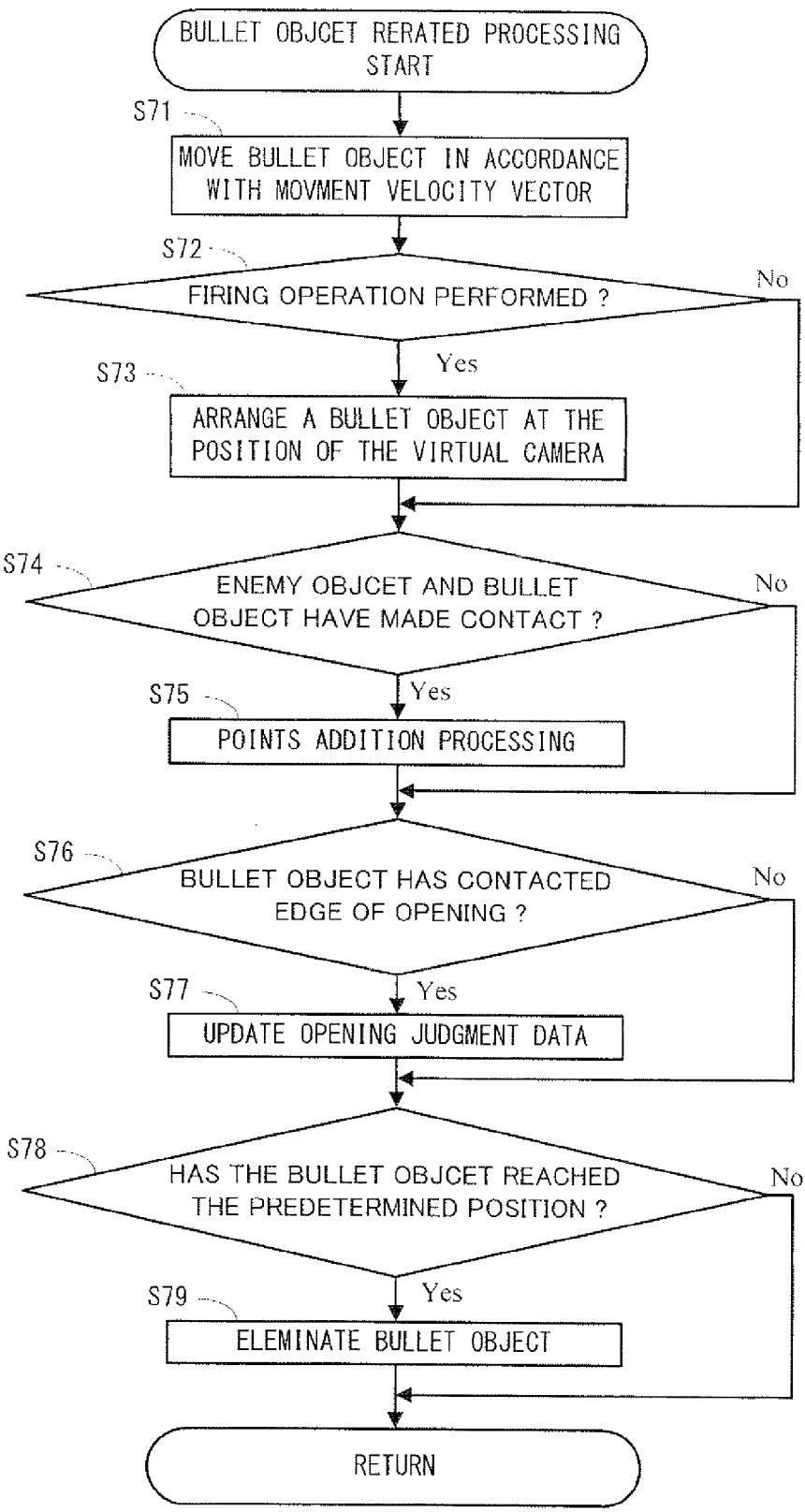
FIG. 19 is a flowchart of a sub-routine showing one example of a detailed operation of bullet object related processing in an image processing program according to the present embodiment.
Figure 20A:
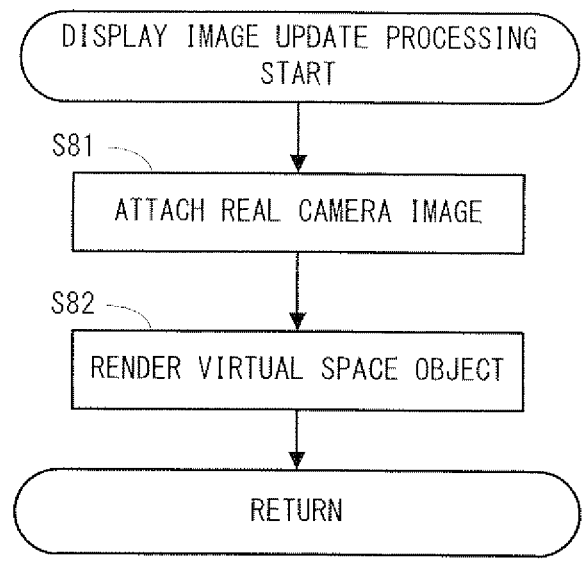
FIG. 20A is a flowchart of a sub-routine showing one example of a detailed operation of update processing (first rendering method) of a display image in an image processing program according to the present embodiment.
Figure 20B:
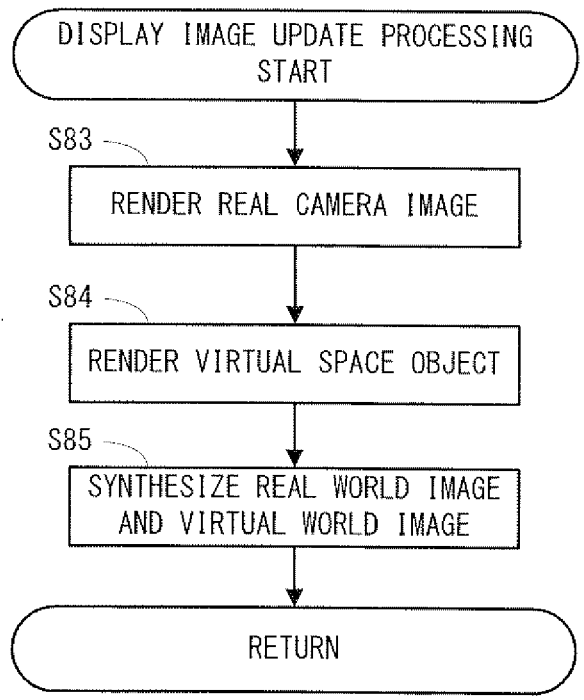
FIG. 20B is a flowchart of a sub-routine showing one example of a detailed operation of update processing (second rendering method) of a display image in an image processing program according the present embodiment.

Next, concrete examples of an image processing operation performed by the image processing program according to the present embodiment which is executed by the game device 10 are described with reference to FIG. 16 to FIG. 19, FIG. 20A and FIG. 20B. FIG. 16 shows one example of various data stored in the main memory 32 in accordance with the execution of the image processing program. FIG. 17 is a flowchart showing one example of an image processing operation performed by the game device 10 as a result of executing the image processing program. FIG. 18 is a flowchart of a sub-routine showing one example of the detailed operation of enemy object related processing carried out in step 53 in FIG. 17. FIG. 19 is a flowchart of a subroutine showing one example of the detailed operation of bullet object related processing carried out in step 54 in FIG. 17. FIG. 20A and FIG. 20B are flowcharts of a sub-routine showing one example of the detailed operation of display image update processing (the first rendering method and the second rendering method) which is carried out in step 57 in FIG. 17.

A program for executing these processes is included in a memory built into the game device 10 (for example, the internal data memory 35), the external memory 45, or the external data memory 46, and when the power supply to the game device 10 is switched on, the program is read out to the main memory 32 from the built-in memory, or from the external memory 45 or the external data memory 46 via the external memory I/F 33 or the external data memory I/F 34, and the program is executed by the CPU 311.

§3-1 Examples of Various Data

In FIG. 16, a program read out from the internal memory, the external memory 45 or the external data memory 46, and temporary data generated during image processing, are stored in the main memory 32. In FIG. 16, a data storage region of the main memory 32 stores operating data Da, real camera image data Db, real world image data Dc, boundary surface data Dd, back wall image data De, enemy object data Df, bullet object data Dg, points score data Dh, movement data Di, virtual camera data Dj, rendered image data Dk, display image data Dl, and the like. Furthermore, a group Pa of various programs which constitute the image processing program are stored in the program storage region of the main memory 32.

<Operating Data Da>

The operating data Da is data indicating operating information produced by the user operating the game device 10. The operating data Da includes control data Da1 and angular rate data Da2. The control data Da1 is data indicating that the user has operated a control, such as an operating button 14 or the analog stick 15 of the game device 10. The angular rate data Da2 is data indicating the angular velocity determined by the angular rate sensor 40. For example, the angular rate data Da2 includes x-axis-centered angle rate data which indicates an angular velocity about the x-axis, y-axis-centered angle rate data which indicates an angular velocity about the y-axis, and z-axis-centered angle rate data which indicates an angular velocity about the z-axis, as determined by the angle rate sensor 40. For example, the operating data from the operating buttons 14 and the analog stick 15 and the angular rate data from the angular rate sensor 40 are acquired in the time units at which the game device 10 carries out processing (for example, 1/60 seconds) and are stored and updated in the control data Da1 and the angular rate data Da2 in accordance with this data acquisition process.

In the processing flow described, below, an example is given in which the control data Da1 and the angular rate data Da2 are respectively updated every frame, which is the processing period, but the data may also be updated on the basis of another processing period. For example, a mode is possible in which control data Da1 is updated each time it is detected that the user has operated a control, such as an operating button 14 or the analog stick 15, or the like, and this updated control data Da1 is used at each processing period. Furthermore, it is also possible to adopt a mode in which the angular rate data Da2 is updated at each angular rate detection period of the angular rate sensor 40, and this updated angular rate data Da2 is used at each processing period. In this case, the respective periods at which the control data Da1 and the angular rate data Da2 are updated differ from the processing period.

<Real Camera Image Data Db>

The real camera image data Db is data indicating a real camera image which has been captured by either the outside imaging unit 23 or the inside imaging unit 24. In the description of the processing given below, a mode is used in which the real camera image data Db is updated by using a real camera image captured by either one of the outside imaging unit 23 and the inside imaging unit 24 in the step of acquiring the real camera image. The period at which the outside imaging unit 23 or the inside imaging unit 24 captures an image and the real camera image data Db is updated using the captured real camera image may be same as the unit processing time in the game device 10 (for example, 1/60 seconds) or may be shorter than the unit processing time. If the period at which the real camera image data Db is updated is shorter than the processing period in the game device 10, then the real camera image data Db may be updated as appropriate, independently of the processing described below. In this case, in the step of acquiring real camera image described below, processing should always be carried out using the most recent real camera image which is indicated by the real camera image data Db. Below, in the present embodiment, the real camera image data Db is data indicating a real camera image which has been captured by the outside imaging unit 23 (for example, the outside left imaging unit 23a).

<Real World Image Data Dc>

The real world image data Dc is data for generating a real world image which appears to be situated on the boundary surface 3, using the real camera image captured by the real camera (the outside imaging unit 23 or the inside imaging unit 24) of the game device 10. In the first rendering method, for example, the real world image data Dc includes texture data of a real camera image in order to attach a real world image to the boundary surface (a screen object in the display range of the virtual camera). Moreover, in the second rendering method, for example, the real world image data Dc includes planar polygon data for generating a real world image, texture data of a real camera image for mapping to the planar polygon, data indicating the position of the planar polygon in the virtual space (the position from the real world rendering camera described above), and the like.

<Boundary Surface Data Dd>

The boundary surface data Dd is data for generating a real world image which appears to be situated on the boundary surface 3, in combination with the real world image data Dc. In the first rendering method, for example, the boundary surface data Dd is data relating to a screen object, and includes opening judgment data (corresponding to the α texture data described above) which indicates the state (for example, whether or not there is an opening) of each point constituting the boundary surface 3, data indicating the arrangement position of the boundary surface 3 in the virtual space (the coordinates of the boundary surface 3 in the virtual space), and the like. Furthermore, in the second rendering method, for example, the boundary surface data Dd is data for representing an opening in a planar polygon of the real world image, and includes opening judgment data (corresponding to the α texture data described above) which indicates the state (for example, whether or not there is an opening) of each point constituting the boundary surface 3, data indicating the arrangement position of the boundary surface 3 in the virtual space (the coordinates of the boundary surface 3 in the virtual space), and the like. The data indicating the arrangement position of the boundary surface 3 in the virtual space is, for example, the condition formula of the spherical surface described above (the relationship formula which defines the spherical surface in the virtual space), and this data indicates the range where the boundary surface 3 is present in the virtual space.

The opening judgment data which indicates the opening state is, for example, two-dimensional texture data (having a rectangular shape of 2048 pixels×384 pixels, for example) which can specify an alpha value (opacity) for each point. The alpha value is a value from a minimum value of "0" to a maximum value of "1". The alpha value indicates transparency at a value of "0" and indicates opacity at a value of "1". The opening judgment data can indicate an open state at a position for which a value of "0" is stored in the opening judgment data, and a non-open state at a position for which a value of "1" is stored in the opening judgment data. The alpha value can be set for the game world image generated inside the game device 10, or for pixels on the upper LCD 22 or pixel block units consisting of a plurality of pixels. In the present embodiment, a predetermined value greater than 0 and less than 1 (in the present embodiment a value of 0.2) is stored for a non-open region. This data is not used when applied to the real world image. When applied to the real world image, an alpha value of "0.2" which has been stored in the open judgment data is treated as a value of "1". The alpha value of "0.2" is used when rendering a shadow ES of the enemy object EO as described above. The setting of the alpha value and the range of values that can be taken by the alpha value do not limit the image processing program of the present invention.

The image processing program according to the present embodiment is able to generate a real world image having an opening, in a first rendering method, by multiplying the alpha value of the region corresponding to the virtual camera imaging range, from amongst the opening judgment data, by the color information (pixel value) of the texture of the real world image attached to the boundary surface 3. Furthermore, in the second rendering method, a real world image having an opening can be generated by multiplying the alpha value of the region corresponding to the imaging range of the virtual world rendering camera, from amongst the opening judgment data, by the color information (pixel value) of the real world image (more specifically, the rendered image data of the real camera image which has been rendering by parallel projection (described below) using the aforementioned real world image data Dc). The reason for this is that the value of the color information of the real world image becomes "0" (a completely transparent state), when the alpha value "0" stored for an open position is multiplied by the color information of the real world image at that position.

In the first rendering method, as described below, an image to be displayed on the upper LCD 22 is generated by rendering a virtual space image of each virtual object including real world image objects to which the opening judgment data has been applied.

Furthermore, in the second rendering method, more specifically, a virtual space image is rendered by taking account of the opening judgment data, as described below. In other words, a priority for each virtual object with respect to the boundary surface (a priority with respect to the real world image) is judged on the basis of the opening judgment data, and a virtual space image is generated by rendering each virtual object. The image to be displayed on the upper LCD 22 is generated by synthesizing the real world image and the virtual space image which have been generated in this way.

Furthermore, in the image processing program according to the present embodiment, the shape of the boundary surface 3 is a spherical surface (see FIG. 7A and FIG. 7B). The shape of the opening judgment data in the present embodiment may be a rectangular shape. By mapping this opening judgment data having a rectangular shape to the central portion of the spherical surface such as that shown in FIG. 7A and FIG. 7B, it is possible to associate each point in the opening judgment data with a corresponding point of the boundary surface.

In the present embodiment, the opening judgment data is only data corresponding to the central portion of the spherical surface shown in FIG. 7A, and therefore, depending on the orientation of the virtual camera (in the second rendering method, the virtual world rendering camera), there are cases where no opening judgment data exists. If there is no opening judgment data in this way, then the real world image is rendered directly, without alteration. More specifically, the image is rendered by setting the α value to "1".

The image processing for an opening which is created on the boundary surface 3 is described below.

<Back Wall Image Data De>

The back wall image data De is data relating to a back wall BW which is present in the second space 2. For example, the back wall image data De includes image data for generating an image of the back wall BW and data indicating the position in the virtual space of the polygon model which defines the back wall BW.

The polygon model defining the back wall BW is typically a model of the same shape as the central portion of the sphere shown in FIG. 7A, which has a larger radius than the radius of the sphere shown in FIG. 7A and is centered on a vertical axis extending from the position of the virtual camera (the virtual world rendering camera in the case of the second rendering method). In other words, the model defining the back wall BW environs the boundary surface 3. Furthermore, it may also be a planar polygon which is disposed behind a predicted position of an opening formed in the boundary surface 3. Furthermore, it is also possible to arrange a planar polygon defining a projected surface of the opening in the second space 2, each time an opening is formed in the boundary surface 3.

The image data (texture) which is attached to the polygon model of the back wall BW may be any data. However, this image data represents another space which is located behind the real world image (a second space 2), and therefore it is desirable for this image data to be an image which represents an unreal situation, such as an image showing outer space, the sky, or an underwater scene, since this can evoke a sense of mystery for the player, as if there were an unreal space beyond the real space. For instance, if the game according to the present embodiment is played in a room, then it is possible to create a sense of there being an unreal space beyond the room. Moreover, the texture of the back wall BW may also depict a background scene that the player is not liable to see, such as sand or grass. In this way, by selecting the texture of the back wall BW, it is possible to make the player aware of a desired image relating to another world which is hidden behind the real image depicted as a background of the game world.

Furthermore, for example, if the image data is an image which can be depicted repeatedly, such as an image of outer space, or the like, then the data size of the image data (texture) can be reduced. Moreover, if the image data is an image of this kind, then it is possible to render an image of the back wall BW even if the position where the back wall BM is to be rendered in the virtual space is not specified. This is because if the image data is an image which can be depicted repeatedly, then the rendered image does not depend on the position (a repeated pattern can be depicted over the whole of the polygon model).

In the present embodiment, since the rendering priority described below is determined on the basis of the alpha value, then an alpha value is determined for this image data. In the present embodiment, the alpha value determined for the image data is "1".

<Enemy Object Data Df>

The enemy object data Df is data relating to an enemy object EO and includes solid data Df1, silhouette data Df2 and opening shape data Df3.

The solid data Df1 is data for rendering a solid enemy object EO, and includes, for example, a polygon model which defines the three-dimensional shape of the solid of the enemy object EO, and texture data for mapping to this polygon model. This texture data may be a photograph of the user's face, for example, which has been captured by one of the imaging units of the game device 10. In the present embodiment, since the priority of rendering described below is determined by the alpha value, then an alpha value is determined for the texture data. In the present embodiment, the alpha value determined for the texture data is "1".

The silhouette data Df2 is data for rendering a shadow of an enemy object EO which is present in the second space 2 as a semi-transparent image on the real world image, and includes a polygon model and texture data which is attached to the polygon model. For example, this silhouette model includes eight planar polygons, as stated above, and is arranged at the same position as the position of the enemy object EO which is situated in the second space 2. It is possible to depict a shadow of an enemy object EO which is situated in the second, space 2 by imaging a silhouette model to which this texture has been attached with a virtual world rendering camera and rendering the silhouette model as semi-transparent, or the like, on the real world image. Furthermore, the texture data of the silhouette data Df2 may comprise images of the enemy object EO viewed from respective directions, as shown in FIG. 14A and FIG. 14B, for example, (such as eight planar polygons). Moreover, this image may be an image in which the silhouette model of the enemy object EO is simplified. In the present embodiment, since the rendering priority described below is determined on the basis of the alpha value, then an alpha value is determined for the texture data which is attached to the silhouette model. In the present embodiment, the alpha value determined for the texture data is "1" for a shadow image portion and is "0" for a portion where there is no shadow image (peripheral portion).

The opening shape data Df3 is data relating to the shape of an opening created in the boundary surface 3 when an enemy object EO moves between the first space 1 and the second space 2. In the present embodiment, the opening shape data Df3 is data for setting an alpha value of "0" at a position in the opening judgment data which corresponds to a position on the boundary surface 3 where an opening is created. For example, the opening shape data Df3 is texture data having an alpha value of "0" which is matched to the shape of the opening created. In the present embodiment, the alpha value is set to "0" in the opening judgment data, in accordance with the shape of the opening shape data Df3 and centered on a location corresponding to the position where the enemy object EO has passed through the boundary surface 3. The image processing carried out when an enemy object EO creates an opening in the boundary surface 3 is described below.

<Bullet Object Data Dg>

The bullet object data Dg is data relating to a bullet object BO which is fired in accordance with an attack operation by the player. For example, the bullet object data Dg includes a polygon model and bullet image (texture) data for rendering a bullet object BO, data indicating the direction of arrangement and position of arrangement of the bullet object BO, data indicating the velocity of movement and the direction of movement of the bullet object BO (for example, a movement velocity vector), and the like. In the present embodiment, since the rendering priority described below is determined by the alpha value, then an alpha value is determined for this bullet image data. In the present embodiment, the alpha value determined for the bullet image data is "1".

<Points Score Data Dh>

The points score data Dh is data indicating a points score of a game in which enemy objects EO appear. For example, as stated above, game points are added when an enemy object EO is defeated by an attack operation, and game points are deducted if an enemy object EO reaches the user's position (in other words, the arrangement position of the virtual camera in the virtual space).

<Movement Data Di>

The movement data Di is data which indicates movement of the game device 10 in the real space. For example, the movement of the game device 10 is calculated from the angular velocity determined by the angular rate sensor 40.

<Virtual Camera Data Dj>

The virtual camera data Dj is data relating to a virtual camera arranged in the virtual space. In the first rendering method, for example, the virtual camera data Dj includes data indicating the arrangement direction and arrangement position in the virtual space of the virtual camera. Furthermore, in the second rendering method, for example, the virtual camera data. Dj includes respective data indicating an arrangement direction and arrangement position in the virtual space of the real world rendering camera, and data indicating an arrangement direction and arrangement position in the virtual space of the virtual world rendering camera. For example, the data indicating the arrangement direction and arrangement position in the virtual space of the virtual camera in the first rendering method and the virtual world rendering camera in the second rendering method changes with the movement of the game device 10 (angular velocity) which is indicated by the movement data Di. Moreover, the virtual camera data Dj includes the picture angle (imaging range) data of the virtual camera. By this means, the imaging range on the boundary surface 3 (the imaging position) changes with variation in the position and orientation of the virtual camera in the first rendering method and of the virtual world rendering camera in the second rendering method.

<Rendered Image Data Dk>

The rendered image data Dk is data relating to an image which has been rendered by the processing described below.

In the first rendering method, since the real world image is rendered as an object in a virtual space, then the rendered image data Dk includes rendered image data for a virtual space. The rendered image data for the virtual space is data indicating a virtual world image which is obtained by rendering an enemy object EO, a bullet object BO, a boundary surface 3 (screen object) to which a real world image is attached as texture, and a virtual space in which a back wall BW is situated, by perspective projection by a virtual camera.

On the other hand, in the second rendering method, since the real world image and the virtual world image are rendered by separate virtual cameras, then the rendered image data Dk includes rendered image data of the real camera image and rendered image data of the virtual space. The rendered image data of the real camera image is data which indicates a real world image that is obtained by rendering a planar polygon onto which texture of a real camera image is mapped, by parallel projection by a real world rendering camera. The rendered image data of the virtual space is data indicating a virtual world image which is obtained by rendering an enemy object EO, a bullet object BO, a boundary surface 3, and a virtual space in which a back wall BW is situated, by perspective projection by a virtual world rendering camera.

<Display Image Data Dl>

The display image data Dl is data indicating a display image which is displayed on the upper LCD 22. In the first rendering method, for example, the display image to be displayed on the upper LCD 22 is generated by a virtual space rendering process. Furthermore, in the second rendering method, for example, the display image to be displayed on the upper LCD 22 is generated by synthesizing the rendered image data of the camera image described above and the rendered image data of the virtual space, by the method described below.

<Pointing Cursor Image Data Dm>

The pointing cursor image data Dm is image data for a pointing cursor AL which is displayed on the upper LCD 22. The image data may be any data.

In the present embodiment, the data relating to each object used in rendering (the boundary surface data Dd, back wall image data De, solid data Df1, silhouette data Df2, bullet image data) includes priority information which determines a rendering priority. In the present embodiment, an alpha value is used for the priority information. The relationship between the alpha value and the image processing is described below.

Furthermore, in the present embodiment, data relating to each object used in rendering includes data indicating whether or not to carry out depth judgment between the respective objects. As stated above, this data is set in such a manner that depth judgment is enabled, respectively between an enemy object EO, a bullet object BO, a semi-transparent enemy object, an effect object, and a screen object (boundary surface 3). Furthermore, cue data is set in such a manner that depth judgment is enabled respectively "between a shadow planar polygon (silhouette data Df2) and an enemy object EO (solid data Df1)", "between a shadow planar polygon (silhouette data Df2) and a bullet object BO", "between a shadow planar polygon (silhouette data Df2) and a semi-transparent enemy object", and "between a shadow planar polygon (silhouetted data Df2) and an effect object". Moreover, this data is set in such a manner that depth judgment is disabled between a shadow planar polygon (silhouette data Df2) and a screen object (boundary surface data Dd).

§3-2 Image Processing Example

Next, the operation of the information processing unit 31 is described with reference to FIG. 17. Firstly, when the power supply to the game device 10 (the power button 14F) is switched on, a boot program is executed by the CPU 311, and by this means, a program stored in the built-in memory or the external memory 45 or the external data memory 46 is loaded into the main memory 32. By means of the information processing unit 31 (CPU 311) executing the loaded program, the steps shown in FIG. 17 (abbreviated as "S" in FIG. 17 to FIG. 19, FIG. 20A and FIG. 203) are executed. In FIG. 17 to FIG. 19, FIG. 20A and FIG. 20B, image processing and other peripheral processing which is not directly related to the image processing of the present invention is omitted.

In FIG. 17, the information processing unit 31 carries out initial setup for image processing (step 51) and then advances to the next step, step 52. For example, the information processing unit 31 sets an initial position and an initial direction of the virtual camera for generating a virtual world image (an image of a virtual space) in the virtual camera data Dj, and sets the coordinate axes of the virtual space where the virtual camera is disposed (for example, the XYZ axes).

Next, the information processing unit 31 acquires various data from the respective constituent parts of the game device 10 (step 52), and then advances to the next step, step 53. For example, the information processing unit 31 updates the real camera image data Db using a camera image captured by a currently selected imaging unit (the outside imaging unit 23 in the present embodiment). Furthermore, the information processing unit 31 updates the control data Da1 by acquiring data indicating that an operating button 14 or the analog stick 15 has been operated. Moreover, the information processing unit 31 acquires angular rate data Da2 indicating the angular velocity determined by the angular rate sensor 40.

Next, the information processing unit 31 executes enemy object related processing (step 53), and then advances to the next step, step 54. Below, the enemy object related processing is described with reference to FIG. 18.

In FIG. 18, the information processing unit 31 judges whether or not a condition for the appearance of an enemy object EO has been satisfied (step 61). For example, the condition for the appearance of an enemy object 60 may be that the enemy object EO appears after each predetermined time period, that a new enemy object EO appears in accordance with the disappearance of an enemy object EO from the virtual world, or that an enemy object EO appears at random timing. The condition for the appearance of an enemy object EO is set by the program group Pa which is held in the main memory 32, for example.

When a condition for the appearance of an enemy object EO is satisfied, the information processing unit 31 advances to the next step, step 62. On the other hand, when a condition for the appearance of an enemy object 60 is not satisfied, the information processing unit 31 advances to the next step, step 63.

In step 62, the information processing unit 31 generates enemy object data Df corresponding to an enemy object EO which has satisfied an appearance condition, carries out initial setup, and advances to the next step, step 63. For example, the information processing unit 31 acquires solid data Df1, silhouette data Df2, opening shape data Df3 and data for a polygon corresponding to the enemy object EO, by using the program group Pa which is stored in the main memory 32. The information processing unit 31 then generates enemy object data Df which includes these various elements of data. Furthermore, for instance, the information processing unit 31 makes initial settings for the data indicating the arrangement direction and arrangement position in the virtual space of the polygon corresponding to the enemy object EO, and the data indicating the movement speed and movement direction in the virtual space of the enemy object EO, this data being included in the generated enemy object data Df. These initial settings can be made by a common known method.

Next, the information processing unit 31 moves the enemy object EO situated in the virtual space (step 63), and then advances to the next step, step 64. For example, the information processing unit 31 updates the data indicating the arrangement position of the enemy object EO which is included in the enemy object data Df, on the basis of the data indicating the movement speed and movement direction in the virtual space of the enemy object EO which is included in the enemy object data Df. In this, the information processing unit 31 updates the data indicating the direction of arrangement of the enemy object EO included in the enemy object data Df, on the basis of the data indicating the direction of movement described above. After this updating, the data indicating the movement velocity and movement direction of the enemy object EO in the virtual space, which is included in the enemy object data Df, may be updated in any way. By updating the data indicating the movement velocity and movement direction, the enemy object EO can move at any velocity and in any direction in the virtual space. The data indicating the movement velocity and the movement direction is updated in accordance with a predetermined algorithm, for example.

Next, the information processing unit 31 judges whether or not the enemy object EO has come within a predetermined distance of the position of the virtual camera (the virtual camera in the first rendering method or the virtual world rendering camera in the second rendering method) (step 64). For example, the information processing unit 31 compares the data indicating the arrangement position of the enemy object EO included in the enemy object data Df with the data indicating the arrangement position of the virtual camera included in the virtual camera data Dj (the virtual camera in the first rendering method or the vertical world rendering camera in the second rendering method). If the two data elements satisfy a predetermined condition (for example, if the distance between the arrangement position of the enemy object EO and the arrangement position of the virtual camera is smaller than a predetermined value), then the information processing unit 31 judges that the enemy object EO has come within a predetermined distance of the position of the virtual camera, and if the two data elements do not satisfy the predetermined condition, then the information processing unit 31 judges that the enemy object EO has not reached the position of the virtual camera. Below, where reference is made simply to the "virtual camera" without distinguishing between the first rendering method and the second rendering method, then this indicates the virtual camera in the case of the first rendering method or the virtual world rendering camera in the case of the second rendering method.

If the information processing unit 31 judges that the enemy object 10 has come within a predetermined distance of the position of the virtual camera, then the information processing unit 31 advances to the next step, step 65. On the other hand, if the information processing unit 31 judges that the enemy object 10 has not reached the position of the virtual camera, then the information processing unit 31 advances to step 66.

In step 65, the information processing unit 31 carries out points deduction processing and then advances to the next step, step 66. For example, the information processing unit 31 deducts a predetermined value from the game points score indicated by the points score data Dh, and updates the points score data Dh using the points score after deduction. In the points deduction processing described above, the information processing unit 31 may carry out processing for eliminating an enemy object EO which has come within a predetermined distance of the position of the virtual camera, from the virtual space (for example, processing for initializing the enemy object data Df relating to the enemy object EO which has reached the position of the virtual camera and making the enemy object EO cease to exist in the virtual space). Furthermore, the predetermined value in this points deduction processing may be any value, for example, the value may be set by the program group Pa held in the main memory 32.

In step 66, the information processing unit 31 judges whether or not the enemy object EO is passing through the boundary surface 3 (the enemy object EO is moving between the first space 1 and the second space 2). For example, the information processing unit 31 compares the data indicating the arrangement position of the enemy object EO which is included in the enemy object data Df and the data indicating the arrangement position of the boundary surface 3 which is included in the boundary surface data Dd. The information processing unit 31 judges that the enemy object EO is passing through the boundary surface 3 if the two data elements satisfy a predetermined condition and judges that the enemy object EO is not passing through the boundary surface 3 if the two data elements do not satisfy a predetermined condition. The predetermined condition means that, for example, the coordinates (arrangement position) of the enemy object EO in the virtual space satisfy the condition formula of the spherical surface of the boundary surface 3. As stated above, the data indicating the arrangement position of the boundary surface 3 in the virtual space denotes the range in which the boundary surface 3 is present in the virtual space and is, for example, the condition formula of a spherical surface (the shape of the boundary surface 3 in the present embodiment). If the arrangement position of the enemy object EO satisfies this condition formula, then the enemy object EO is situated on the boundary surface 3 in the virtual space. In the present embodiment, in cases such as this, for example, it is judged that the enemy object EO is passing through the boundary surface 3.

If it is judged that the enemy object EO is passing through the boundary surface 3, then the information processing unit 31 advances to the next step, step 67. On the other hand, if it is judged that the enemy object EO is not passing through the boundary surface 3, then the information processing unit 31 terminates the processing of this sub-routine.

In step 67, the information processing unit 31 carries out processing for updating the opening judgment data included in the boundary surface data Dd, and then terminates the processing by this sub-routine. This processing is processing for registering, in the boundary surface data Dd, information about an opening in the boundary surface 3 which is created by the enemy object EO passing through the boundary surface 3. For example, in the first rendering method and the second rendering method, the information processing unit 31 multiplies together the alpha value of the region centered on the position corresponding to the position in the virtual space where the enemy object EO passes through the boundary surface 3 and the alpha value of the opening shape data Df3, these alpha values being contained in the opening judgment data included in the boundary surface data Dd. The opening shape data Df3 is texture data in which an alpha value of "0" centered on the arrangement position of the enemy object EO is stored. Therefore, due to this multiplication process, the alpha value of the opening judgment data is "0" for the region where an opening is created, centered on the arrangement position of the enemy object EO (the coordinates on the boundary surface 3 through which the enemy object EO passes). In other words, the information processing unit 31 is able to update the state of the boundary surface and more specifically, the opening judgment data), without judging whether or not an opening is already present in the boundary surface 3. It is also possible to judge whether or not an opening is already present at the position of the collision between the enemy object and the boundary surface. If there is no opening, then it is possible to display an effect whereby the real world image corresponding to the impact position is broken into scattered fragments.

Furthermore, in the opening judgment data update processing described above, the information processing unit 31 may carry out scene processing to show that an opening has been created (for example, to create a scene where a wall is knocked down at the position where the opening is created). In this case, the information processing unit 31 needs to judge whether or not the position at which the enemy object EO passes through the boundary surface 3 (the range where the opening is created) was already in an open state. The information processing unit 31, for example, is able to judge whether or not the range where an opening is to be created was already in an open state by multiplying open shape data Df3 with an alpha value reversed from "0" to "1" by the alpha value of the opening judgment data multiplied above. In other words, if the whole range where an opening is created was already in an open state, then the alpha value of the opening judgment data will be "0" and therefore this multiplication result will be "0". On the other hand, if a portion of the range where the opening is to be created is not in an open state, then there is a portion where the alpha value of the opening judgment data is not "0", and hence the multiplication result will be a value other than "0".

The opening shape data Df3 of the enemy object EO is texture data storing an alpha value of "0" corresponding to the shape of the enemy object EO, but the information processing unit 31 may also convert the alpha value of this texture data to "1" as a result of a predetermined event. If the aforementioned processing is carried out after this change, the alpha value of the opening shape data Df3 will be "1", and therefore the alpha value of the opening judgment data is not changed. In this case, the enemy object EO passes through the boundary surface 3 without creating an opening. More specifically, by this means, a scene can be created in which the enemy object EO slips through the boundary surface 3 (see FIG. 9). The predetermined event may be a time interval which is set to a predetermined interval or random interval, or when a predetermined condition is satisfied in the game. These settings can be made by the program group Pa which is held in the main memory 32, for example.

Returning to FIG. 17, after the enemy object related processing in step 53, the information processing unit 31 carries out bullet object related processing (step 54) and then advances to the next step, step 55. Below, the bullet object related processing is described with reference to FIG. 19.

In FIG. 19, the information processing unit 31 moves the bullet object BO in the virtual space in accordance with a set movement velocity vector (step 71), and then advances to the next step, step 72. For example, the information processing unit 31 updates the data indicating the arrangement direction and the arrangement position of the bullet object BO, on the basis of the data indicating the movement velocity vector which is included in the bullet object data Dg. In this, the information processing unit 31 is able to update the data indicating the movement velocity vector by a commonly known method. Furthermore, for example, the information processing unit 31 is able to change the method of updating the data indicating the movement velocity vector, in accordance with the type of bullet object BO. For example, if the bullet object BO is a ball, then the information processing unit 31 takes account of the effects of gravity in the vertical direction of the virtual space, when updating the data indicating the movement velocity vector.

Thereupon, the information processing unit 31 judges whether or not a firing operation has been performed by the user of the game device 10 (step 72). For example, the information processing unit 31 judges whether or not the user has performed a predetermined firing operation (for example, pressing the button 14B (button A)), by referring to the control data Da1. If a firing operation has been performed, then the information processing unit 31 advances to the next step, step 73. On the other hand, if a firing operation has not been performed, then the information processing unit 31 advances to the next step, step 74.

In step 73, the information processing unit 31 arranges a bullet object BC at the position of the virtual camera in the virtual space, in accordance with the firing operation, and sets a movement velocity vector for that bullet object BO, before then advancing to the next step, step 74. For example, the information processing unit 31 generates bullet object data Dg corresponding to the firing operation. For instance, the information processing unit 31 stores data indicating the arrangement position and arrangement direction of the virtual camera which is included in the virtual camera data Dj, as the data indicating the arrangement position and arrangement direction of the bullet object BO which is included in the generated bullet object data Dg. Furthermore, for example, the information processing unit 31 stores an arbitrary value for the data indicating the movement velocity vector which is included in the generated bullet object data Dg. The value stored in the data indicating the movement velocity vector may be set by the program group Pa which is held in the main memory 32.

In step 74, the information processing unit 31 judges whether or not the enemy object EO and the bullet object BO have made contact within the virtual space. For instance, the information processing unit 31 compares the data indicating the arrangement position of the enemy object EO which is included in the enemy object data Df with the data indicating the arrangement position of the bullet object BO which is included in the bullet object data Dg, and judges whether or not the enemy object EO and the bullet object BO have made contact in the virtual space. If, for example, the data indicating the arrangement position of the enemy object EO and the data indicating the arrangement position of the bullet object BO satisfy a predetermined condition, then the information processing unit 31 judges that the enemy object EO and the bullet object BO have made contact. Furthermore, if this is not the case, then the information processing unit 31 judges that the enemy object EO and the bullet object BO have not made contact. The predetermined condition is, for instance, that the distance between the arrangement position of the enemy object EO and the arrangement position of the bullet object BO is less than a predetermined value. This predetermined value may be a value based on the size of the enemy object EO, for example.

If the information processing unit 31 judges that the enemy object EO and the bullet object BO have made contact, then the information processing unit 31 advances to the next step, step 75. On the other hand, if the information processing unit 31 judges that the enemy object EO and the bullet object BO have not made contact, then the information processing unit 31 advances to the next step, step 76.

In step 75, the information processing unit 31 carries out points addition processing and then advances to the next step, step 76. For example, in this points addition processing, the information processing unit 31 adds a predetermined number of points to the game points score indicated by the points score data Dh, and updates the points score data Dh using the points score after addition. Furthermore, in the points addition processing, the information processing unit 31 carries out processing for eliminating both objects (in other words, the enemy object EO and the bullet object BO) which are judged to have made contact in step above (for example, the information processing unit 31 initializes the enemy object data Df and the bullet object data Dg relating respectively to the enemy object 80 which has made contact with the bullet object BO and the bullet object BO which has made contact with the enemy object EO, and makes the enemy object EO and the bullet object BO cease to exist in the virtual space). Furthermore, the predetermined value in this points addition processing may be any value, for example, the value may be set by the program group Pa held in the main memory 32.

In step 76, the information processing unit 31 judges whether or not the bullet object BO has made contact with a non-open region of the boundary surface 3. For example, the information processing unit 31 judges whether or not the bullet object BO has made contact with the non-open region of the boundary surface 3 by using the opening judgment data and the data indicating the arrangement position of the bullet object BO which is included in the bullet object data Dg.

For example, the information processing unit 31 judges whether or not the data indicating the arrangement position of the bullet object BO which is included in the bullet object data Dg satisfies the condition formula of the spherical surface of the boundary surface 3, similarly to the processing of the enemy object EO described above. Thereupon, if the data indicating the arrangement position of the bullet object BO does not satisfy the condition formula of the spherical surface, then the information processing unit 31 judges that the bullet object BO is not in contact with the boundary surface 3. On the other hand, if the data indicating the arrangement position of the bullet object BO satisfies the condition formula of the spherical surface of the boundary surface 3, then this means that the bullet object BO is situated at the boundary surface 3 in the virtual space. In this case, the information processing unit 31, for example, acquires the alpha value of the opening judgment data for a predetermined region centered on a position corresponding to the position of the bullet object BO on the boundary surface 3. This predetermined region is a predetermined region centered on the point of contact between the bullet object BO and the boundary surface 3. If the alpha value in the opening judgment data corresponding to this predetermined region is an alpha value of "1" which corresponds to a non-open region, then it is judged that the bullet object BO has made contact with a non-open region of the boundary surface 3.

If the information processing unit 31 judges that the bullet object BO has made contact with a non-open region of the boundary surface 3, then the information processing unit 31 advances to the next step, step 77. On the other hand, if the information processing unit 31 judges that the bullet object BO has not made contact with a non-open region of the boundary surface 3, then the information processing unit 31 advances to the next step, step 78.

In step 77, the information processing unit 31 carries out processing for updating the opening judgment data and then advances to the net step, step 78. For example, in the update processing described above, the information processing unit 31 updates the alpha value of the opening judgment data for a predetermined region centered on the position on the boundary surface 3 corresponding to the arrangement position of the bullet object BO which has been judged to have made contact with a non-open region of the boundary surface 3, to an alpha value of "1" which corresponds to a non-open region. Furthermore, in the update processing described above, the information processing unit 31 carries out processing for eliminating, from the virtual space, the bullet object BO which is judged to have made contact at step 76 described above (for example, processing for initializing the bullet object data Dg relating to the bullet object BO which has made contact with a non-open region of the boundary surface 3, and making the bullet object BO cease to exist in the virtual space). The predetermined region in this update processing may be any region, for example, the region may be set by the program group Pa held in the main memory 32.

In step 78, the information processing unit 31 judges whether or not the bullet object BO has reached a predetermined position in the virtual space. The predetermined position may be a position where the back wall BW is situated in the virtual space. In this case, for example, the information processing unit 31 judges whether or not the data indicating the arrangement position of the bullet object BO which is included in the bullet object data Dg has collided with the back wall BW.

If the information processing unit 31 judges that the bullet object BO has reached the predetermined position, then the information processing unit 31 advances to the next step, step 77. On the other hand, if the bullet object BO has not reached the predetermined position, then the information processing unit 31 terminates processing by this sub-routine.

In step 77, the information processing unit 31 carries out processing for eliminating, from the virtual space, a bullet object BO which is judged to have reached the predetermined position at step 76 described above, and then terminates processing by this sub-routine. For example, the information processing unit 31 initializes the bullet object data Dg relating to the bullet object BO and makes that bullet object BO cease to exist in the virtual space.

Returning to FIG. 17, after the bullet object related processing in step 54, the information processing unit 31 calculates movement of the game device 10 (step 55) and then advances to the next step, step 56. For example, the information processing unit 31 calculates the movement of the game device 10 by using the angular velocity indicated by the angular rate data Da2 (for instance, the change in the imaging direction of the real camera provided in the game device 10), and updates the movement data Di on the basis of this movement. More specifically, if the user has changed the imaging direction of the real camera provided in the game device 10, in the real space, then the orientation of the whole game device 10 also changes, and an angular velocity corresponding to this change is produced in the game device 10. By detecting this angular velocity produced in the game device 10 by means of the angular rate sensor 40, data indicating the angular velocity is stored as angular velocity data Da2. Consequently, the information processing unit 31 can use the angular velocity indicated by this angular velocity data Da2 to calculate the movement of the game device 10 in terms of the direction of change and amount of change (angle) in the imaging direction of the real camera which is provided in the game device 10.

Next, the information processing unit 31 changes the direction of the virtual camera in the virtual space in accordance with the movement of the game device 10 (step 56), and then advances to step 57. For example, using the movement data Di, the information processing unit 31 applies the same change as the change in imaging direction of the real camera of the game device 10 in the real space, to the virtual camera in the virtual space, and updates the virtual camera data Dj using this changed position and direction of the virtual camera. For example, if the imaging direction of the real camera of the game device 10 in the real space is changed through A° to the left, then the direction of the virtual camera in the virtual space is changed through A° to the left. By this means, an enemy object EO and/or a bullet object BO which are shown as if arranged inside the real space are displayed so as to be disposed in the same position in the real space, even if the direction and/or position of the game device 10 changes in the real space.

Next, the information processing unit 31 executes display screen update processing (step 57), and then advances to the next step, step 58. Below, the display screen update processing is described with reference to FIG. 20A and FIG. 20B. FIG. 20A shows display screen update processing in the first rendering method. Furthermore, FIG. 20B shows display screen update processing in the second rendering method.

Firstly, the display screen update processing in the first rendering method will be described.

In FIG. 20A, the information processing unit 31 carries out processing for attaching a real camera image acquired at step 52 described above, to a screen object (boundary surface 3) in the imaging range of the virtual camera (step 81), and then advances to the next step, step 82. For example, the information processing unit 31 updates the texture data of the real camera image included in the real world image data Dc by using the real camera image data Db which has been updated at step 52. The information processing unit 31 then determines a point where the boundary surface 3 overlaps with the view direction of the virtual camera, by using the data indicating the arrangement direction and the arrangement position of the virtual camera in the virtual space, which is included in the virtual camera data Dj. The information processing unit 31 attaches the texture data of the real camera image described above, which is included in the real world image data Dc, by centering the texture data on the point thus determined, and updates the boundary surface data Dd accordingly. In this case, the information processing unit 31 acquires opening judgment data set for the region where the texture data is attached, for a region corresponding to each pixel of the texture data. The information processing unit 31 applies the alpha value set in the acquired opening judgment data (a value of "0" or "0.2") to the texture data. More specifically, the information processing unit 31 multiplies together the color information of each pixel of the texture data of the real camera image to be attached, and the alpha value of the corresponding position in the opening judgment data. By means of this processing, an opening appears in the real world image, as described previously the multiplication described above, the alpha value "0.2" (non-open region) stored in the opening judgment data is handled as an alpha value of "1" of a material as described above. Furthermore, in the present embodiment, the texture data of the real camera image which is attached to the boundary surface 3 is image data having a broader range than the imaging range of the virtual camera.

Next, the information processing unit 31 generates a display image by rendering the virtual space (step 82) and then terminates the processing of this sub-routine. For example, the information processing unit 31 generates an image in which a virtual space containing a boundary surface 3 (screen object), an enemy object EO, a bullet object BO, and a back wall. BW is rendered, and uses this image to update the rendered image data of the virtual space which is included in the rendered image data Dk. Furthermore, the information processing unit 31 updates the display image data Dl using the rendered image data of the virtual space. Below, one example of this rendering process is described with reference to FIG. 21 and FIG. 22.

Figure 21:
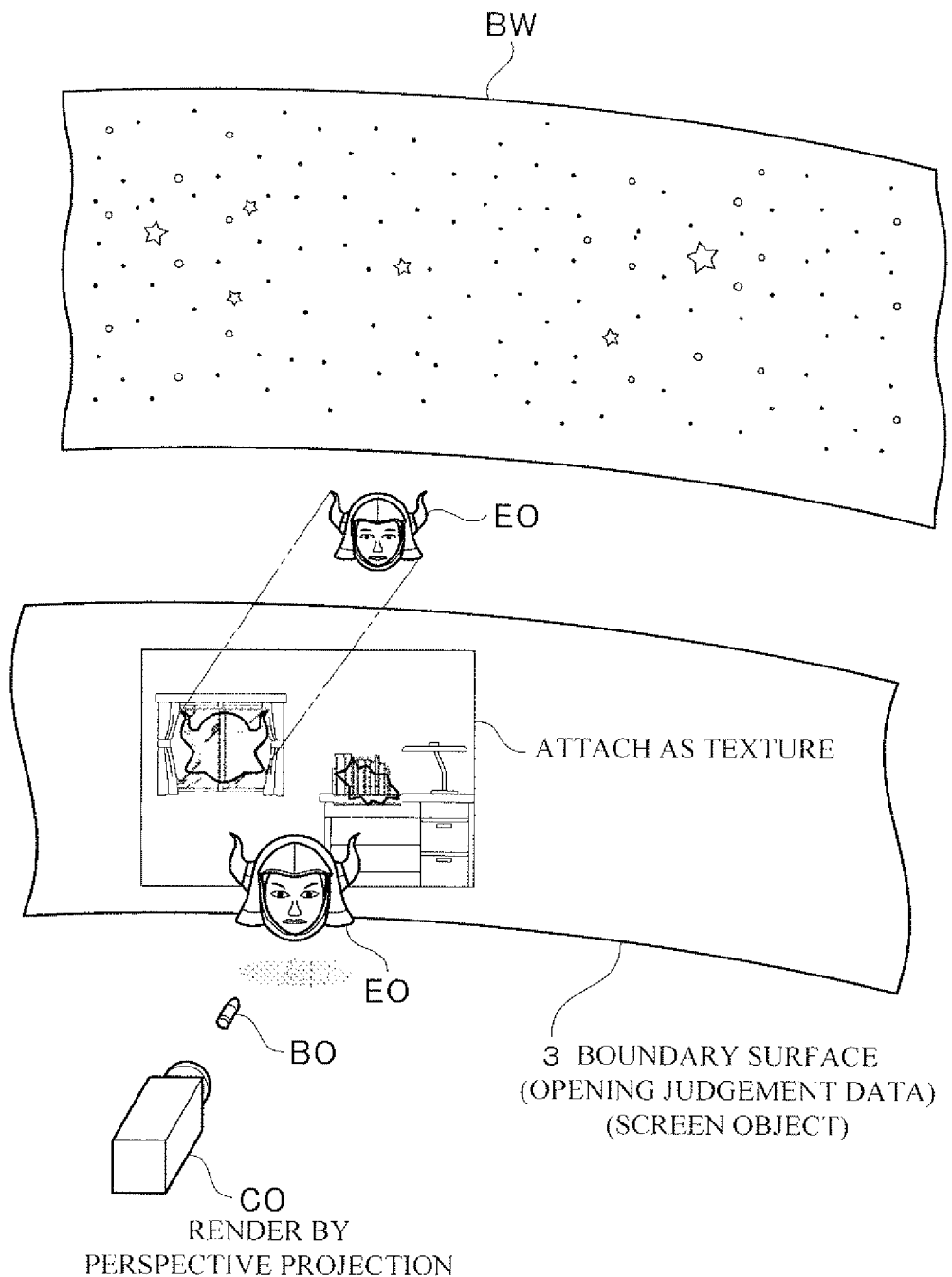
FIG. 21 is an illustrative diagram for describing one example of a rendering process in a first rendering method.
Figure 22:
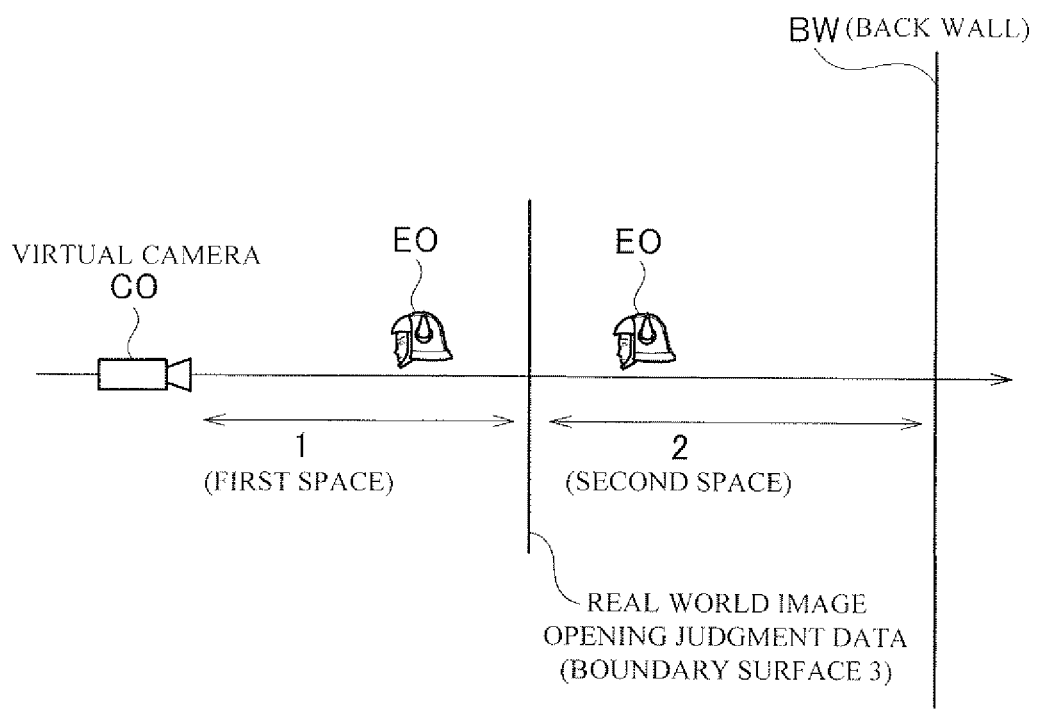
FIG. 22 is an illustrative diagram for describing the positional relationship of respective objects in FIG. 21.

FIG. 21 shows an example of the arrangement of an enemy object EO, a bullet object BO, a boundary surface 3 (a screen object on which opening judgment data is set) and a back wall BW, in the virtual space. Furthermore, FIG. 22 shows the positional relationships of the objects in a case where the virtual camera C0 in FIG. 21 is oriented in the direction (X,Y,Z)=(0,0,1) from the point of origin. In this way, the enemy object EO, the bullet object BO, the boundary surface 3 and the back wall BW are respectively arranged in accordance with data indicating the arrangement positions which is included in the enemy object data Df, the bullet object data Dg, the boundary surface data Dd and the back wall image data De. Furthermore, the virtual camera C0 for rendering the virtual space is arranged in the virtual space in accordance with data indicating the arrangement direction and the arrangement position which is included in the virtual camera data Dj.

The information processing unit 31 renders the enemy object EO, the bullet object BO and the back wall BW arranged in the virtual space including a boundary surface 3 as shown in FIG. 21 (or FIG. 22) by perspective projection by the virtual camera C0. In this case, the information processing unit 31 takes account of the rendering priority information. In normal perspective projection, an object which is situated in the second space 2 is not rendered, due to the presence of the boundary surface 3. In the game according to the present embodiment, an opening is provided in the boundary surface 3 (real world image), and a portion of the second space 2 is visible through this opening. Furthermore, a shadow of the object situated in the second space 2 is synthesized and rendered with the real world image. In so doing, it is possible to give the user a sense of the existence of a virtual world beyond the real world image. More specifically, the information processing unit 31 carries out the rendering process using the rendering priority information. The image processing program according to the present embodiment uses an alpha value as an example of the rendering priority.

In the perspective projection described above, an object present in the second space 2 (in the present embodiment, an enemy object EO or a back wall BW) is situated behind the boundary surface 3. Here, the boundary surface 3 is a screen object to which real camera image texture data has been attached in the direction of view (range of view) of the virtual camera C0, by step 81 described above. Furthermore, as described above, opening judgment data corresponding to each position is applied to the real camera image texture data. Consequently, a real world image to which opening judgment data has been applied is present in the range of view of the virtual camera C0.

In the present embodiment, for example, the information processing unit 31 renders images of a virtual object and/or aback wall which are present in a region of the second space 2 that is visible through a region (opening region) for which an alpha value of "0" is stored in the opening judgment data. Furthermore, the information processing unit 31 does not render a virtual object and/or back wall present in the second space 2 in a region for which an alpha value of "0.2" corresponding to a non-open region is stored in the opening judgment data (namely, a region which is treated as a region for which an alpha value of "1" indicating a non-open region has been stored). More specifically, a real world image which is attached at step 81 above is rendered in the portion of the displayed image which corresponds to this non-open region.

Consequently, image data included in the solid data Df1 or the back wall image data De is rendered in a region where a value of "0" has been stored in the opening judgment data, from the viewpoint of the virtual camera C0. An image of a virtual object or a back wall is shown in the portion corresponding to this region, on the upper LCD 22.

Furthermore, the information processing unit 31 does not render a virtual object and/or back wall present in the second space 2 in a region for which an alpha value of "0.2" indicating a non-open region is stored in the opening judgment data viewed from the virtual camera C0 (namely, a region which is treated as a region for which an alpha value of "1" indicating a non-open region has been stored). In other words, a real world image is rendered in the portion corresponding to this region in the image displayed on the upper LCD 22. However, in the case of the shadow ES of an enemy object EO (silhouette model) which is situated in the second space 2, depth judgment with respect to the boundary surface 3 is disabled, and since the alpha value "1" of the silhouette model is greater than the alpha value "0.2" of the boundary surface 3, then the shadow ES is rendered in the region where an alpha value "1" indicating a non-open region is stored (a region for which an alpha value of "0.2" is stored in the opening judgment data). By this means, an image of a shadow ES of an enemy object EO is rendered on the real world image.

Furthermore, the shadow ES (silhouette model) of the enemy object EO is arranged with a size and at a position which is encompassed by the solid model, and depth judgment is set to be enabled between the solid model and the shadow ES (silhouette model) of the enemy object EO. If the enemy object EO is situated in the first space 1, then the silhouette model is hidden by the solid model and is therefore not rendered.

The shape of the boundary surface 3 in the present embodiment is the central portion of a spherical surface as shown in FIG. 7A, and depending on the view direction of the virtual camera C0, there does not exist any opening judgment data. In this case, the processing described above is carried out by artificially supposing that there exists opening judgment data storing an alpha value of "0.2". In other words, the region where there is no opening judgment data is treated as a region where an alpha value of "1" indicating a non-opening region is stored.

Furthermore, the silhouette data Df2 included in the enemy object data Df corresponding to the enemy object EO in the present embodiment is set in such a manner that there are a plurality of planar polygons having normal directions arranged in respective radiating directions when viewed from the enemy object, and texture of a silhouette image of the enemy object viewed from the corresponding direction is applied to each of the planar polygons. Consequently, in the image processing program according to the present embodiment, the shadow of the enemy object EO in the virtual space image is depicted as an image which reflects the orientation of the enemy object in the second space 2.

Furthermore, the information processing unit 31 carries out the aforementioned rendering process in such a manner that the image data included in the pointing cursor image data Dm is rendered preferentially in the center of the field of view of the virtual camera C0 (in the center of the rendered image).

By means of the processing described above, the information processing unit 31 renders an enemy object EO, a bullet object BO and a back wall BW which are arranged in the virtual space, by perspective projection to generate a virtual world image viewed from the virtual camera C0 (an image including a pointing cursor AL), and updates the rendered image data of the virtual space accordingly (step 82). Furthermore, the information processing unit 31 updates the display image data Dl using this updated rendered image data of the virtual space.

Next, the display screen update processing in the second rendering method will be described.

In FIG. 20B, the information processing unit 31 carries out processing for rendering the real camera image acquired at step 52 described above (step 83) and then advances to the next step, step 84. For example, the information processing unit 31 updates the texture data of the real camera image included in the real world image data Dc by using the real camera image data Db which has been updated at step 52. The information processing unit 31 generates a rendered image of the real camera image using the updated real world image data Dc, and updates the rendered image data of the real camera image which is included in the rendered image data Dk, using the generated image. Below, an example of processing for rendering the real camera image is described with reference to FIG. 23 and FIG. 24.

Figure 23:
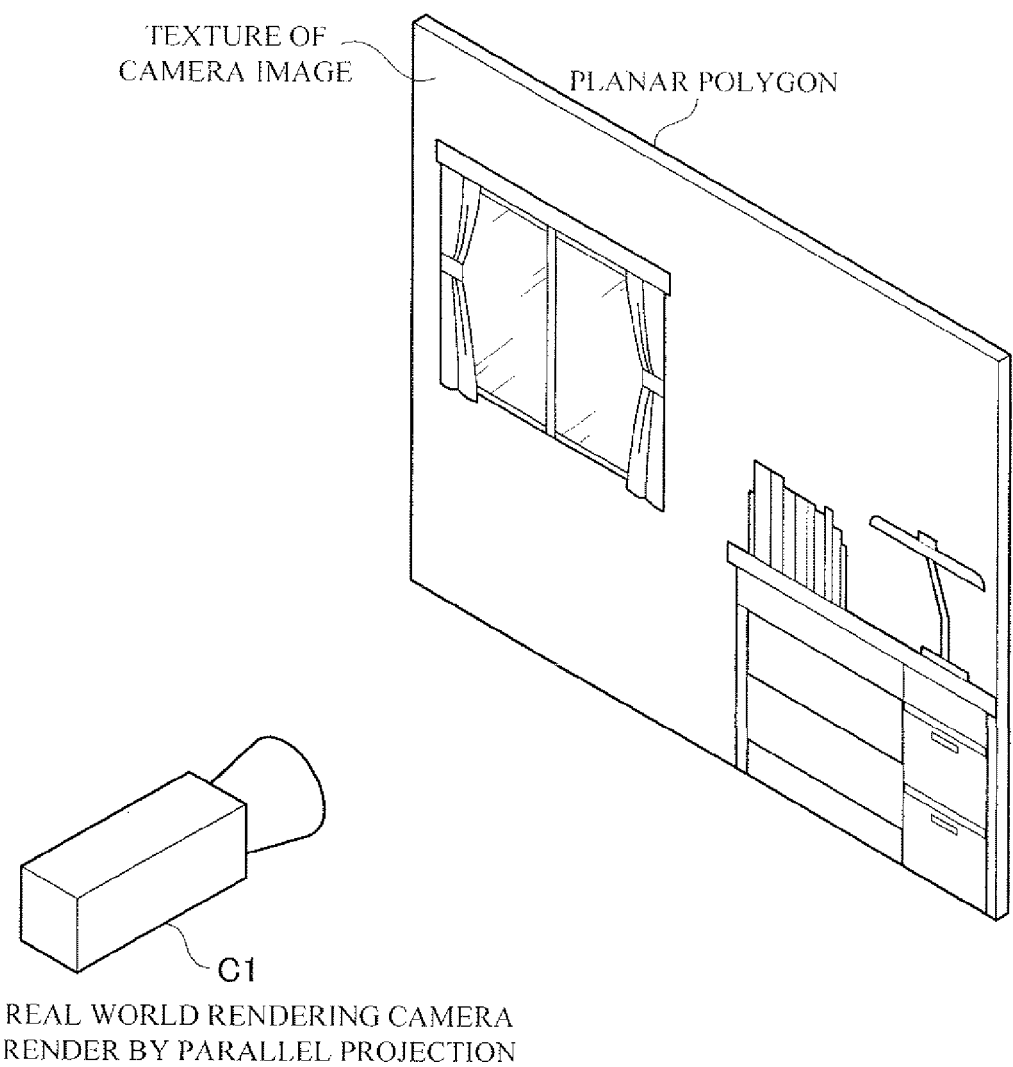
FIG. 23 is an illustrative diagram for describing one example of processing for rendering a real camera image.
Figure 24:
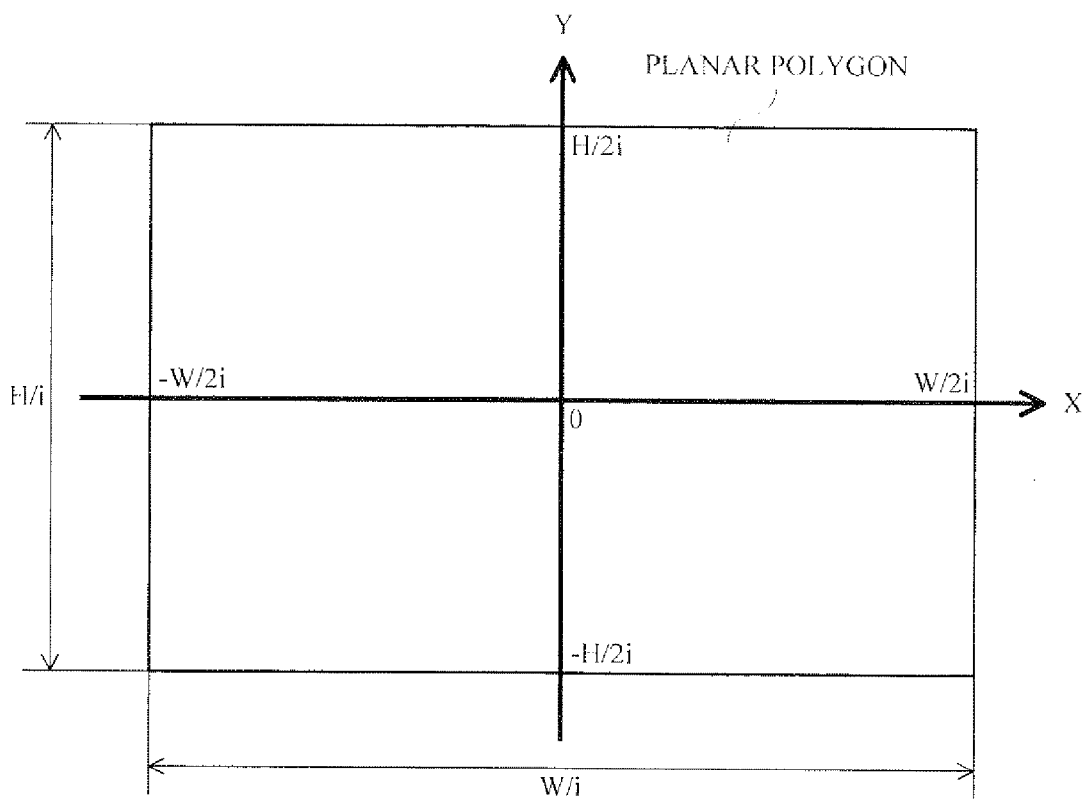
FIG. 24 is an illustrative diagram for describing one example of coordinates when rendering a real camera image.

In the present embodiment, as shown in FIG. 23, the information processing unit 31 sets the real camera image obtained from a real camera of the game device 10, as a texture, and generates a planar polygon to which this texture is mapped. The information processing unit 31 generates, as a real world image, an image in which the aforementioned planar polygon is rendered by parallel projection from the real world image rendering camera C1. Here, an example of a real world image generating method is described in relation to a case where the whole real camera image obtained from the real camera of the game device 10 is displayed on the whole surface of the display screen of the upper LCD 22. In the present embodiment, a synthesized image according to the present embodiment (a synthesized image of the real world image and the virtual world image) is displayed on the whole display screen of the upper LCD 22, but it is also possible for the synthesized image to be displayed on a portion of the display screen of the upper LCD 22. In this case, the whole of the real camera image is displayed in the whole of this synthesized image.

Firstly, a planar polygon is considered in which an i pixel texture is mapped to one unit of the coordinates of the virtual space in which the planar polygon is arranged. In this case, texture of i pixels by i pixels is mapped to a region of 1 unit×1 unit of the aforementioned coordinates. Here, the display screen of the upper LCD 22 is W dots horizontally by H dots vertically, and the whole area of the W dot×H dot display screen corresponds to the whole area of the real camera image texture described above. In other words, the size of the texture data of the camera image is W pixels horizontally by H pixels vertically.

In this case, the coordinates described above should be determined as shown in FIG. 24, by taking account of the fact that the planar polygon is arranged in such a manner that 1 dot×1 dot on the display screen corresponds to 1 pixel×1 pixel of the real camera image texture. More specifically, the XY coordinates of the virtual space in which the planar polygon is arranged are set in such a manner that the planar polygon, onto the whole main surface of which the texture of the camera image is mapped, has a width corresponding to a coordinate amount of W/i, and a height corresponding to a coordinate amount of H/i. The planar polygon is arranged in such a manner that the center of the main surface of the planar polygon to which the texture has been mapped coincides with the point of origin of the XY coordinates of the virtual space, the horizontal direction of the planar polygon is the X axis direction (the leftward direction is the forward direction of the X axis), and the vertical direction of the planar polygon is the Y axis direction (the upward direction is the forward direction of the Y axis). In this case, the upper right corner position of the main surface of the planar polygon which, to which the texture is mapped is located at $(X,Y)=(W/2i, H/2i)$, the lower right corner position is located at $(X,X)=(W/2i, -H/2i)$, the upper left corner position is located at $(X,Y)=(-W/2i, H/2i)$, and the lower left corner position is located at $(X,Y)=(-W/2i, -H/2i)$.

By arranging the planar polygon in this way, a region of 1 pixel×1 pixel of the coordinates described above corresponds to a region of i pixels×i pixels of the texture, and therefore the (W/i) horizontal by (H/i) vertical region of the planar polygon corresponds to the W pixel by H pixel size of the texture.

As described above, by rendering the planar polygon arranged at the coordinates of the virtual space by parallel projection in such a manner that 1 dot on the display screen corresponds to 1 pixel on the real camera image (texture), a real world image corresponding to the real camera image obtained by the real camera of the game device 10 is generated.

Furthermore, as described above, the texture data of the real camera image included in the real world image data Dc is updated on the basis of the real camera image data Db, but there may be cases where the A (horizontal)×B (vertical) size of the image in the real camera image data Pb does not match the W (horizontal)×H (vertical) size of the texture data. In this case, the information processing unit 31 performs updating of the texture data by any method. For example, the information processing unit 31 may update the texture data by using an image in which the horizontal size A and vertical size B of the image in the real camera image data Db is enlarged or reduced, so as to match an image of W×H size (texture data image). Moreover, for example, it is supposed that the horizontal size A and vertical size B of the image in the real camera image data Db are larger than the horizontal size W and vertical size H of the texture data. In this case, for example, the information processing unit 31 may update the texture data by extracting an image of W×H size (a texture data image) on the basis of the predetermined position of the image in the real camera image data Db. Moreover, for example, at least one of the horizontal A and vertical B size of the image in the real camera image data Db is taken to be smaller than the horizontal W and vertical H size of the texture data. In this case, for example, the information processing unit 31 may extract an image of W×H size (a texture data image) and update this texture data, on the basis of a predetermined position of the image after enlarging the real camera image data Db so as to be larger than the size of the texture data.

Furthermore, in the present embodiment, the horizontal× vertical size of the display screen of the upper LCD 22 matches the horizontal×vertical size of the texture data of the real camera image, but these sizes do not have to be matching. In this case, the display screen of the upper LCD 22 and the real world image do not have matching sizes, but the information processing unit 31 may alter the size of the real world image by a commonly known method when displaying the real world image on the display screen of the upper LCD 22.

Thereupon, as shown in FIG. 20B, the information processing unit 31 carries out processing for rendering the virtual space (step 84) and then advances to the next step, step 85. For example, the information processing unit 31 generates an image in which a virtual space containing the enemy object EO, bullet object BO, and back wall BW is rendered, taking account of the opening judgment data, and uses this image to update the rendered image data of the virtual space which is included in the rendered image data Dk. Below, one example of this rendering process is described with reference to FIG. 25 to FIG. 27.

Figure 25:
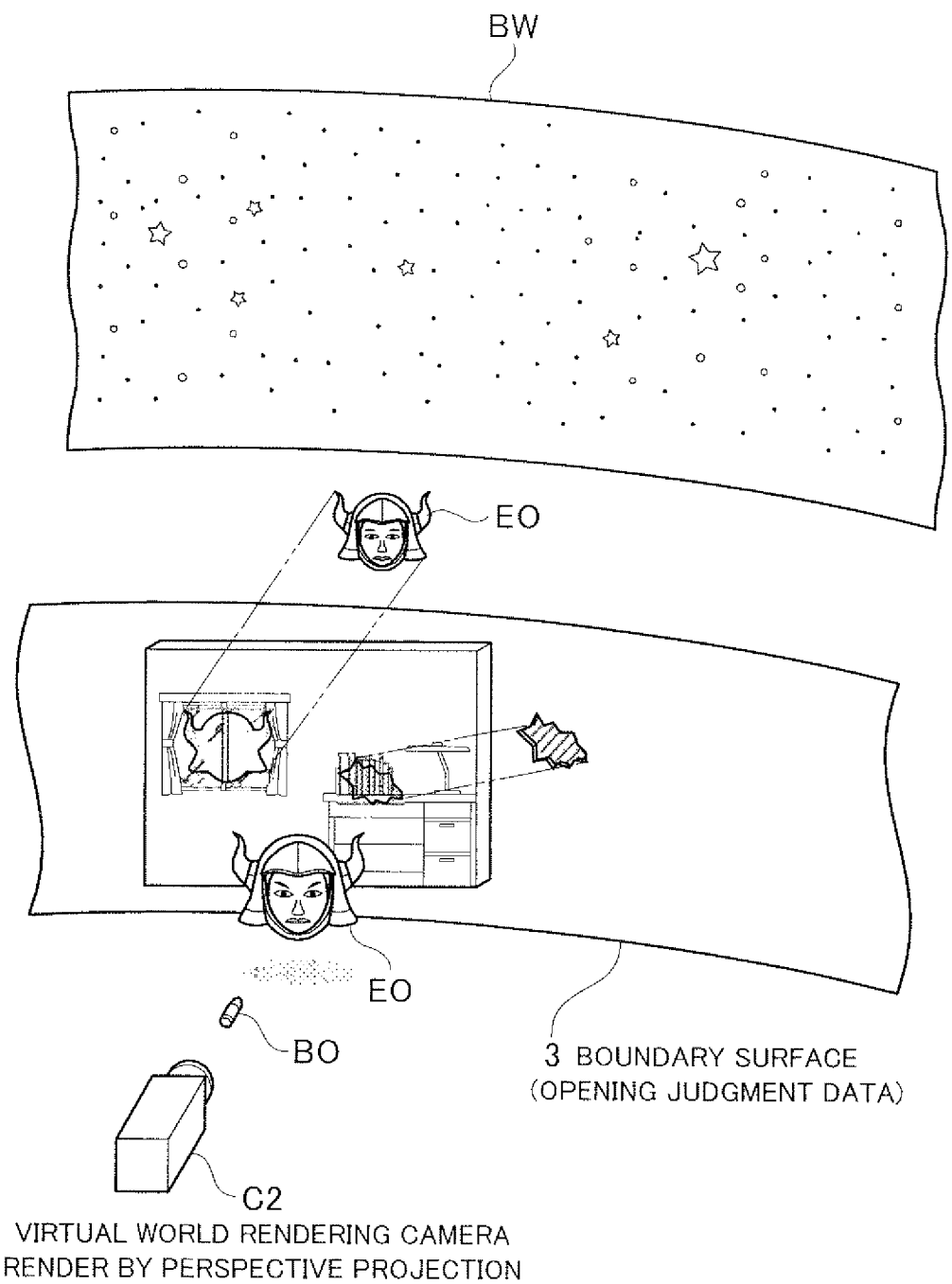
FIG. 25 is an illustrative diagram for describing one example of processing for rendering a virtual space.
Figure 26:
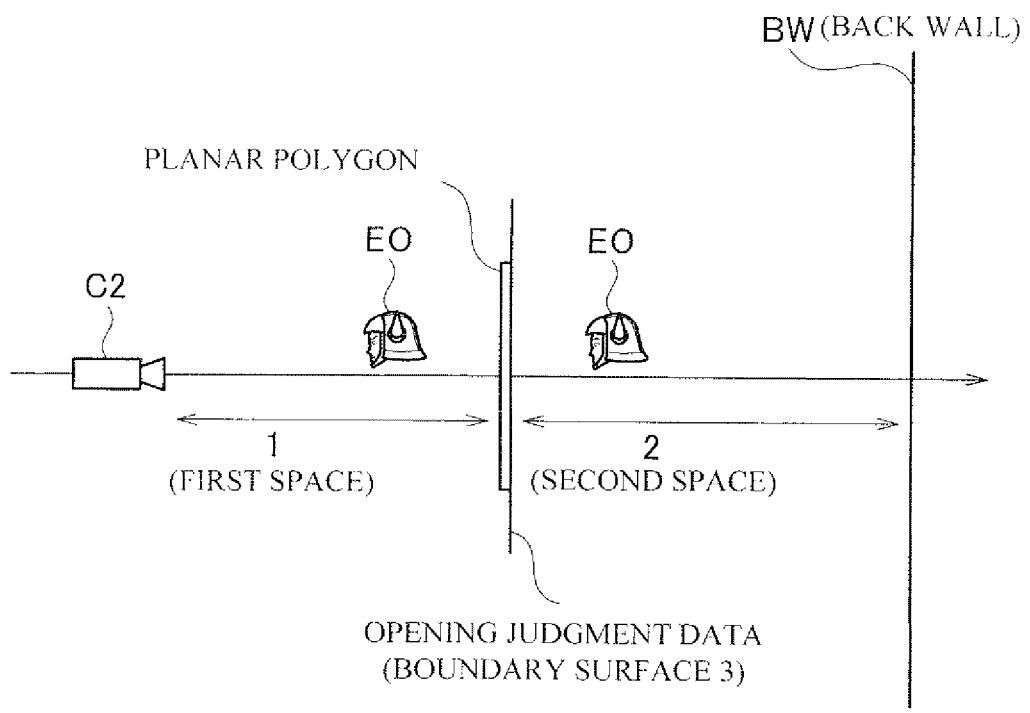
FIG. 26 is an illustrative diagram for describing the positional relationship of respective objects in FIG. 25.

FIG. 25 shows an example of the arrangement of an enemy object EO, a bullet object BO, a boundary surface 3 (opening judgment data) and a back wall BW, in the virtual space. Furthermore, FIG. 26 shows the positional relationships of the objects in a case where the virtual camera (virtual world rendering camera) in FIG. 25 is oriented in the direction $(X,Y,Z)=(0,0, -1)$ from the point of origin. In this way, the enemy object EO, the bullet object BO, the boundary surface 3 and the back wall BW are respectively arranged in accordance with data indicating the arrangement positions included in the enemy object data Df, the bullet object data Dg, the boundary surface data Dd and the back wall image data De. Furthermore, the virtual world rendering camera C2 for rendering the virtual space is arranged in the virtual space in accordance with data indicating the arrangement direction and the arrangement position included in the virtual camera data Dj.

Here, firstly, the position of the boundary surface 3 (opening judgment data) will be described. As stated previously, in the image processing program according to the present embodiment, a real image in which an opening is formed is generated by multiplying the color information of the real world image (rendered image data of the real camera image) by the opening judgment data. Consequently, for example, 1 horizontal coordinate×1 vertical coordinate of the rendered image data of the real camera image (see the positional relationship of the planar polygon in FIG. 23 and FIG. 24) is taken to correspond to 1 horizontal coordinate×1 vertical coordinate of the boundary surface 3 in the virtual space (and more specifically, the opening judgment data). In other words, when the boundary surface 3 is viewed by perspective projection from the virtual world rendering camera C2 shown in FIG. 25 or FIG. 26, the range of view of the boundary surface 3 by the virtual world rendering camera C2 corresponds to the horizontal×vertical size of the rendered image data of the real camera image.

Figure 27:
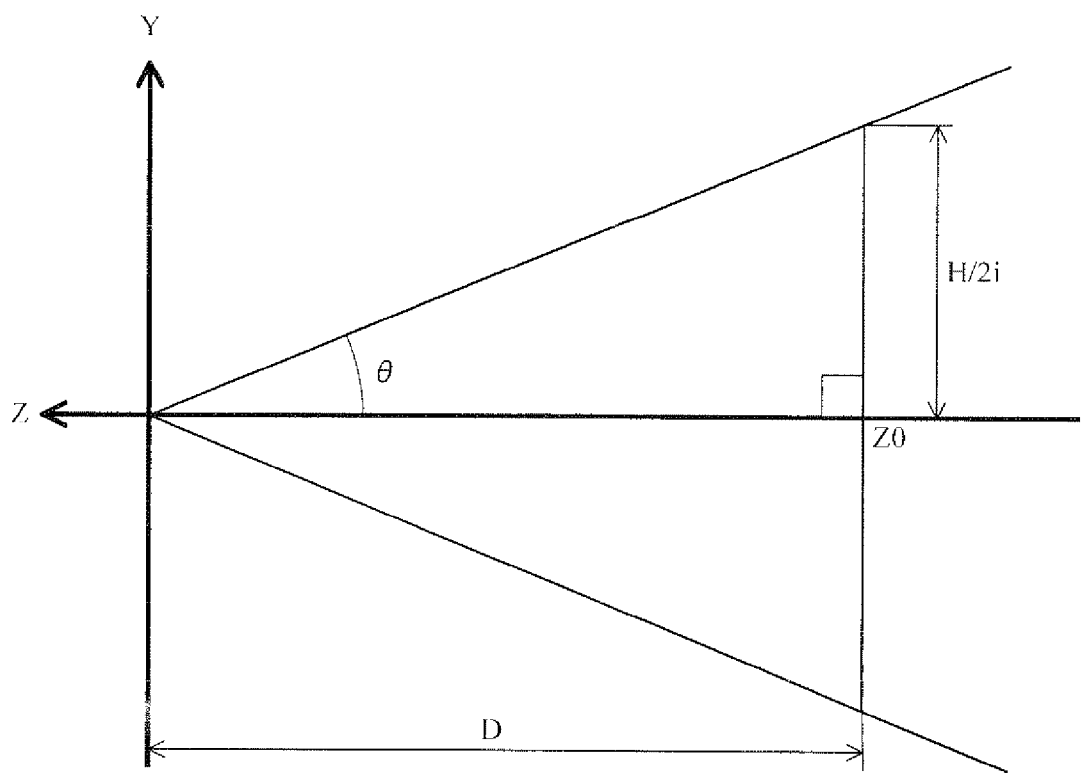
FIG. 27 is an illustrative diagram for describing one example of coordinates of a boundary surface when rendering a virtual space.

FIG. 27 shows an example of the positional relationship between the virtual world rendering camera C2 and the boundary surface 3. It is supposed that the boundary surface 3 is projected using perspective projection by the virtual world rendering camera C2 which is oriented in the direction (X,Y,Z)=(0,0,−1) from the point of origin. In this case, if the boundary surface 3 is taken to be located at a position of Z=Z0 shown in FIG. 27, then 1 horizontal coordinate×1 vertical coordinate of the opening judgment data will correspond 1 horizontal coordinate×1 vertical coordinate of the rendered image data of the real camera image. Here, the position Z=Z0 is a position where the length of the display range in the Y axis forward direction is H/2i from the viewpoint of the virtual world rendering camera C2 which is projecting the boundary surface 3 by perspective projection, when the angle of view of the virtual world rendering camera C2 in the Y axis direction is θ. As stated above, H is the number of dots in the vertical direction of the display screen of the upper LCD 22, and i is the number of pixels of the texture which is mapped to one coordinate unit of the virtual space. If the distance from the center of the virtual world rendering camera C2 to the position Z=Z0 is D (D>0), then Expression 1 below is established.

$$\tan \theta = (H/2i)/D = H/2Di \qquad \text{[Expression 1]}$$

Therefore, if the virtual world image is generated by perspective projection of the enemy object EO, and the like, as described below, by taking account of the boundary surface 3, then the virtual world rendering camera C2 which generates the virtual world image is set to "Angle of view in Y axis direction: θ=tan$^{-1}$(H/2Di), aspect ratio=W:H". The boundary surface 3 (more specifically, the opening judgment data indicating the state of the boundary surface 3) is disposed at a view coordinate of Z=Z0 from the virtual world rendering camera C2. By this means, the range of view of the boundary surface 3 by the virtual world rendering camera C2 has a size of W×H.

Next, the rendering processing for the virtual space will be described. The information processing unit 31 generates a rendered image of the virtual space, with the boundary surface 3 situated at the position described above. The information processing unit 31 carries out the rendering process by taking account of the fact a real world image is to be synthesized subsequently. Below one example of the rendering processing is described in concrete terms.

The information processing unit 31 renders the enemy object EO, the bullet object BO and the back wall BW which are arranged in the virtual space, with the boundary surface 3 situated as shown in FIG. 25 (or FIG. 26), by perspective projection by the virtual world rendering camera C2. In this case, the information processing unit 31 takes account of the rendering priority information. In normal perspective projection, an object on the front side as viewed from the virtual camera in the virtual space is rendered so as to be depicted preferentially. Consequently, in normal perspective projection, since the boundary surface 3 is present, then the object in the second space 2 is not rendered. In the game according to the present embodiment, an opening is provided in the boundary surface 3 (real world image), and a portion of the second space 2 is visible through this opening. Furthermore, a shadow of the object situated in the second space 2 is synthesized and rendered with the real world image. In so doing, it is possible to give the user a sense of the existence of a virtual world beyond the real world image. More specifically, the information processing unit 31 carries out the rendering process using the rendering priority information. The image processing program according to the present embodiment uses an alpha value as an example of the rendering priority information.

In the perspective projection described above, an object present in the second space 2 (in the present embodiment, an enemy object EO or a back wall BW) is situated behind the boundary surface 3. Here, opening judgment data is set for the boundary surface 3. The opening judgment data is rectangular texture data storing an alpha value, as stated above, and each coordinate of the texture data corresponds to a respective position of the boundary surface in the virtual space. Consequently, the information processing unit 31 is able to identify the region of the opening judgment data which corresponds to the range of view of the object present in the second space 2 by the virtual world rendering camera C2.

In the present embodiment, for example, the information processing unit 31 renders images of a virtual object and/or a back wall which are present in a region of the second space 2 that is visible through a region (opening region) for which an alpha value of "0" is stored in the opening judgment data. Furthermore, the information processing unit 31 does not render a virtual object and/or back wall present in the second space 2 in a region for which an alpha value of "0.2" corresponding to a non-open region is stored in the opening judgment data (namely, a region which is treated as a region for which an alpha value of "1" indicating a non-open region has been stored). More specifically, a real world image is rendered in the portion of the displayed image which corresponds to this non-open region, by means of the synthesis processing in step 85 described below.

Consequently, image data included in the solid data Df1 or the back wall image data De is rendered in a region where a value of "0" has been stored in the opening judgment data, from the viewpoint of the virtual world rendering camera C2. An image of a virtual object or a back wall is shown in the portion corresponding to this region, on the upper LCD 22, by the synthesis processing in step 85 which is described below.

Furthermore, the info nation processing unit 31 does not render a virtual object and/or back wall present in the second space 2 in a region for which an alpha value of "0.2" indicating a non-open region is stored in the opening judgment data viewed from the virtual world rendering camera C2 (namely, a region which is treated as a region for which an alpha value of "1" indicating a non-open region has been stored). More specifically, a real world image is rendered in the portion of the image displayed on the upper LCD 22 which corresponds to this non-open region, by means of the synthesis processing in step 85 described below. However, in the case of the shadow ES (silhouette model) of an enemy object EO described above, depth judgment with respect to the boundary surface 3 is disabled, and since the alpha value "1" of the silhouette model is greater than the alpha value "0.2" of the boundary surface 3, then the shadow ES is rendered in the region where an alpha value "1" indicating a non-open region is stored. By this means, the shadow ES of the enemy object EO is rendered on the real world image. Furthermore, the silhouette model of the enemy object EO is of a suitable size and is suitably arranged so as to be encompassed by the solid model, and if the enemy object EO is situated in the first space 1 where depth judgment is set to be enabled between the solid model and the silhouette model, then the silhouette model is hidden by the solid model and therefore is not rendered.

The shape of the boundary surface 3 in the present embodiment the central portion of a spherical surface as shown in FIG. 7A, and depending on the view direction of the virtual world rendering camera C2, there does not exist any opening judgment data. In this case, the processing described above is carried out by artificially supposing that there exists opening judgment data storing an alpha value of "0.2". In other words, the region where there is no opening judgment data is treated as a region where an alpha value of "1" indicating a non-opening region is stored.

Furthermore, the silhouette data Df2 included in the enemy object data Df corresponding to the enemy object 30 in the present embodiment is set in such a manner that there are a plurality of planar polygons having normal directions arranged in respective radiating directions when viewed from the enemy object, and texture of a silhouette image of the enemy object viewed from the corresponding direction is applied to each of the planar polygons. Consequently, in the image processing program according to the present embodiment, the shadow ES of the enemy object EO in the virtual space image is depicted as an image which reflects the orientation of the enemy object in the second space 2.

By means of the processing described above, the information processing unit 31 renders an enemy object EO, a bullet object BO and a back wall BW which are arranged in the virtual space, by perspective projection to generate a virtual world image viewed from the virtual world rendering camera C2, and updates the rendered image data of the virtual space accordingly (step 84). The image generated by this processing is the display image shown in FIG. 28 excluding the real world image.

Returning to FIG. 20B, the information processing unit 31 then generates a display image by synthesizing the real world image and the virtual space image (step 85), and terminates the processing of this sub-routine.

Figure 28:
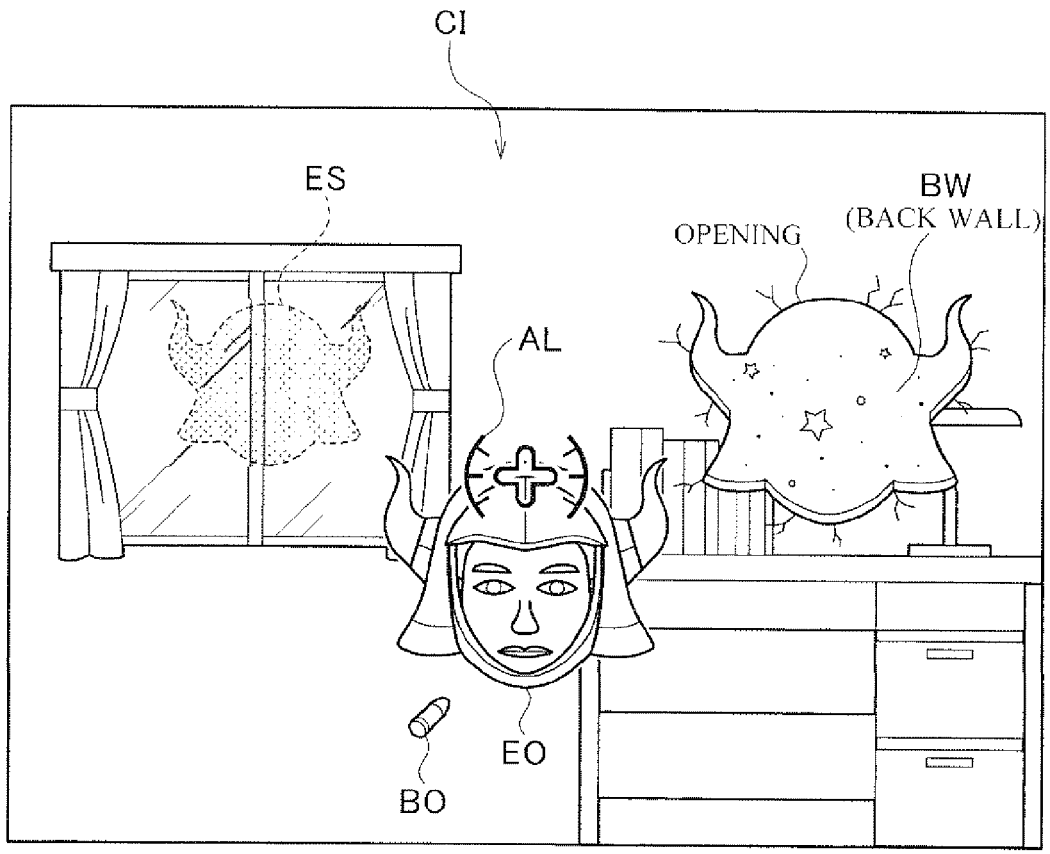
FIG. 28 is a diagram showing one example of a display image generated by an image processing program according to the present embodiment.

For example, the information processing unit 31 generates a synthesized image of a real world image and a virtual space image by synthesizing the rendered image data of the real camera image and the rendered image of the virtual space, giving priority to the rendered image of the virtual space. The information processing unit 31 then generates a display image (FIG. 28) by preferentially synthesizing image data including a pointing cursor image data at the center of the synthesized image (in the center of the field of view of the virtual world rendering camera C2). FIG. 28 shows one example of a display image generated by the first rendering method or the second rendering method. If a virtual space image has not been stored in the rendered image data of the virtual space, then the information processing unit 31 should store the real world image stored in the rendered image data of the camera image, directly, as the display image data Dl.

By means of the foregoing, the processing (sub-routine) relating to the updating of the display image by the first rendering method or the second rendering method is completed.

Returning to FIG. 17, after processing relating to updating of the display image in step 57, the information processing unit 31 displays the updated display image on the upper LCD 22 (step 58) and then advances to the next step, step 59. For example, the CPU 311 of the information processing unit 31 stores the display image data Dl (display image) which has been updated by step 57 above, in the VRAM 313. The CPU 312 of the information processing unit 31 then outputs the display image rendered in the VRAM 313, to the upper LCD 22, whereby the display image is displayed on the upper LCD 22.

Thereupon, the information processing unit 31 judges whether or not the game has ended (step 59). A condition for ending the game may be, for example, that a predetermined condition described above (game clear or game over) is satisfied, or that the user has performed an operation for ending the game, or the like. If the game has not ended, then the information processing unit 31 returns to step 52 described above and repeats processing. On the other hand, if the game has ended, then the information processing unit 31 terminates the processing according to this flowchart.

§3-3 Action and Effects of Image Processing Relating to the Embodiment

In this way, in the image processing program relating to the present embodiment, a real world image obtained from a real camera and a virtual space image including objects situated behind the real world image are synthesized and displayed.

Therefore, the image processing program according to the present embodiment is able to generate an image capable of attracting the user's interest, by creating an image representing an unreal situation in a background based on a real world image. Furthermore, a player can be made to feel as if there is a virtual world beyond the real world. This increases the sense of depth of the game world.

Furthermore, in the present embodiment, a virtual object has an effect on the real world image, for instance, an opening is generated in the real world image and a virtual object appears through that opening, or a shadow of a virtual object is displayed on the real world image, and therefore it is possible to create an impression that the real world and the virtual world are related, rather than simply using the real world image as a background.

Furthermore, an object that is situated behind the real world image in the image that is synthesized and displayed (for example, an enemy object EO present in the second space 2) is displayed as a solid image in a region of the real world image (boundary surface 3) where there is an opening. Moreover, this object is displayed as a shadow image in a region of the real world image where there is no opening (see FIG. 11). In addition, the solid image and the shadow image are images which correspond to the arrangement direction of the object the virtual space, or the orientation of the object depending on the movement of direction.

Therefore, the image processing program relating to the present embodiment is able to generate an image that enables the user to recognize the number of other objects which are present behind the real world image, and the action, such as the direction of movement, of these objects.

Furthermore, in the image processing program relating to the present embodiment, an image of an unreal space, such as an image of outer space, can be used for the image data of the back wall BW. This image of the unreal space can be viewed through an opening in the real world image. The position of the opening is specified in the virtual space. Furthermore, the orientation of the real camera and the orientation of the virtual camera are associated with each other.

Therefore, the image processing program relating to the present embodiment is able to provide an opening at a position corresponding to the orientation of the real camera and to represent the opening at the same position in the real world image. In other words, the image processing program, relating to the present embodiment is able to generate an image which makes the user feel as if the real space and the unreal space are connected, since the opening is depicted at the same position in the real space, even if the orientation of the real camera is changed.

Furthermore, the real world image in which an opening is depicted is generated by multiplying the real world image obtained from the real camera by an alpha value.

Consequently, the image processing program relating to the present embodiment can depict an opening and generate an opening by means of a simple method.

Furthermore, an opening in the real world image which is produced by an enemy object EO passing through the boundary surface 3 is generated by multiplying the opening shape data Df3 included in the enemy object data Df by a predetermined position in the opening judgment data.

Consequently, the image processing program relating to the present embodiment is able to set an opening corresponding to the shape of a colliding character, by means of a simple method.

Furthermore, in the image processing program relating to the present embodiment, it is possible to achieve rendering of a shadow image by comparing alpha values. Furthermore, it is possible to switch the rendering of shadow images on or off, depending on variation in the alpha value set in the silhouette data Df2.

Consequently, the image processing program relating to the present embodiment can assign the rendering of a shadow image to a GPU, and can switch between displaying or not displaying a shadow, by a simple operation.

§4 MODIFICATION EXAMPLES

Figure 29:
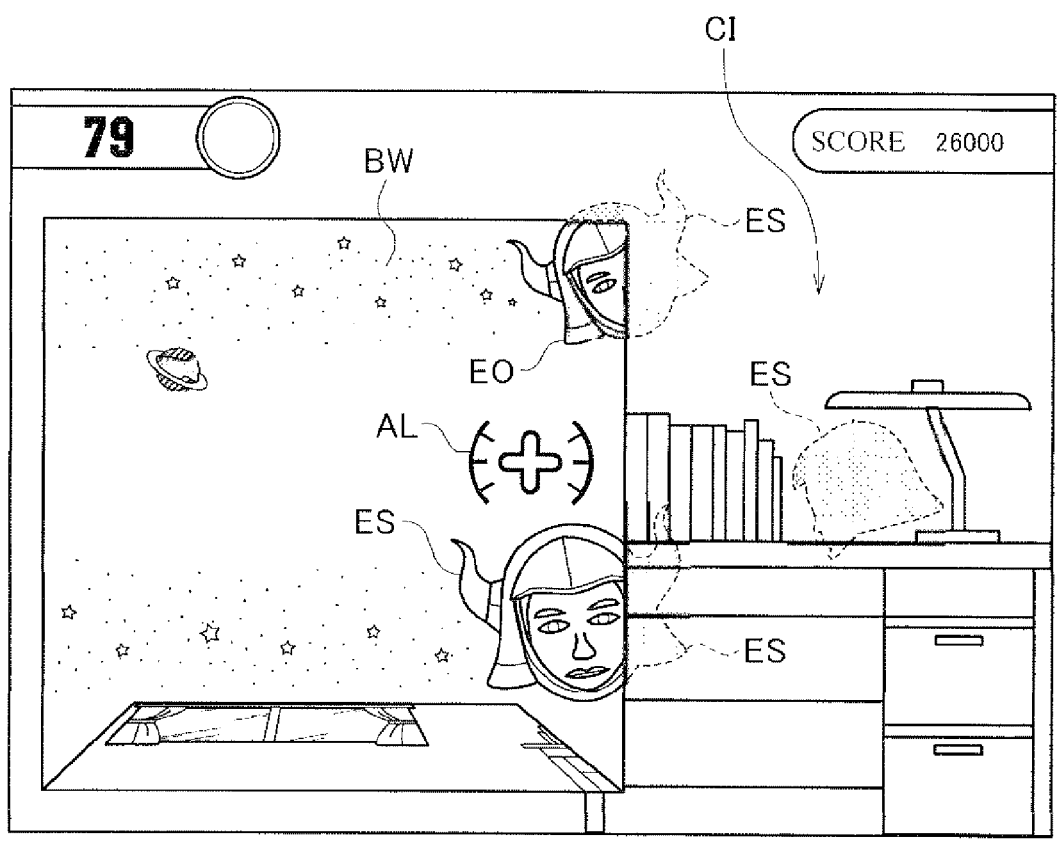
FIG. 29 is a diagram showing one example of an enemy object appearance scene in an image processing program according to the present embodiment.

In the embodiment described above, the information processing unit 31 does not especially execute appearance scene processing when an enemy object EO appears, but the information processing unit 31 may also execute enemy object EO appearance scene processing. FIG. 29 shows an example of the execution of appearance scene processing. As shown in FIG. 29, in this appearance scene processing, a predetermined range of the real world image is cut out in a rectangular shape as an opening, this rectangle falls down into the second space 2, and an enemy object EO appears through the opening thus generated. The information processing unit 31 may carry out appearance scene processing for an enemy object EO such as that shown in FIG. 29 when generating the enemy object data Df in step 62 in FIG. 18. The rectangular portion which falls into the second space 2 in FIG. 29 is depicted by cutting out texture in a predetermined range in the real world image, attaching the texture to a planar polygon corresponding to the size of the predetermined range, and causing the planar polygon to perform a predetermined movement. Furthermore, as stated previously, the open portion in FIG. 29 is realized by setting the alpha value to "0" in a predetermined position of the opening judgment data.

In the embodiment described above, an opening is generated as a result of an enemy object 30 passing through the boundary surface 3, but the opening may be set in any fashion. In the present embodiment, the information processing unit 31 is able to set the opening in any fashion, by setting the alpha value "0" in any region of the opening judgment data.

In the embodiment described above, the information processing unit 31 carries out repair processing of the opening, as a result of a bullet object BO colliding with the edge of the opening which has been set in the boundary surface 3. In other words, the information processing unit 31 updates the alpha value of the opening judgment data at the position corresponding to the opening. However, this repair processing is not limited to the embodiment described above. For example, the repair processing may also be carried out as a result of a predetermined operating button 14 of the game device 10 being depressed while the pointing cursor AL lies over the edge of the opening. In this case, the information processing unit 31 uses data indicating the direction of arrangement of the virtual camera included in the virtual camera data Dj, as the position of the pointing cursor AL, for example. The information processing unit 31 sets an alpha value of "1" corresponding to a non-open region in the opening judgment data at the position of the boundary surface 3 corresponding to the direction of arrangement of the virtual camera. By this means, a region having an alpha value of "0" assumes an alpha value of "1" corresponding to a non-open region, and the opening is thus repaired.

In the embodiment described above, the information processing unit 31 detects the angular velocity produced in the game device 10 by the angular rate sensor 40, and uses this angular velocity to calculate the movement of the game device 10 in the real space, but the movement of the game device 10 may also be calculated by using another method.

In the first example, the information processing unit 31 may also calculate the movement of the game device 10 by using the acceleration detected by the acceleration sensor 39 built into the game device 10. For example, a case is imagined in which a computer carries out processing assuming that the game device 10 in which the acceleration sensor 39 is mounted is in a stationary state (more specifically, the acceleration determined by the acceleration sensor 39 is processed as acceleration due to gravity only). If the game device 10 is actually in a stationary state in this way, then the information processing unit 31 is able to identify whether or not the attitude of the game device 10 is inclined, and by how much, in the direction of gravity, on the basis of the determined acceleration. In a further example, it is imagined that the game device 10 in which the acceleration sensor 39 is mounted is assumed, to be in a moving state. In cases of this kind, the acceleration sensor 39 determines the acceleration corresponding to the movement of the acceleration sensor 39 in addition to the acceleration due to gravity, and therefore if the acceleration due to gravity is removed by predetermined processing, the information processing unit 31 is able to identify the direction, of movement of the game device 10, and the like. More specifically, if a game device 10 comprising an acceleration sensor 39 is moved and accelerated dynamically by the user's hand, then the information processing unit 31 is able to calculate various movements and/or positions of the game device 10 by processing the acceleration signal produced by the acceleration sensor 39. Furthermore, even assuming that the acceleration sensor 39 is in a moving state, if the acceleration corresponding to the movement of the acceleration sensor 39 is removed by predetermined processing, then the information processing unit 31 is able to identify the inclination of the game device 10 with respect to the direction of gravity.

In a second example, the information processing unit 31 may calculate the movement of the game device 10 by using the amount of movement of the camera image captured in real time by the real camera (the outside imaging unit 23 or the inside imaging unit 24) built into the game device 10. For example, if the imaging direction or imaging position of the real camera changes due to movement of the game device 10, then the camera image captured by the real camera also changes. Consequently, the information processing unit 31 is able to calculate the angle of change in the imaging direction of the real camera and the amount of movement of the imaging position, and the like, by using the change in the camera image captured by the real camera built into the game device 10. For example, the information processing unit 31 identifies a predetermined physical object from a camera image captured by a real camera which is built into the game device 10. The information processing unit 31 is then able to calculate the angle of change in the imaging direction of the real camera and the amount of movement in the imaging position, and the like, by comparing the angle and position at which the physical body is imaged, sequentially over time, and finding the amount of change in the angle and position. In a further example, the information processing unit 31 compares the whole camera image captured by the real camera built into the game device 10, sequentially over time. The information processing unit 31 can then calculate the angle of change in the imaging direction of the real camera and the amount of movement in the imaging position, and the like, from the amount of change in the imaging direction or imaging range of the whole image.

In a third example, the information processing unit 31 may calculate the movement of the game device 10 by a combination of at least two of: the angular velocity produced in the game device 10 described above, the acceleration produced in the game device 10, and the camera image captured by the game device 10. By this means, in circumstances where it is difficult to estimate the movement of the game device 10 when calculating the movement of the game device 10 on the basis of one parameter, the movement of the game device 10 can be calculated so as to compensate for these circumstances, by calculating the movement of the game device 10 by combining other parameters. For example, in calculating the movement of the game device 10 by means of the second example described above, if the captured camera image is moved in a horizontal direction sequentially over time, then it is difficult to judge accurately whether the imaging angle of the game device 10 is rotating about the vertical direction or whether the game device 10 is moving horizontally. In this case, the information processing unit 31 is able to judge readily whether the game device 10 is rotating or moving horizontally, by using the angular velocity produced in the game device 10.

In a fourth example, the information processing unit 31 may calculate the movement of the game device 10 by means of so-called AR (augmented reality) technology.

Furthermore, it is also possible to detect the orientation of the game device 10 by using a magnetic sensor. Moreover, in the embodiment described above, a planar image of the real world (a planar view image in the sense of the opposite to the stereoscopically viewable image described above) which is based on a camera image CI acquired by the outside imaging unit 23 the inside imaging unit 24 is displayed, but it is also possible to display an image which can be viewed stereoscopically with the naked eye (a stereo image). For example, as described above, the game device 10 is able to display a stereoscopically viewable image (stereo image) using camera images acquired from the outside left imaging unit 23a and the outside right imaging unit 23b, on the upper LCD 22. Here, an image is displayed on the upper LCD 22 which allows the user to experience a view of a world situated further behind the stereo image (real world image).

In this case, the information processing unit 31 carries out the image processing described above by using the left-eye image obtained from the outside left imaging unit 23a and the right-eye image obtained from the outside right imaging unit 23b as the camera image CI.

More specifically, in the first rendering method, in the image processing in step 81 shown in FIG. 20A, the information processing unit 31 attaches, to the boundary surface 3, a left-eye image (texture data) obtained from the outside left imaging unit 23a and a right-eye image (texture data) obtained from the outside right imaging unit 23b such that the left-eye image and right-eye image are respectively staggered by a predetermined distance. In the image processing in step 82 shown in FIG. 20A, the information processing unit 31 respectively acquires a left-eye virtual world image and a right-eye virtual world image, by perspective projection of the objects arranged in the virtual space from the two virtual cameras (a stereo camera). The left eye virtual world image and the right-eye virtual world image form the left-eye display image and the right-eye display image respectively. The CPU 312 of the information processing unit 31 then outputs the left-eye display image and the right-eye display image, to the upper LCD 22, whereby a stereo image is displayed on the upper LCD 22.

Furthermore, more specifically, according to the second rendering method, in the image processing in step 83 shown in FIG. 20B, the information processing unit 31 generates rendered images of the respective real camera images (the left-eye real world image and the right-eye real world image), by using the left-eye image obtained from the outside left imaging unit 23a and the right-eye image obtained from the outside right imaging unit 23b. Moreover, in the image processing in step 84 shown in FIG. 20B, the information processing unit 31 respectively acquires a left-eye virtual world image and a right-eye virtual world image, by perspective projection of the objects arranged in the virtual space from the two virtual world rendering cameras (stereo camera). In the image processing of step 85 shown in FIG. 20B, the information processing unit 31 generates the left-eye display image by synthesizing the left-eye real world image and the left-eye virtual world image. Similarly, the information processing unit 31 generates a right-eye display image by synthesizing the right-eye real world image and the right-eye virtual world image. The GPU 312 of the information processing unit 31 then outputs the left-eye display image and the right-eye display image, to the upper LCD 22, whereby a stereo image is displayed on the upper LCD 22.

Furthermore, in the embodiment described above, a real-time moving image captured by the real cameras built into the game device 10 is displayed on the upper LCD 22, but different variations are possible for the image displayed on the upper LCD 22. In a first example, a previously recorded moving image, or a moving image obtained from a television broadcast or other apparatus, or the like, can be displayed on the upper LCD 22. In this case, the position of the moving image in the virtual space is specified by mapping onto the boundary surface 3. In the second example, a still image obtained from a real camera built into the game device 10 or another real camera can be displayed on the upper LCD 22. In this case also, similarly to the example described above, the position of the still image in the virtual space is specified by mapping onto the boundary surface 3. Here, the still image obtained from a real camera may be a still image of the real world which is captured in real time a real camera built into the game device 10 or may be a still image of the real world which has been captured previously by the real camera in the game device 10 or another real camera. Furthermore, the still image obtained from the real camera may be a still image obtained from a television broadcast or another apparatus.

Furthermore, in the embodiment described above, the upper LCD 22 is a parallax barrier type of liquid crystal display device, which can be switched between stereoscopic display and planar display by controlling the on/off switching of the parallax barrier. In a further embodiment, for example, the upper LCD 22 may be a lenticular type of liquid crystal display device which is capable of displaying a stereo image and a planar image. If the upper LCD 22 is a lenticular type of liquid crystal display device, similarly to the embodiment described above, an image is displayed stereoscopically by dividing two images captured by the outside imaging unit 23 into strip shapes in the vertical direction, and arranging the images in alternating fashion. Furthermore, even if the upper LCD 22 is a lenticular type of liquid crystal display device, similarly to the embodiment described above, it is possible to display the image in planar view by presenting one image captured by the inside imaging unit 24 to the user's left and right eyes. In other words, even if the liquid crystal display device is a lenticular type of device, the same image is divided into strip shapes in the vertical direction, and by arranging the divided images in alternating fashion, it is possible to present the same image to both the user's left and right eyes. By this means, it is possible to display the image captured by the inside imaging unit 24 as a planar image.

Moreover, the example of the liquid crystal display unit divided into two screens which is given in the embodiment described above is a case where a physically divided lower LCD 12 and upper LCD 22 are disposed respectively in upper and lower positions (an upper screen and a lower screen). However, the composition of the two-screen display screen may adopt another composition. For example, the lower LCD 12 and the upper LCD 22 may be arranged in left/right fashion on one of the main surfaces of the lower housing 11. Moreover, it is also possible to adopt a composition in which a vertically long LCD screen having the same horizontal width as the lower LCD 12 and twice the vertical length of the lower LCD 12 (more specifically, an LCD screen which is one screen physically and has a display size corresponding to two screens vertically), is disposed on one of the main surfaces of the lower housing 11, in such a manner that two images (for example, a captured image and an image showing an operating instructions screen, or the like) are displayed in upper/lower fashion (in other words, the images are displayed adjacently without a boundary region between the upper and lower images). Furthermore, it is also possible to adopt a composition in which a horizontally long LCD having the same vertical width as the lower LCD 12 and twice the horizontal length of the lower LCD 12 is disposed on one of the main surfaces of the lower housing 11, in such a manner that two images are displayed in left/right fashion in the horizontal direction (in other words, the images are displayed adjacently without a boundary region between the left and right images). In other words, two images may be displayed by using one physical screen and dividing the screen into two areas. Furthermore, when displaying the two images described above by using one physical screen and dividing the screen into two areas, a touch panel 13 may be arranged over the whole surface of the screen.

Moreover, in the embodiment described above, the touch panel 13 is provided in an integrated fashion with the game device 10, but the present invention may of course also be realized by composing the game device and the touch panel separately. Furthermore, it is also possible to provide a touch panel 13 on the upper surface of the upper LCD 22 and to show the display image that was displayed on the lower LCD 12 described above, on this upper LCD 22.

Moreover, the embodiment described above was explained with reference to a portable game device 10 or a stationary game device, but the present invention may also be realized by executing the image processing program according to the present invention in an information processing device such as a generic personal computer. Furthermore, in another embodiment, the device is not limited to a game device, and may be any portable electronic device, such as a PDA (Personal Digital Assistant), mobile telephone, personal computer, camera, or the like. For example, a mobile telephone may comprise two display units on a main surface of one housing, and also comprise a real camera.

Moreover, in the embodiment described above, the image processing program is executed in one game device 10, but at least a portion of the processing steps of the image processing program may be executed in another device. For example, if a game device 10 is composed so as to be capable of communicating with another device (for example, a server or another game device), then the processing steps in the image processing described above may be executed by coordinated operation of the game device 10 and the other device. For example, coordinated operation may be employed in such a manner that the other apparatus executes the processing from step 52 to step 57 in FIG. 17, and the game device 10 executes the processing in step 58 and step 59 in FIG. 17. In this way, by executing at least a portion of the processing steps in the image processing described above by another device, it is possible to achieve similar processing to the image processing described above. Thus, the image processing described above can be executed by one processor or coordinated operation of a plurality of processors included in an information processing system constituted by at least one information processing device.

Furthermore, in the embodiment described above, processing according to the flowchart described above is carried out by means of the information processing unit 31 of the game device 10 executing a predetermined program, but it is also possible to carry out all or a portion of the processing by means of a dedicated circuit provided in the game device 10.

Moreover, the form of the game device 10 described above, and the form, number and arrangement positions of the operating buttons 14, analog stick 15, touch panel 13, and the like, provided in the game device 10, are merely examples and it is of course possible to realize the present invention using other forms, numbers and arrangement positions. Furthermore, the processing sequence, the set values and the values for judgment, and the like, in the image processing described above are merely examples and the present invention can of course be realized using other sequences and values.

Furthermore, the image processing program (game program) described above may also be supplied to the game device 10 via a wired or wireless communication circuit, apart from being supplied to the game device 10 via an external storage medium, such as an external memory 45, external data memory 46, or the like. Moreover, the program described above may be recorded previously in a non-volatile storage device inside the game device 10. Apart from a non-volatile memory, the information storage medium which stores the program may be an optical disk-shaped recording medium, such as a CD-ROM, DVD or similar medium, or a flexible disk, a hard disk, a magneto-optical disk, magnetic tape, or the like. Furthermore, the information storage medium which stores the program may be a non-volatile memory which temporarily stores the program.

Moreover, the display device may be a head-mounted display.

The present invention was described in detail above, but the description above gives no more than an example of the present invention and does not limit the scope of the invention. Needless to say, various improvements and modifications may be applied without departing from the scope of the present invention. The scope of the present invention should be interpreted on the basis of claims. Furthermore, it is understood that a person skilled in the art could implement an equivalent scope of technology on the basis of the description of the present invention and their technical knowledge, from the description of the concrete embodiments of the present invention. Moreover, it should be understood that, unless specified otherwise, terminology used in the present specification is used with the meaning normally employed in the related field. Therefore, unless defined otherwise, all specialist terms and technical terms used in the present specification have the same meaning as that generally understood by a person skilled in the related art to which the present invention belongs. In the case of any contradictions, the present specification (including definitions) takes priority.

§5 SUPPLEMENT

In the description thus far, one embodiment of the image processing program relating to the present invention and the image processing device which executes this image processing program has been described, but embodiments of the image processing system and the image processing method relating to the present invention can also be described in a similar fashion. In other words, a system which executes the respective processes of the image processing program described above is one embodiment of the image processing system relating to the present invention. Furthermore, a procedure in which each step is a respective process of the image processing program described above is one embodiment of the image processing method relating to the present invention.

The image processing program, image processing device, image processing system and image processing method relating to the present invention can generate an image which allows a user to experience a view of a further world hidden behind the real world, by synthesizing a real world image and a virtual world image. Therefore, the image processing program, image processing device, image processing system and image processing method relating to the present invention are useful as an image processing program, image processing device, image processing system and image processing method, and the like, for carrying out processing to display various images on a display device.

What is claimed is:

1. A non-transitory computer readable medium storing an image processing program that is executed by a computer which displays a synthesized image of a real world image and a virtual image on a display device, the image processing program causing the computer to perform functionality comprising:
    acquiring a real world image captured by a real camera;
    defining first and second virtual regions in a virtual image based on a boundary surface adjoining the first and second virtual regions, the first virtual region located inside the boundary surface and the second virtual region located outside the boundary surface;
    generating a synthesized image by synthesizing the real world image and the virtual image depicting a first virtual object, in such a manner that the first virtual object appears to be present behind the real world image when the first virtual object is in the second virtual region; and
    displaying the synthesized image on the display device, wherein a portion of the first virtual object, appearing to be present behind the real world image, is depicted as a silhouette of the first virtual object.

2. The non-transitory computer readable medium storing the image processing program according to claim 1, wherein the synthesized image is generated by performing synthesis in such a manner that the real world image is displayed preferentially with respect to the virtual image depicting the first virtual object in the generating the synthesized image.

3. The non-transitory computer readable medium storing the image processing program according to claim 1, wherein the synthesized image is generated in such a manner that a second virtual object which is present in the first virtual region that is different from the second virtual region appears to be present in front of the real world image in the generating the synthesized image.

4. The non-transitory computer readable medium storing the image processing program according to claim 3, wherein the synthesized image is generated by performing synthesis in such a manner that the virtual image depicting the second virtual object is displayed preferentially with respect to the real world image in the generating the synthesized image.

5. The non-transitory computer readable medium storing the image processing program according to claim 3, wherein the second virtual object is synthesized by using the real world image as a background in the generating the synthesized image; and
    the synthesized image is generated in such a manner that the first virtual object appears to be present behind the background in the generating the synthesized image.

6. The non-transitory computer readable medium storing the image processing program according to claim 3, wherein a first region of a predetermined virtual space is set as the first virtual region in the generating the synthesized image; and
    a second region of the virtual space is set as the second virtual region in the generating the synthesized image.

7. The non-transitory computer readable medium storing the image processing program according to claim 6, wherein adjacent regions are set as the first region and the second region in the generating the synthesized image.

8. The non-transitory computer readable medium storing the image processing program according to claim 6, wherein
    the first region includes a position of a virtual camera; and
    the second region is a region more distant from the position of the virtual camera than the first region.

9. The non-transitory computer readable medium storing the image processing program according to claim 6, wherein depth judgment is performed, with reference to the virtual camera, in respect of the boundary surface between the first region and the second region of the virtual space, and the first virtual object and the second virtual object, and on the basis of this depth judgment, a virtual object that is judged to be nearer to the virtual camera than the boundary surface with respect to the real world image is preferentially synthesized, and the real world image with respect to a virtual object that is judged to be further from the virtual camera than the boundary surface is preferentially synthesized in the generating the synthesized image.

10. The non-transitory computer readable medium storing the image processing program according to claim 6, wherein the synthesized image is generated by applying the real world image to a screen object which encompasses a range of view of the virtual camera and is disposed at a boundary position between the first region and the second region, and by imaging the first virtual object, the second virtual object and the screen object by the virtual camera in the generating the synthesized image.

11. The non-transitory computer readable medium storing the image processing program according to claim 1, wherein the synthesized image is generated in such a manner that the real world image occupies the whole area of the synthesized image in the generating the synthesized image.

12. The non-transitory computer readable medium storing the image processing program according to claim 1, wherein the computer is further caused to perform functionality comprising repeatedly acquiring at least an imaging direction of the real camera;
   wherein the real world image is acquired repeatedly from the real camera in the acquiring the real world image; and
   in the generating the synthesized image, the virtual image is generated by setting a current imaging direction of the virtual camera in accordance with a current imaging direction of the real camera acquired in the acquiring the imaging direction of the real camera and the synthesized image is generated by using current real world images acquired repeatedly in the acquiring the real world image.

13. The non-transitory computer readable medium storing the image processing program according to claim 1, wherein the silhouette has an outline corresponding to an orientation of the first virtual object.

14. The non-transitory computer readable medium storing the image processing program according to claim 1, wherein the silhouette of the first virtual object is viewed as being unobstructed when the virtual object appears to be present behind the real world image.

15. The non-transitory computer readable medium storing the image processing program according to claim 1, wherein the synthesized image is generated in such a manner that the first virtual object appears to be present behind a whole of the real world image.

16. The non-transitory computer readable medium storing the image processing program according to claim 1, wherein a virtual camera is positioned within the first virtual region inside the boundary surface.

17. A non-transitory computer readable medium storing an image processing program that is executed by a computer which displays a synthesized image of a real world image and a virtual image on a display device, the image processing program causing the computer to perform functionality comprising:
   acquiring a real world image captured by a real camera;
   defining first and second virtual regions in a virtual image based on a boundary surface adjoining the first and second virtual regions, the first virtual region located inside the boundary surface and the second virtual region located outside the boundary surface;
   generating a synthesized image by synthesizing the real world image and the virtual image depicting a first virtual object, in such a manner that the first virtual object appears to be present behind the real world image when the first virtual object is in the second virtual region; and
   displaying the synthesized image on the display device, wherein the real world image formed with an opening in a portion thereof is used for generating the synthesized image in which the first virtual object is visible via this opening in the generating the synthesized image.

18. The non-transitory computer readable medium storing the image processing program according to claim 17, wherein the opening is disposed in a fixed fashion in the virtual space, regardless of whether or not the opening is displayed on the display device.

19. The non-transitory computer readable medium storing the image processing program according to claim 18, wherein an association is created between an opening position set in the virtual space and a position in the virtual space of the real world image included in the synthesized image, and the synthesized image in which the virtual image depicting the first virtual object is displayed at a position in the real world image corresponding to the opening position is generated.

20. The non-transitory computer readable medium storing the image processing program according to claim 19, wherein the position in the real world image corresponding to the opening position is set so as to be transparent, and the display image including an image of the first virtual object which is visible via this position which has been set to be transparent is generate in the generating the synthesized image.

21. The non-transitory computer readable medium storing the image processing program according to claim 17, wherein the computer is further caused to perform functionality comprising moving the first virtual object from the second virtual region to the first virtual region by passing through a virtual camera field of view region, of the boundary surface between the second virtual region where the real world image is synthesized preferentially with respect to the virtual object and the first virtual region where the virtual object is synthesized preferentially with respect to the real world image.

22. The non-transitory computer readable medium storing the image processing program according to claim 21, wherein the computer is further caused to perform functionality comprising forming the opening in the virtual camera field of view region, of the boundary surface between the first virtual region and the second virtual region, when the movement has occurred in the moving the first virtual object.

23. The non-transitory computer readable medium storing the image processing program according to claim 17, wherein the synthesized image in which an image of the first virtual object is displayed at a position of the opening, and an image of a silhouette of the first virtual object is displayed in superimposed fashion on the real world image at a position other than that of the opening is generated in the generating the synthesized image.

24. An image processing device comprising at least one processor and configured to display an image on a display device, the image processing device configured to at least:
   acquire a real world image captured by a real camera, define first and second virtual regions in a virtual image based on a boundary surface adjoining the first and second virtual regions, the first virtual region located inside the boundary surface and the second virtual region located outside the boundary surface, generate a synthesized image by synthesizing the real world image and the virtual image depicting a first virtual object, in such a manner that the first virtual object appears to be present behind the real world image when the first virtual object is in the second virtual region, and display the synthesized image on the display device, wherein a portion of the first virtual object, appearing to be present behind the real world image, is depicted as a silhouette of the first virtual object.

25. An image processing system in which a plurality of devices are configured so as to be communicable with each other, and which displays an image on a display device, the image processing system comprising:

a processing system having at least one processor and configured to at least:

acquire a real world image captured by a real camera;

define first and second virtual regions in a virtual image based on a boundary surface adjoining the first and second virtual regions, the first virtual region located inside the boundary surface and the second virtual region located outside the boundary surface, generate a synthesized image by synthesizing the real world image and the virtual image depicting a first virtual object, in such a manner that the first virtual object appears to be present behind the real world image when the first virtual object is in the second virtual region; and display the synthesized image on the display device, wherein a portion of the first virtual object, appearing to be present behind the real world image, is depicted as a silhouette of the first virtual object.

26. An image processing method executed by one processor or a plurality of processors in coordinated fashion included in an image processing system constituted by at least one information processing device capable of image processing for displaying an image on a display device, the image processing method comprising:

acquiring a real world image captured by a real camera;

defining first and second virtual regions in a virtual image based on a boundary surface adjoining the first and second virtual regions, the first virtual region located inside the boundary surface and the second virtual region located outside the boundary surface;

generating a synthesized image by synthesizing the real world image and the virtual image depicting a first virtual object, in such a manner that the first virtual object appears to be present behind the real world image when the first virtual object is in the second virtual region; and displaying the synthesized image on the display device, wherein a portion of the first virtual object, appearing to be present behind the real world image, is depicted as a silhouette of the first virtual object.

27. A non-transitory computer readable medium storing an image processing program that is executed by a computer which displays a synthesized image of a real world image and a virtual image on a display device, the image processing program causing the computer to perform functionality comprising:

acquiring a real world image captured by a real camera;

defining first and second virtual regions in a virtual image based on a boundary surface adjoining the first and second virtual regions;

positioning a virtual camera within the first virtual region, the virtual camera imaging one or more virtual objects;

generating a synthesized image by synthesizing the real world image, captured by the real camera, and the virtual image, captured by the virtual camera, depicting a first virtual object, in such a manner that the first virtual object appears to be present behind the real world image when the first virtual object is in the second virtual region; and displaying the synthesized image on the display device, wherein a portion of the first virtual object, appearing to be present behind the real world image, is depicted as a silhouette of the first virtual object.

28. The non-transitory computer readable medium storing the image processing program according to claim 27, wherein the second virtual region is located outside of the boundary surface relative to the position of the virtual camera and the first virtual region is located inside of the boundary surface relative to the position of the virtual camera.

29. The non-transitory computer readable medium storing the image processing program according to claim 27, wherein a second virtual object is positioned closer to the virtual camera than the first virtual object and the second virtual object appears to be in front of the real world image when the second virtual object is in the first virtual region.

* * * * *